United States Patent [19]
Ogawa

[11] Patent Number: 6,091,901
[45] Date of Patent: Jul. 18, 2000

[54] OPTICAL SYSTEM AND PHOTOGRAPHING APPARATUS HAVING IMAGE STABILIZING FUNCTION

[75] Inventor: Hideki Ogawa, Yokohama, Japan

[73] Assignee: Canon Kabushiki Kaisha, Tokyo, Japan

[21] Appl. No.: 09/203,585

[22] Filed: Dec. 2, 1998

[30] Foreign Application Priority Data

Dec. 8, 1997 [JP] Japan .................................. 9-354125

[51] Int. Cl.[7] .......................... G03B 17/00; G02B 15/14; G02B 27/64
[52] U.S. Cl. .............................. 396/55; 396/72; 359/557; 359/676
[58] Field of Search ........................ 395/55, 72; 359/554, 359/557, 676

[56] References Cited

U.S. PATENT DOCUMENTS

| | | | |
|---|---|---|---|
| 4,852,984 | 8/1989 | Takahashi et al. | 350/454 |
| 4,871,243 | 10/1989 | Ogawa et al. | 350/463 |
| 5,042,927 | 8/1991 | Ogawa et al. | 359/683 |
| 5,241,421 | 8/1993 | Endo et al. | 359/684 |
| 5,528,427 | 6/1996 | Tanaka et al. | 359/683 |
| 5,537,259 | 7/1996 | Ogawa | 359/684 |
| 5,568,321 | 10/1996 | Ogawa et al. | 359/676 |
| 5,576,890 | 11/1996 | Tanaka et al. | 359/686 |
| 5,774,267 | 6/1998 | Kodama et al. | 359/557 |
| 5,790,902 | 8/1998 | Mizouchi et al. | 396/142 |
| 5,899,585 | 5/1999 | Ogawa | 396/72 |
| 5,973,836 | 10/1999 | Okada et al. | 359/557 |
| 6,002,519 | 12/1999 | Hayashi et al. | 359/557 |

FOREIGN PATENT DOCUMENTS

| | | |
|---|---|---|
| 6-265827 | 9/1994 | Japan . |
| 7-318865 | 12/1995 | Japan . |
| 8-82769 | 3/1996 | Japan . |

*Primary Examiner*—W. B. Perkey
*Attorney, Agent, or Firm*—Fitzpatrick, Cella, Harper & Scinto

[57] ABSTRACT

An optical system having an image stabilizing function includes, in order from an object side, a first lens unit of positive refractive power, a second lens unit of positive refractive power, a third lens unit of positive refractive power and a fourth lens unit of negative refractive power. During movement from a wide-angle end to a telephoto end, all the lens units move along an optical axis such that the separation between the first lens unit and the second lens unit increases and the separation between the third lens unit and the fourth lens unit decreases. The second lens unit is composed of a front lens subunit of negative refractive power, and a rear lens subunit of positive refractive power and the front lens subunit is so moved as to have directional components perpendicular to the optical axis, compensating for shake of an image.

9 Claims, 58 Drawing Sheets

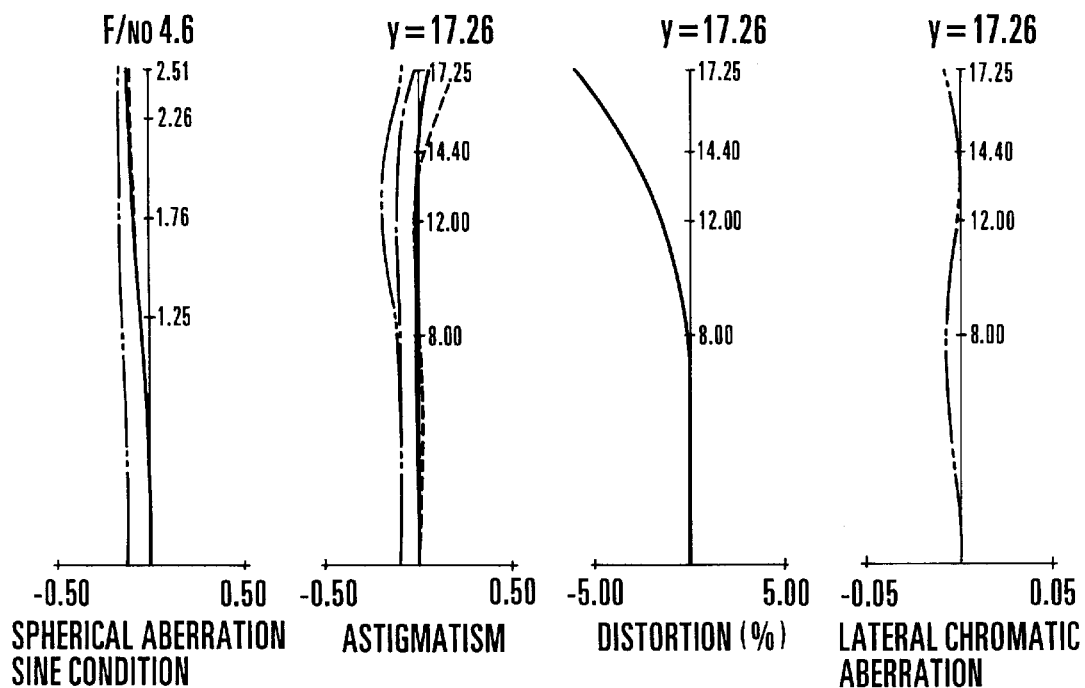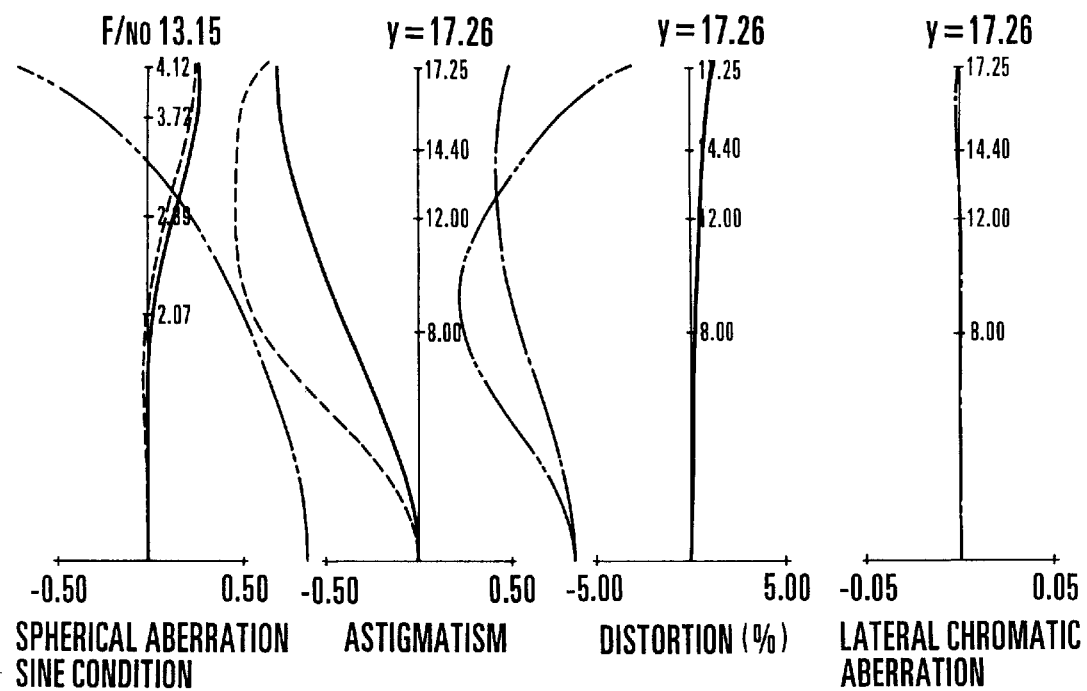

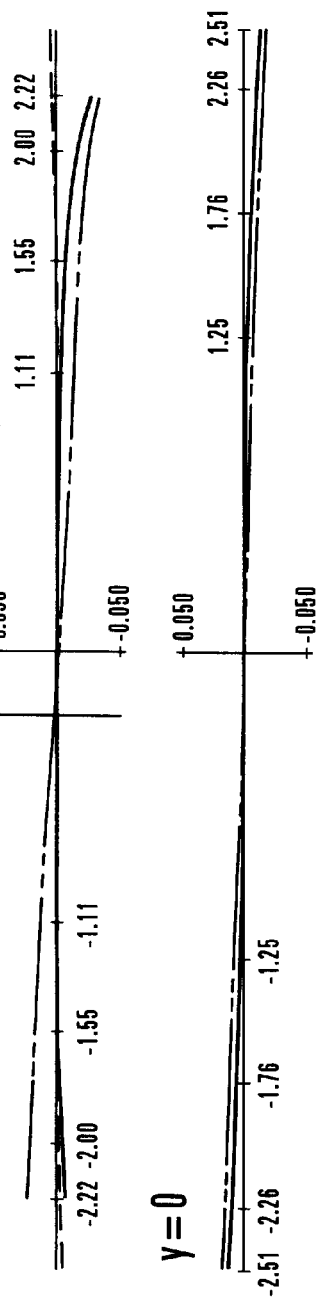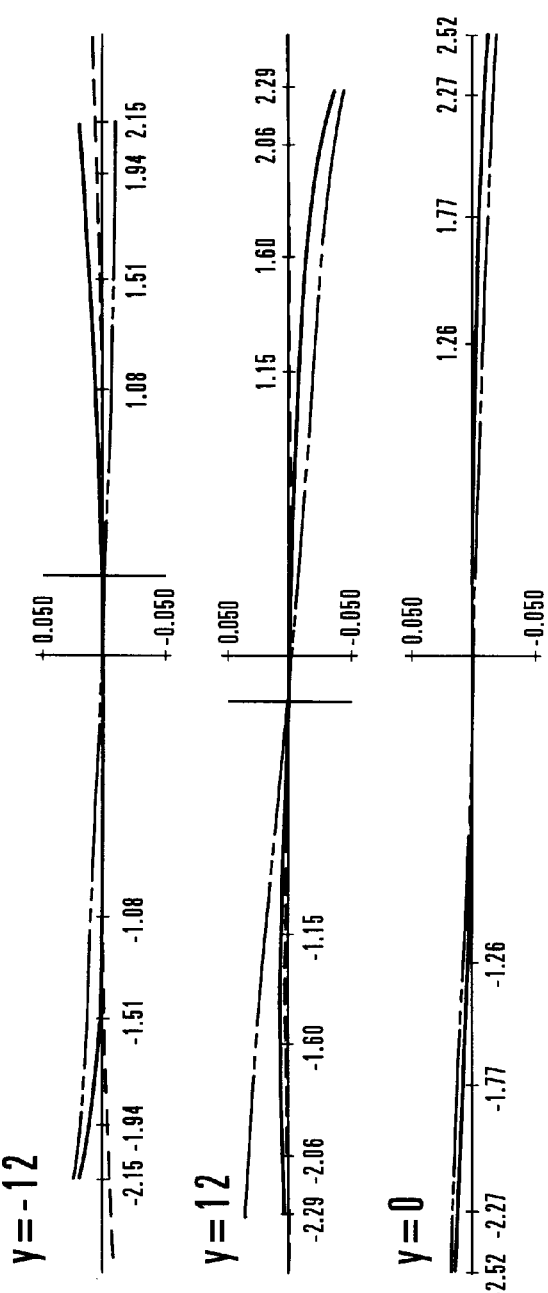

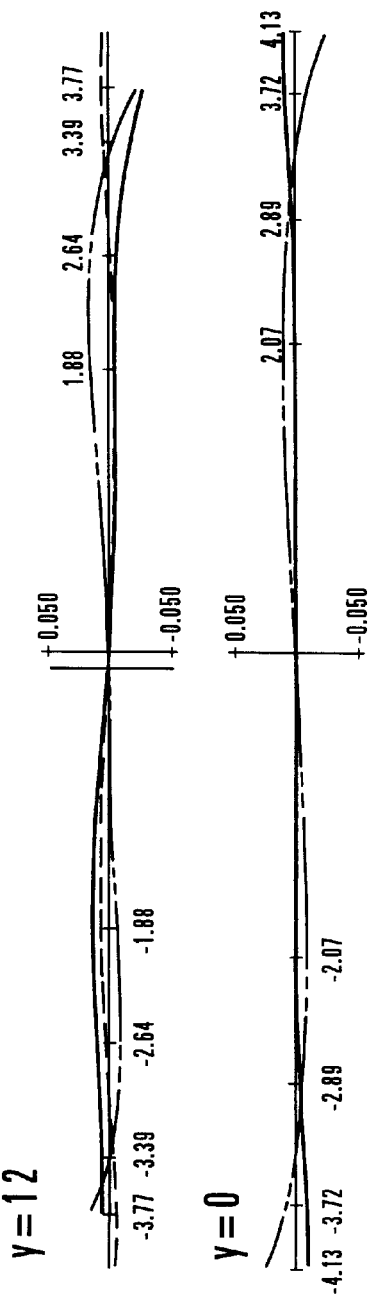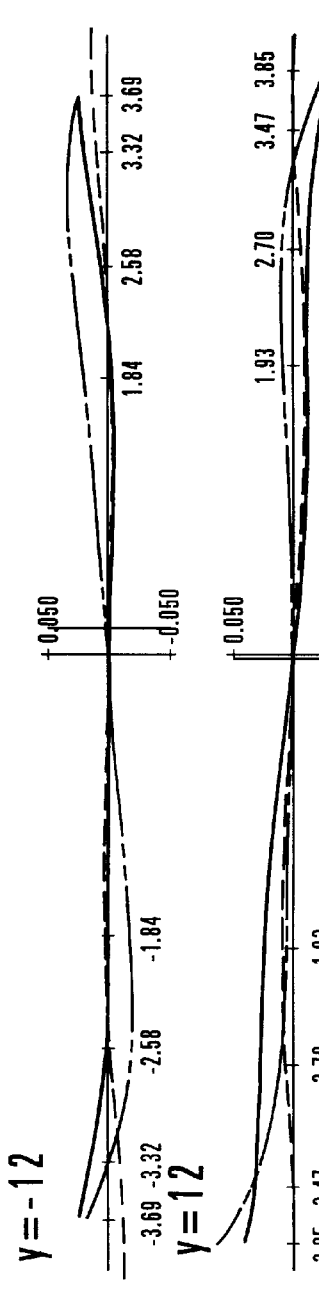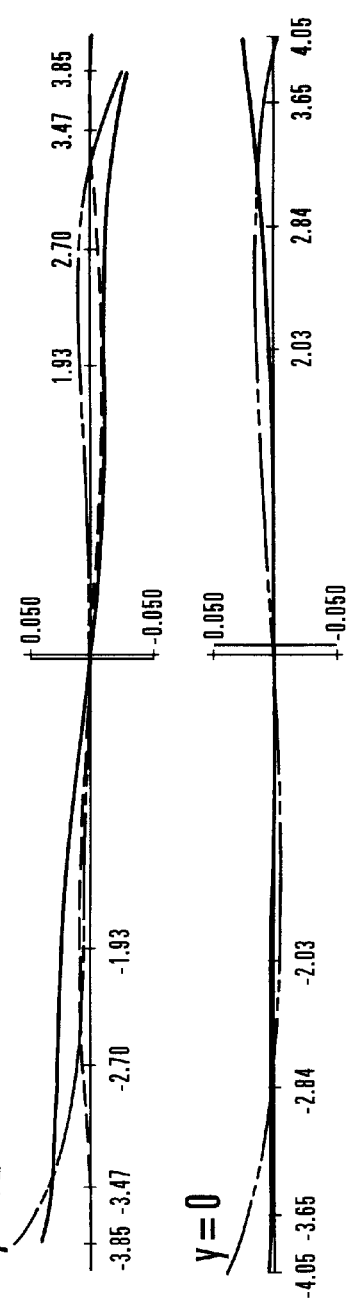
FIG.6A
FIG.6B
FIG.7A
FIG.7B
FIG.7C

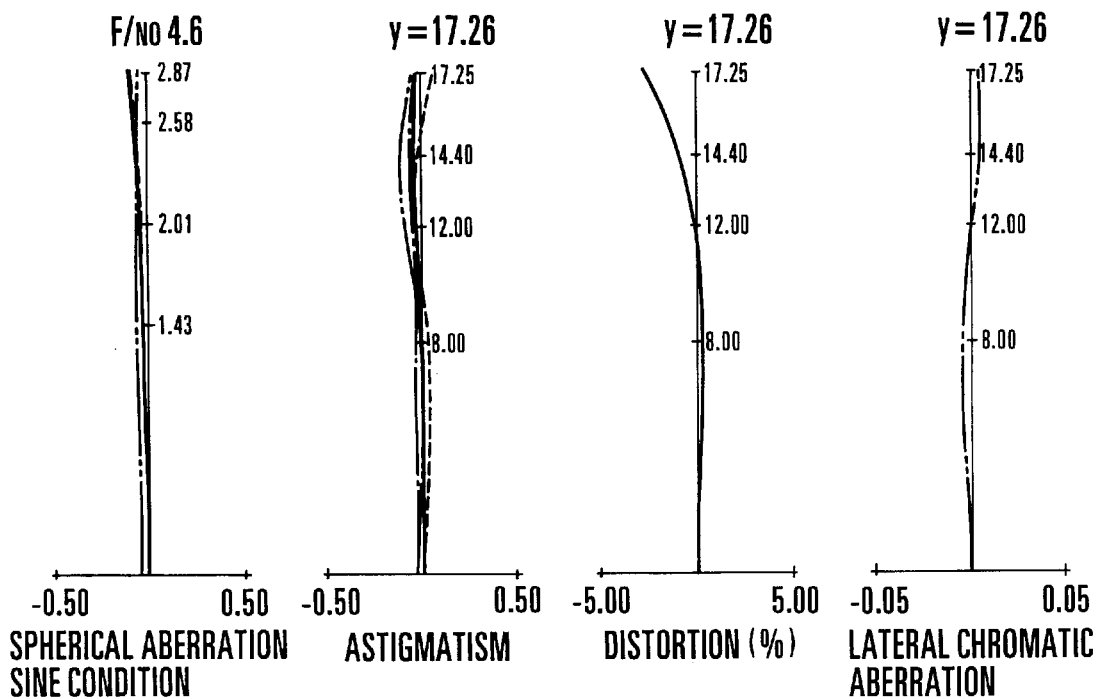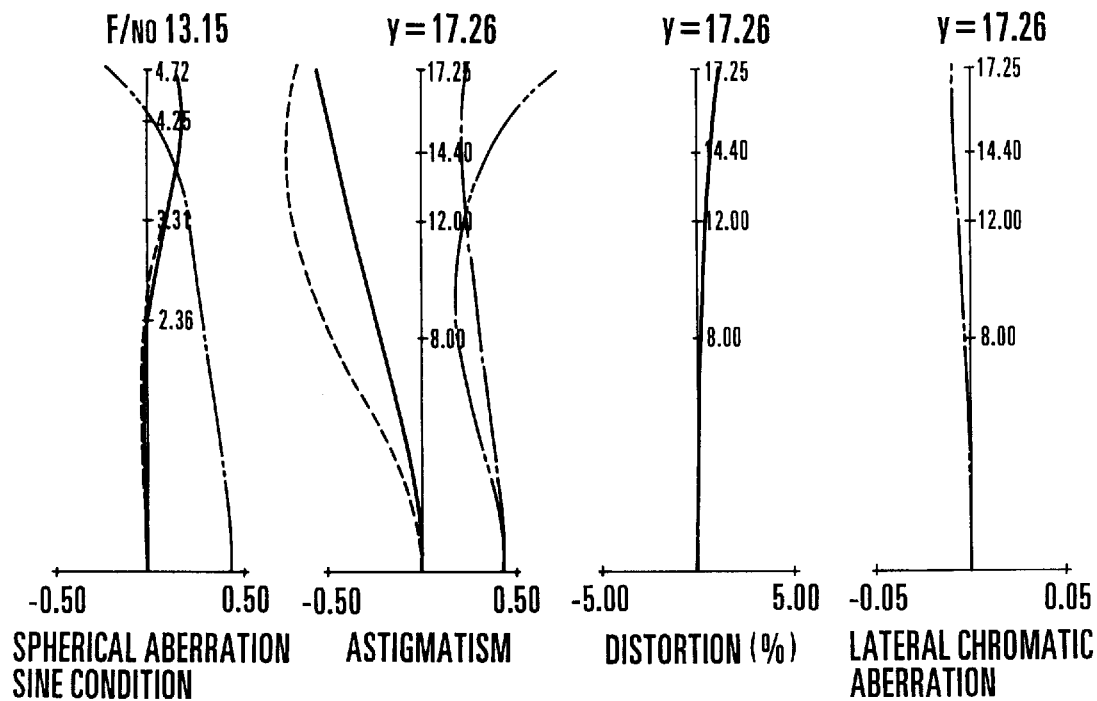

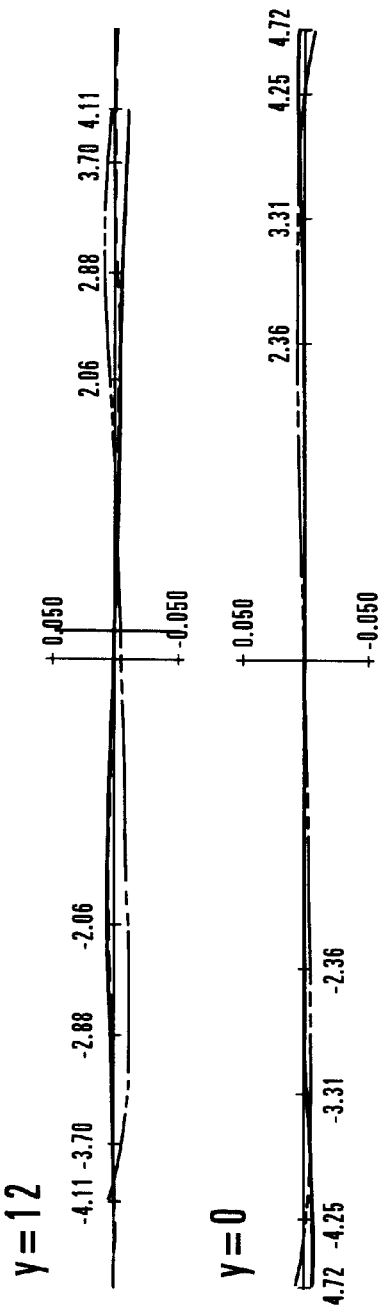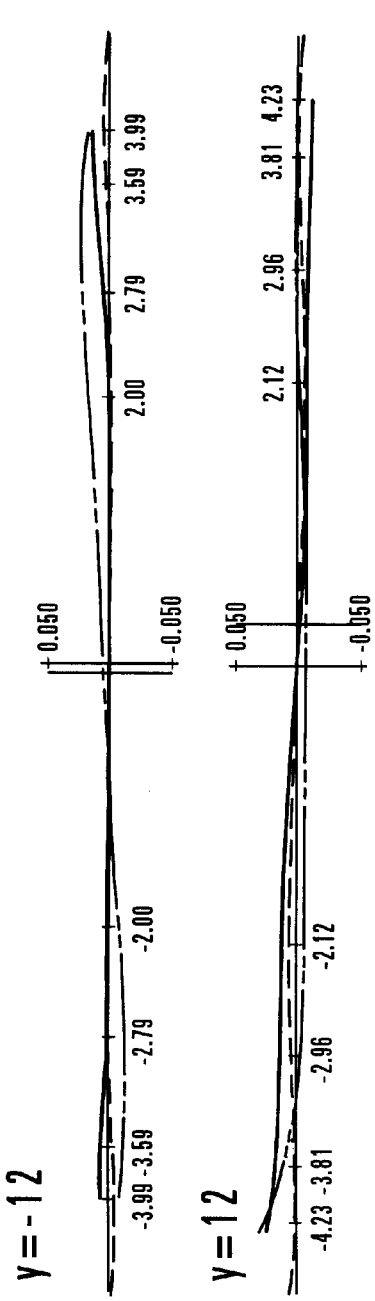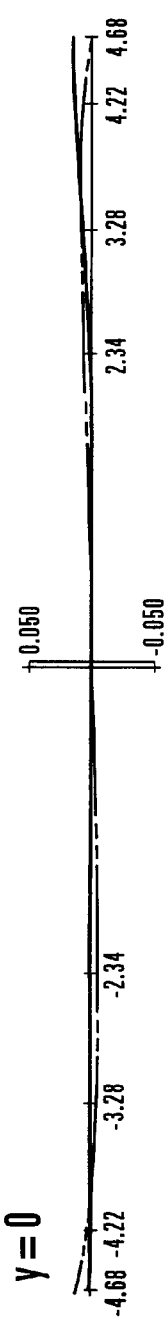
FIG.13A  FIG.13B  FIG.14A  FIG.14B  FIG.14C

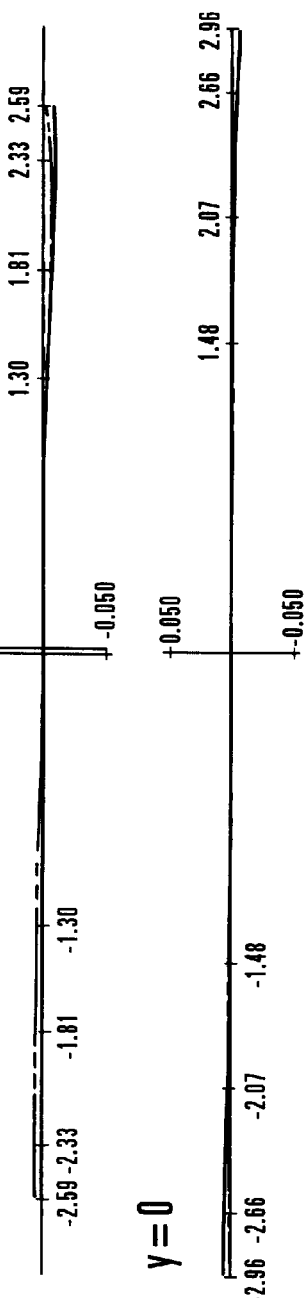
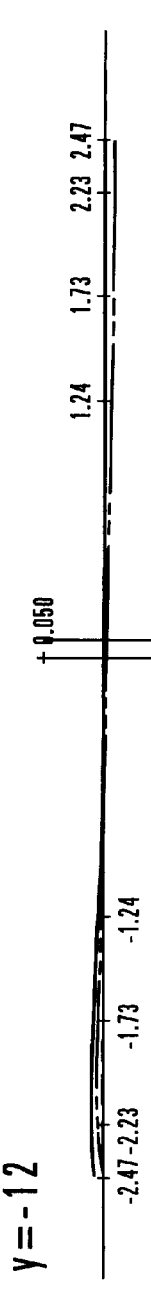
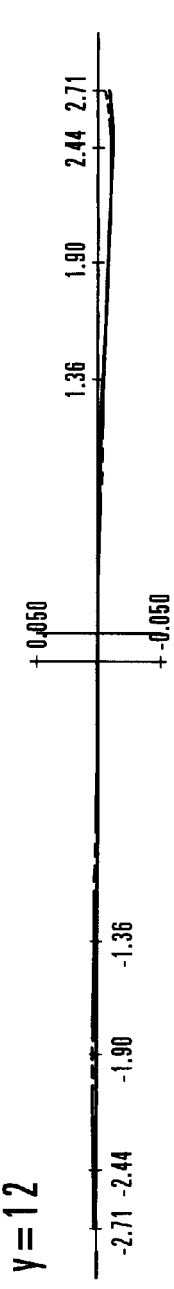
FIG.18A
FIG.18B
FIG.19A
FIG.19B
FIG.19C

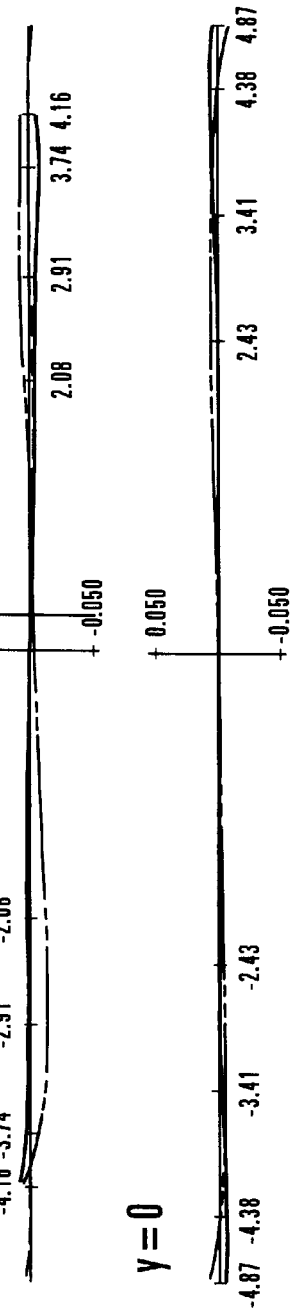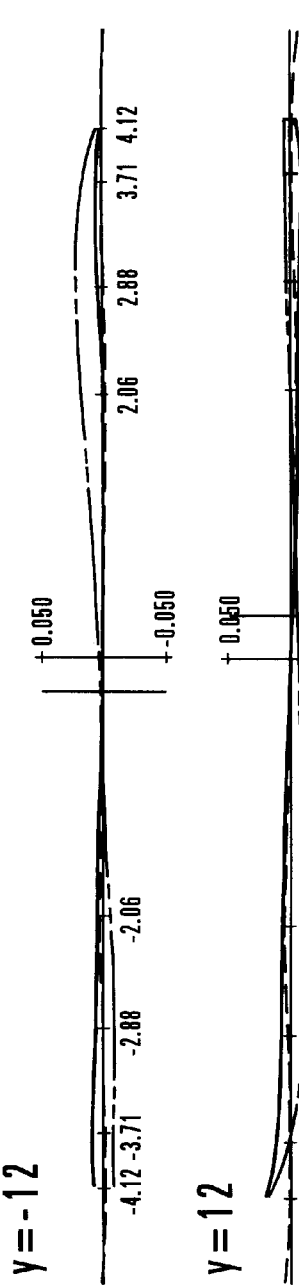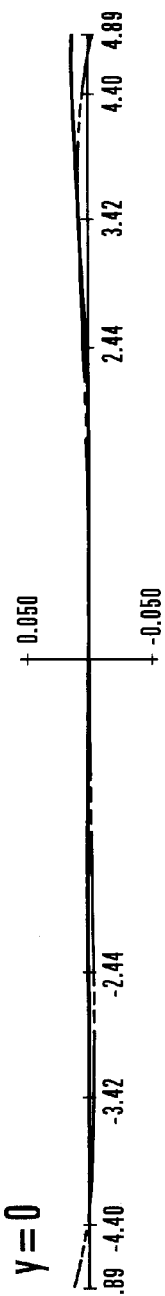
FIG.20A  FIG.20B  FIG.21A  FIG.21B  FIG.21C

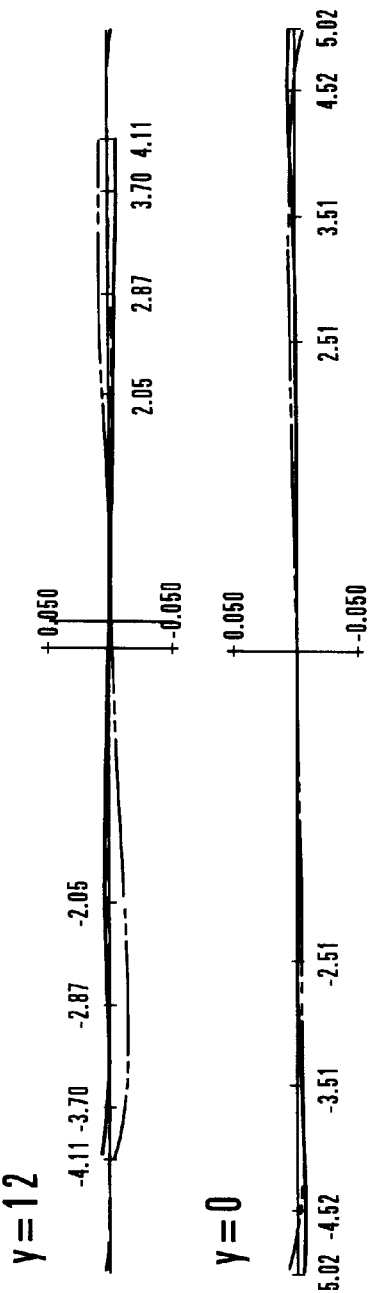
FIG.27A
FIG.27B
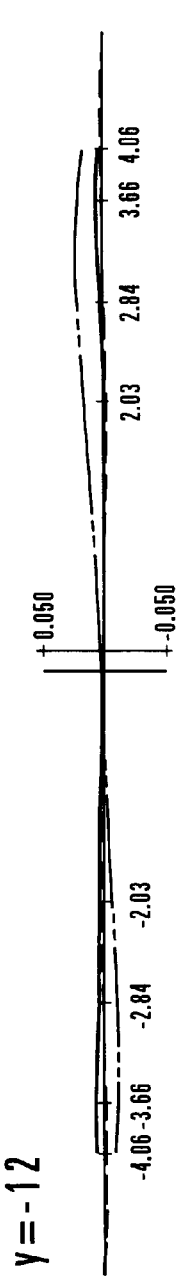
FIG.28A
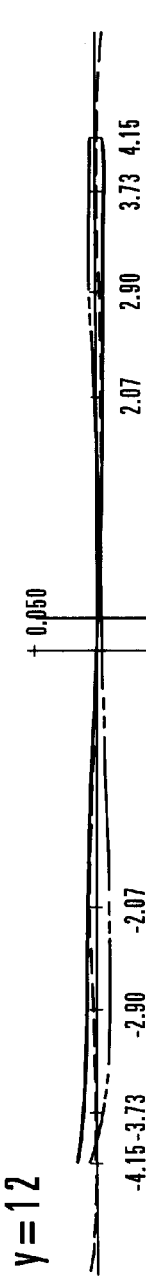
FIG.28B
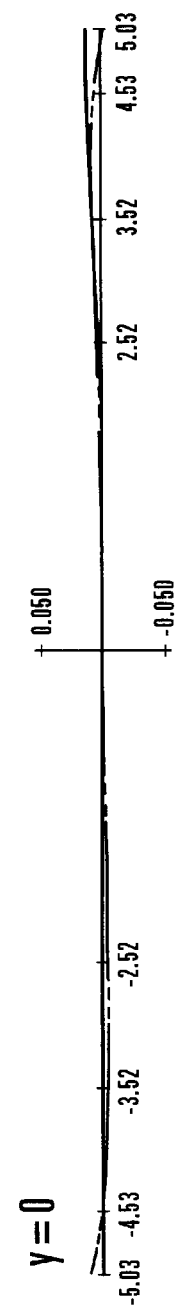
FIG.28C

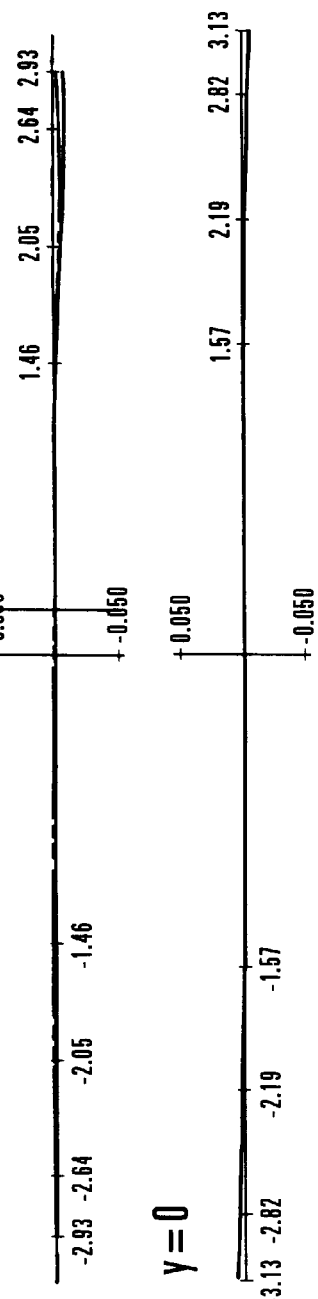
FIG.32A
FIG.32B
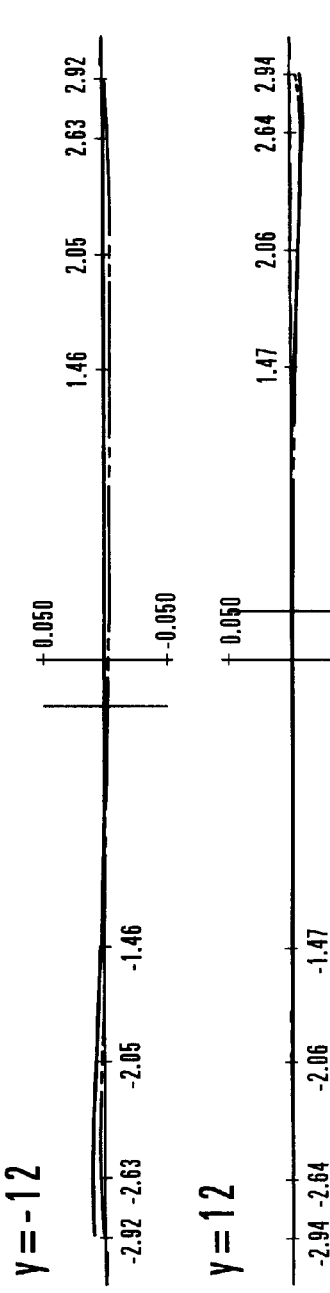
FIG.33A
FIG.33B
FIG.33C

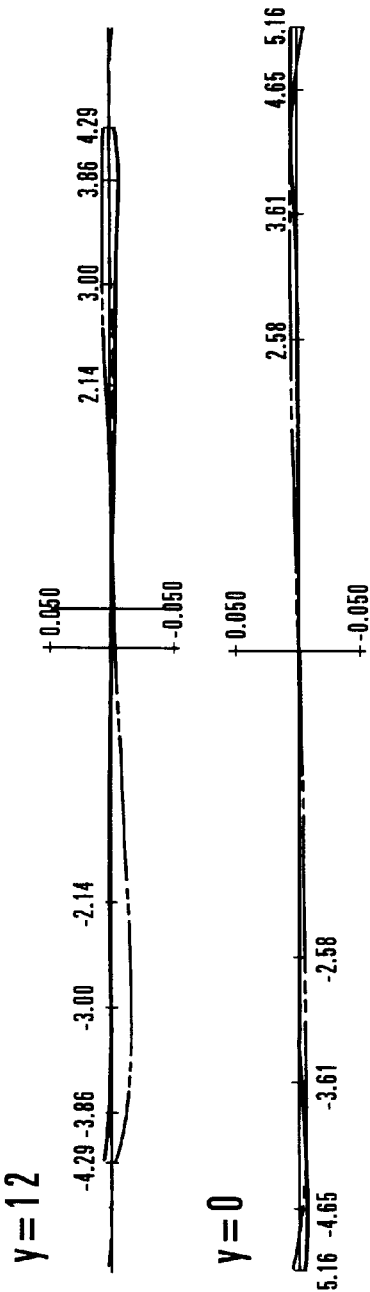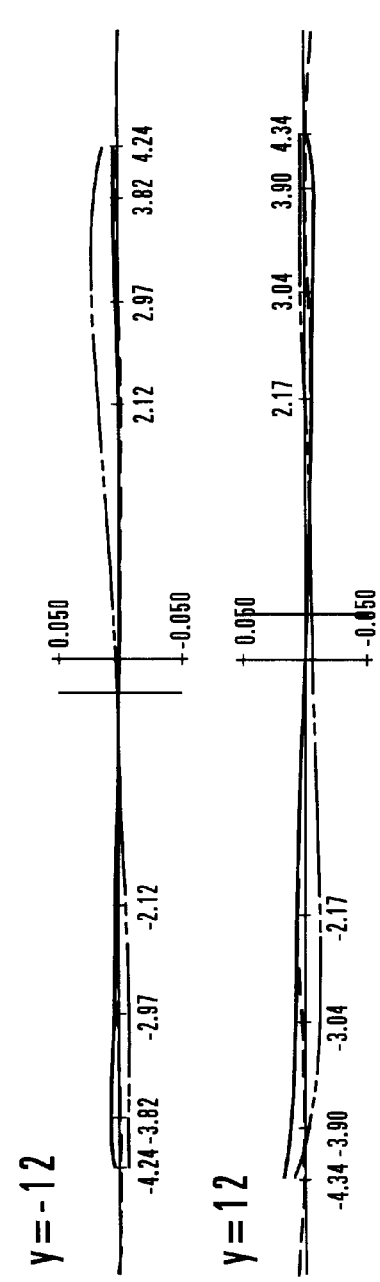
FIG.34A  FIG.34B  FIG.35A  FIG.35B  FIG.35C

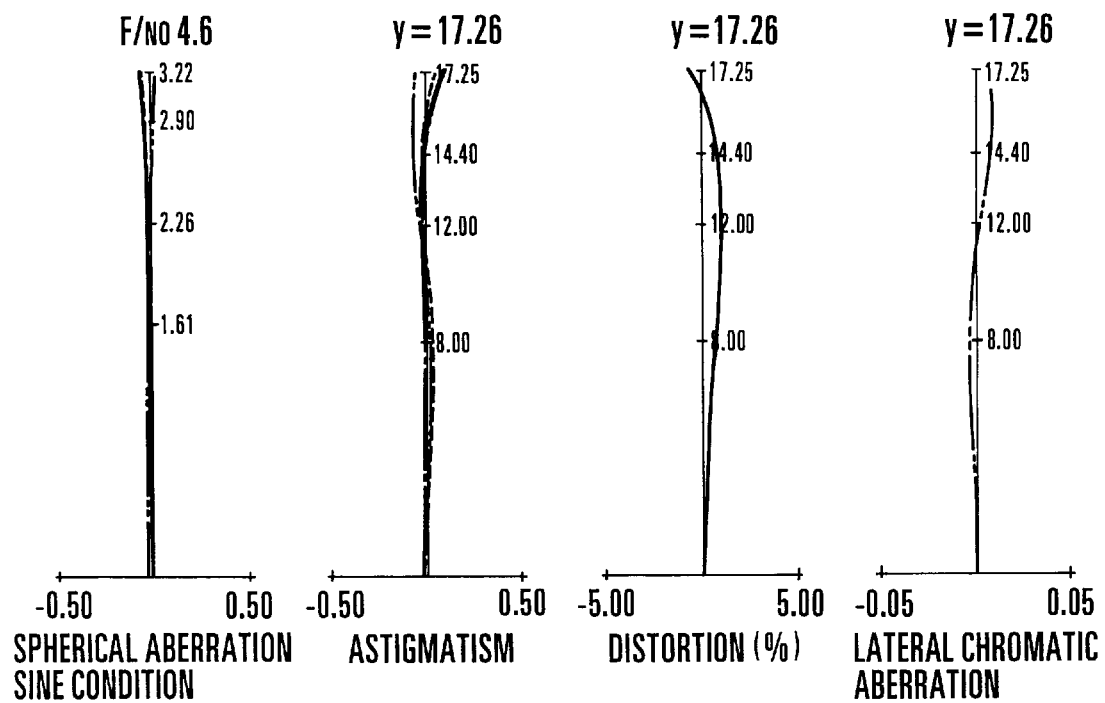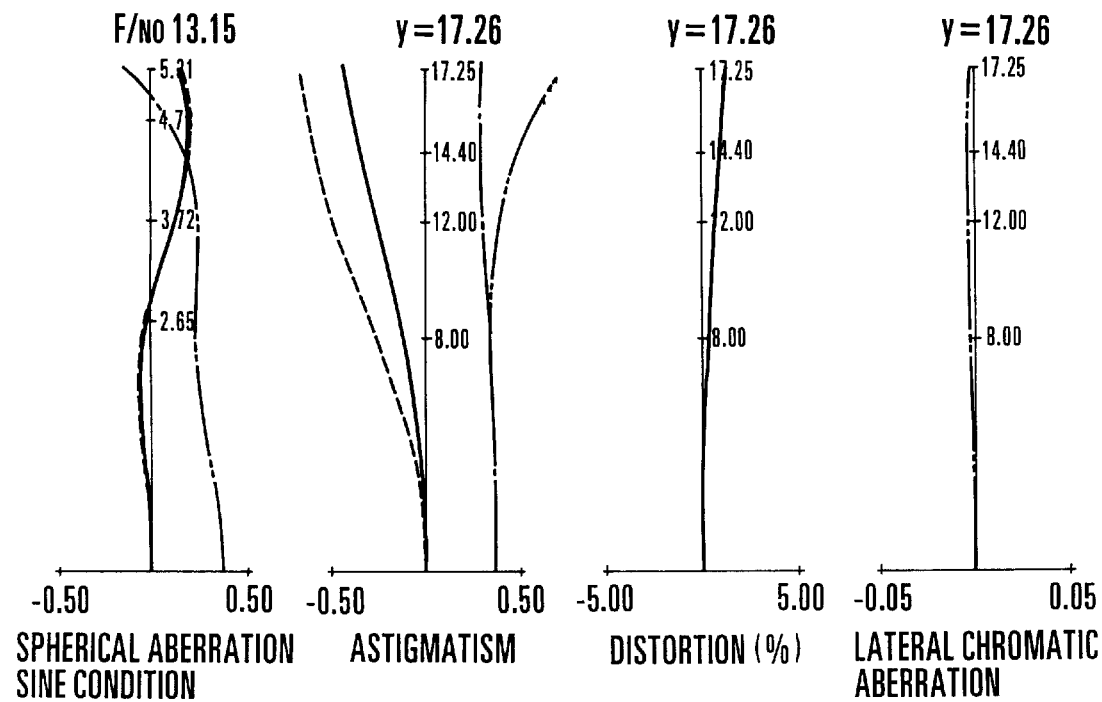

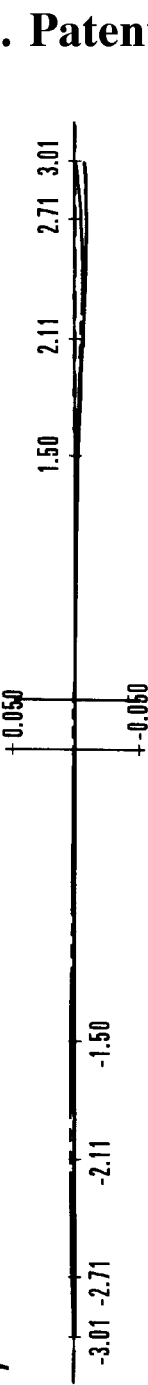
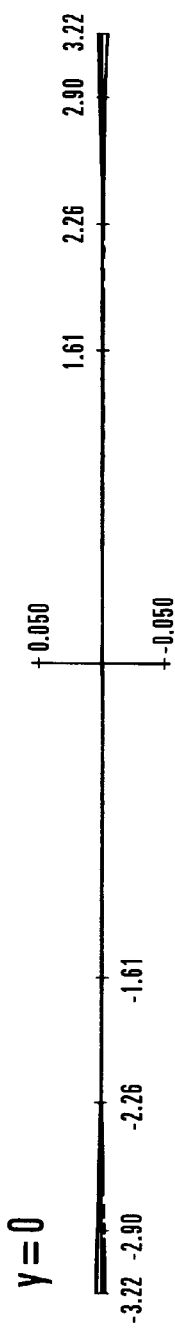
FIG.39A
FIG.39B
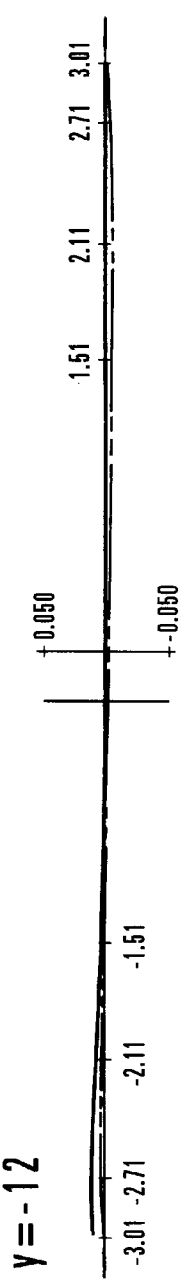
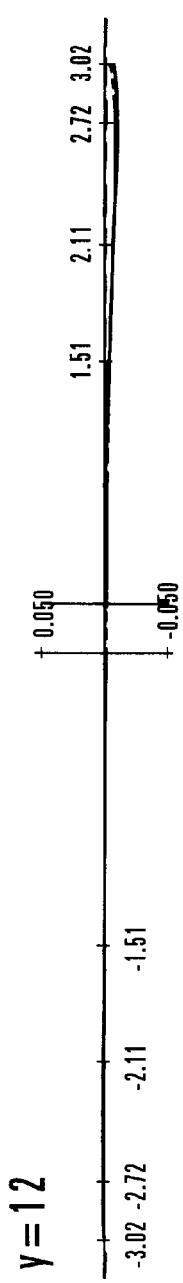
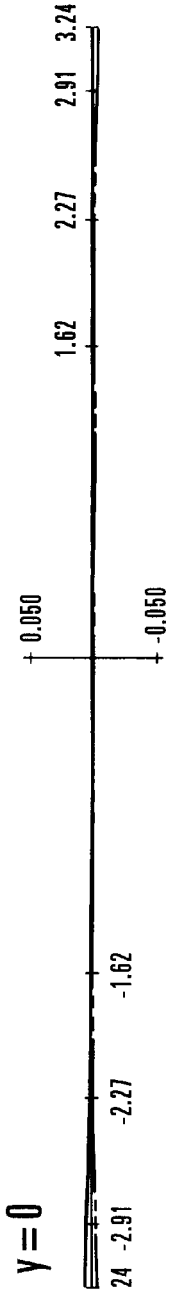
FIG.40A
FIG.40B
FIG.40C

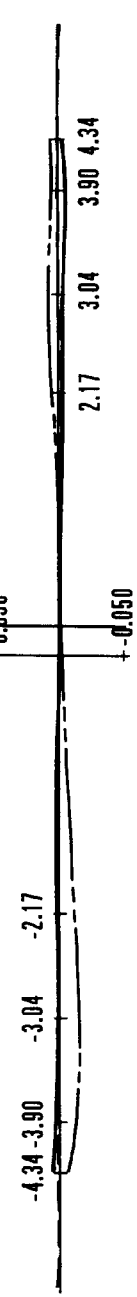
FIG.41A
FIG.41B
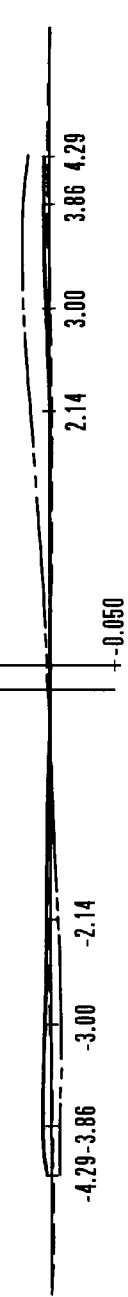
FIG.42A
FIG.42B
FIG.42C

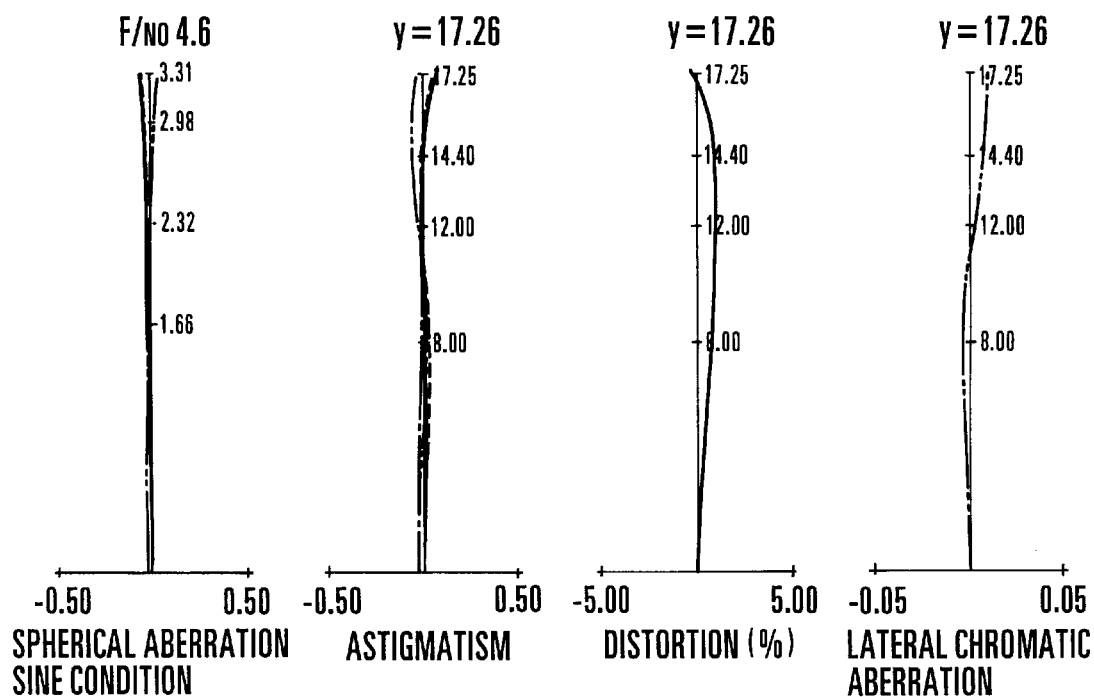
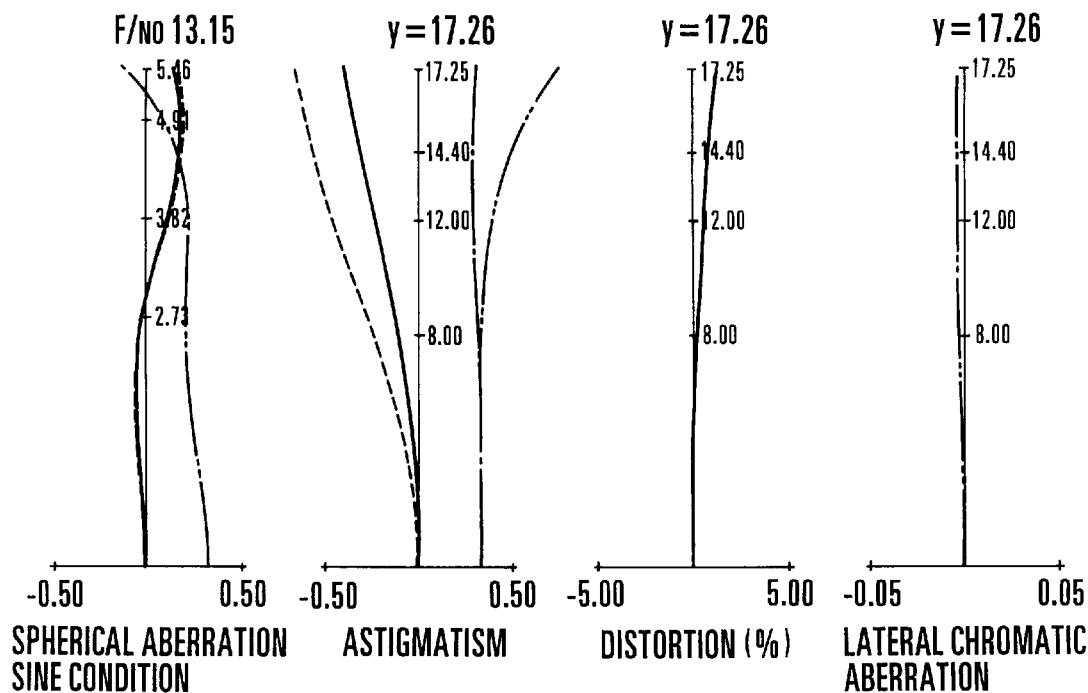

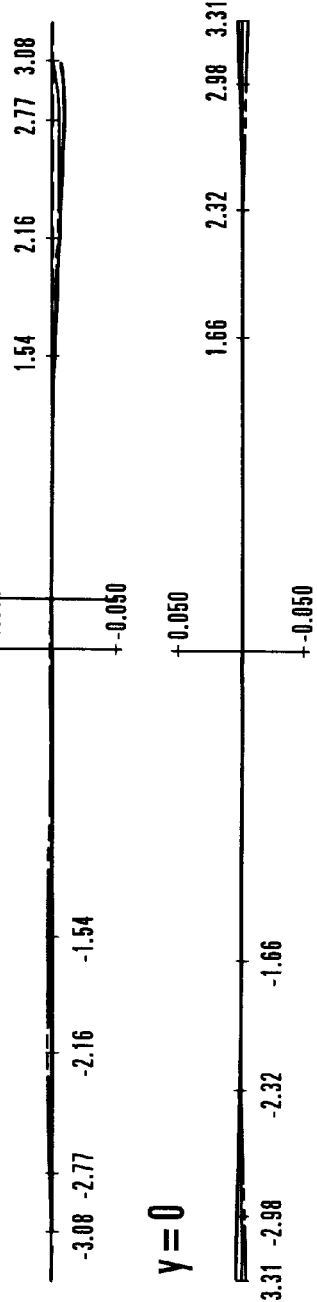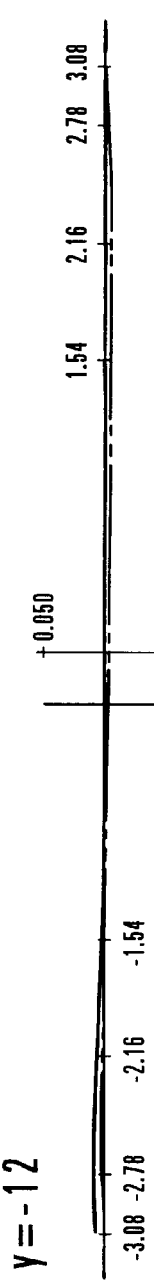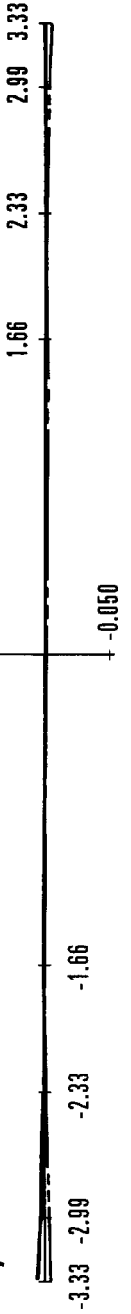
FIG.48A  FIG.48B  FIG.49A  FIG.49B  FIG.49C

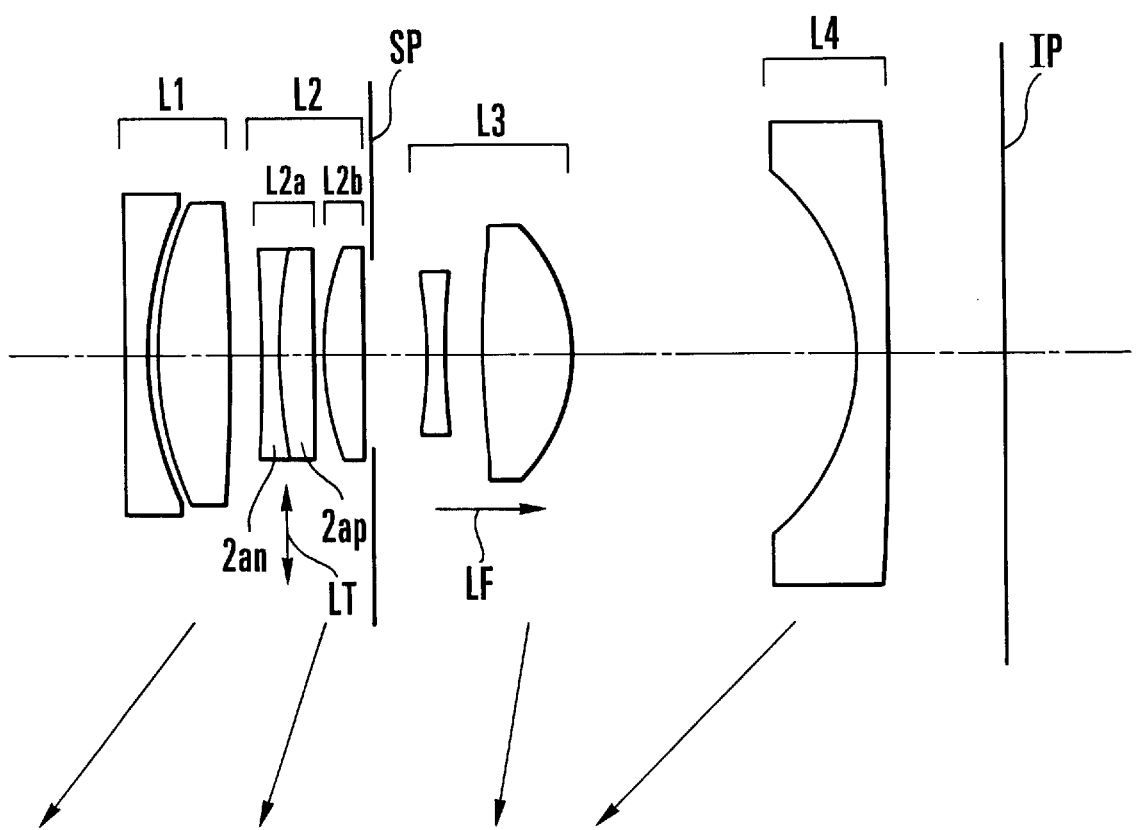
F I G. 50

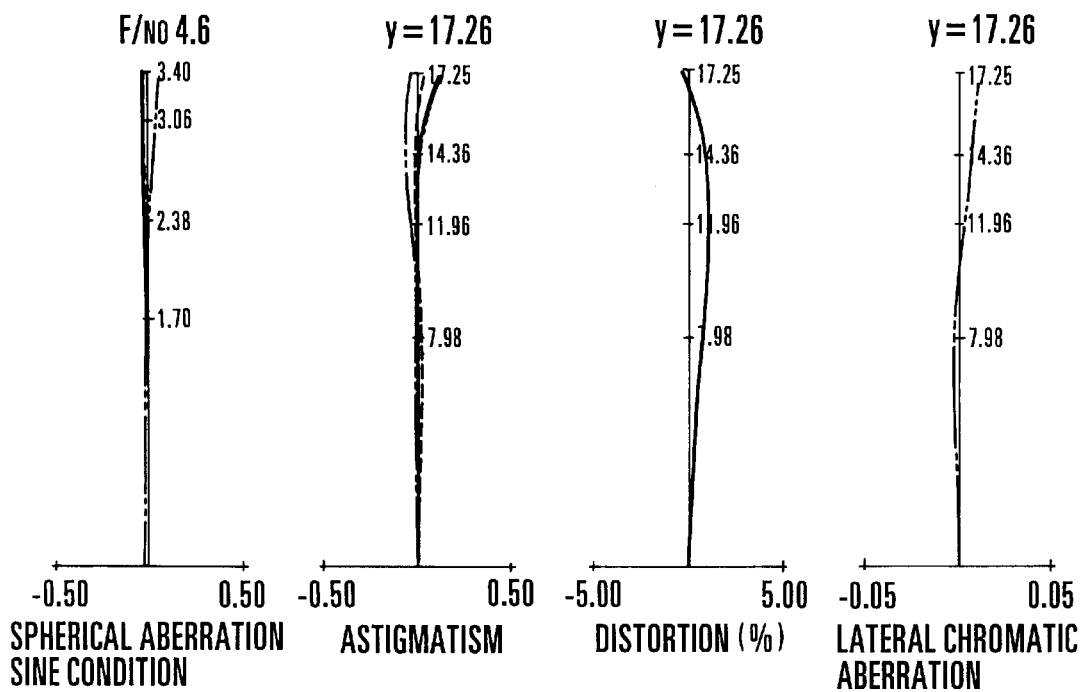
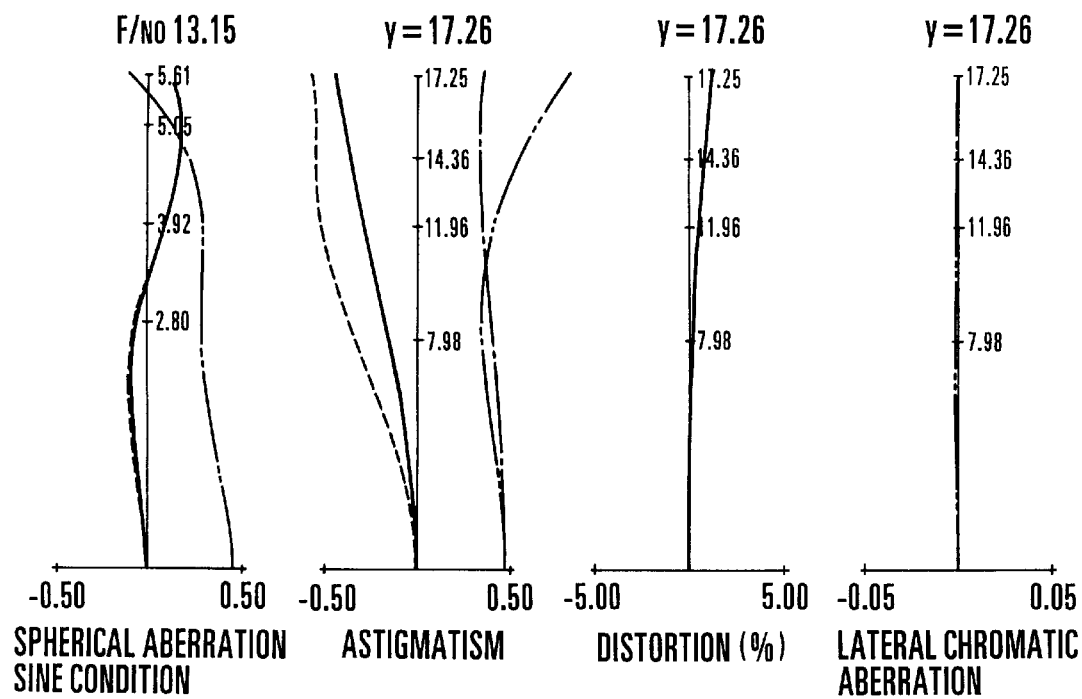

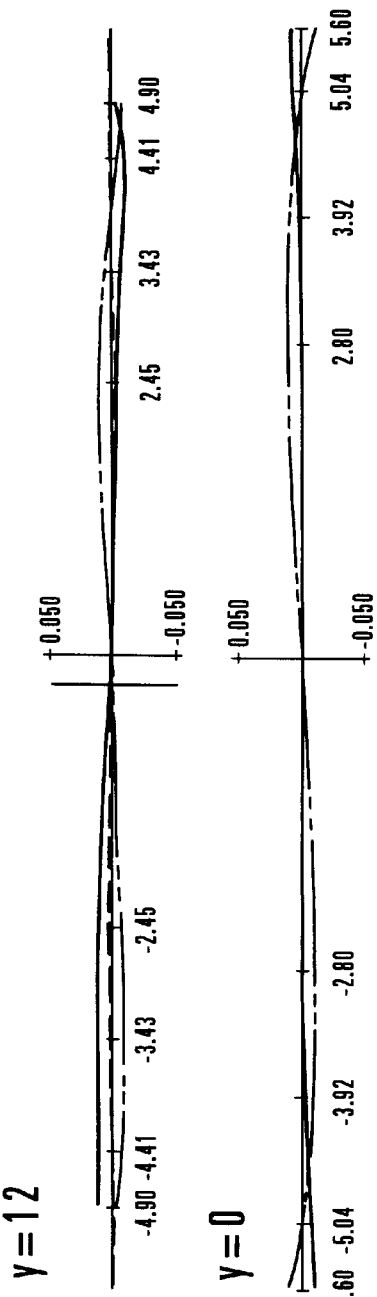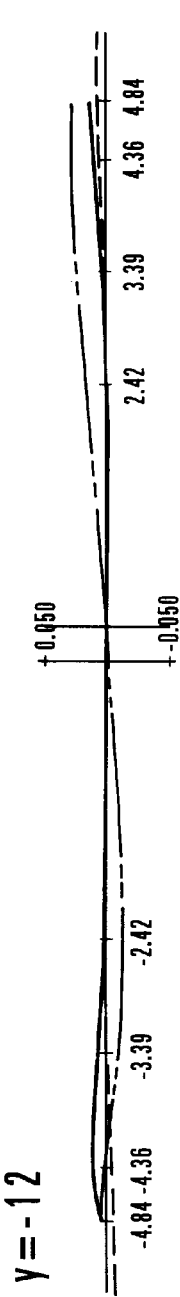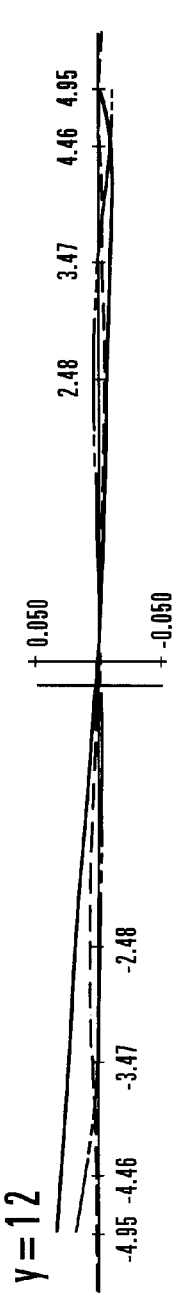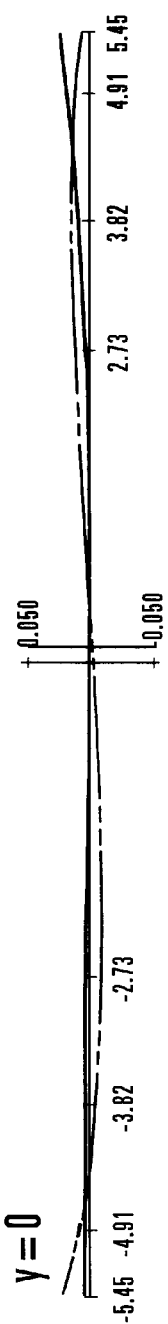
FIG.62A
FIG.62B
FIG.63A
FIG.63B
FIG.63C

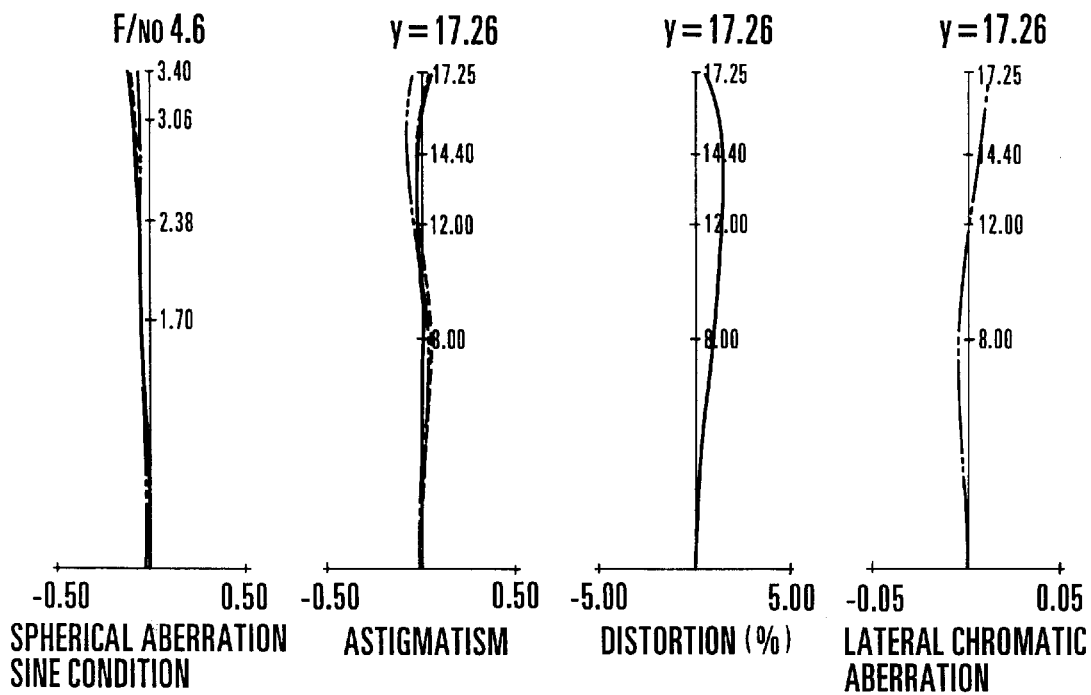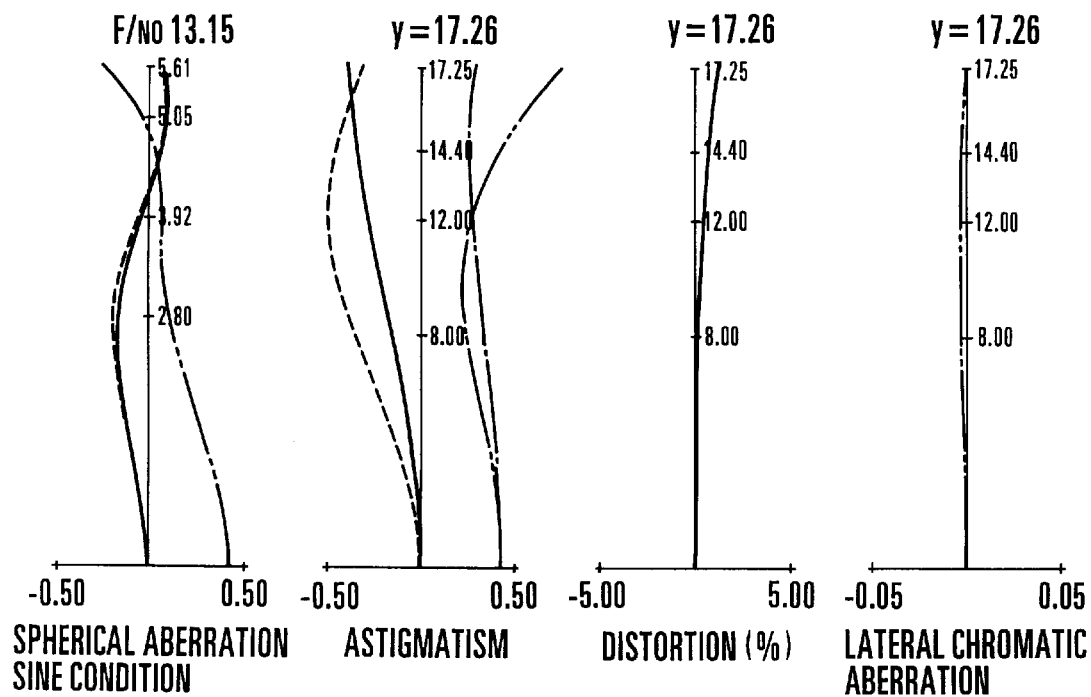

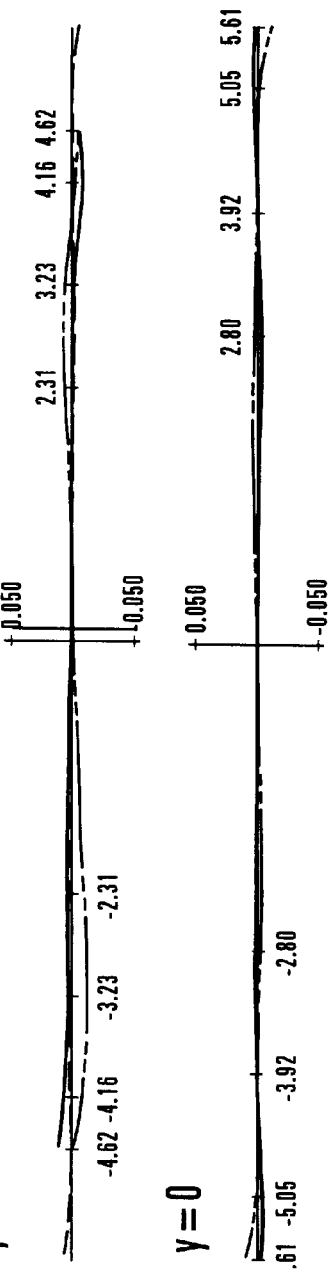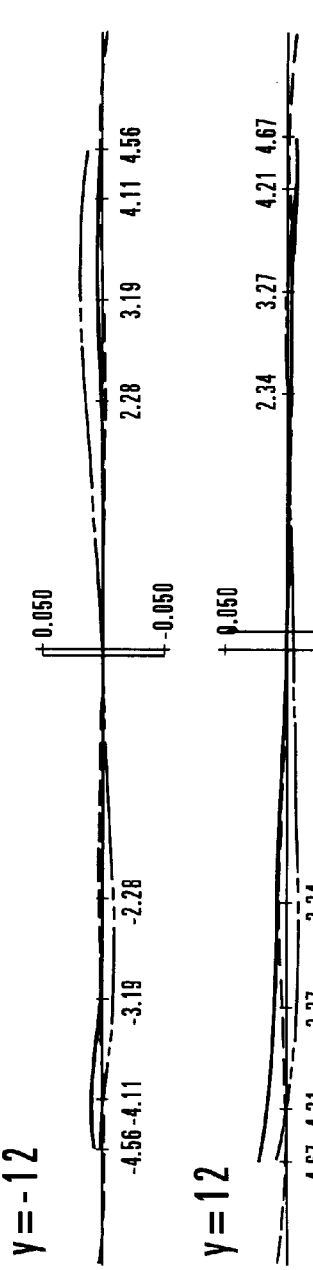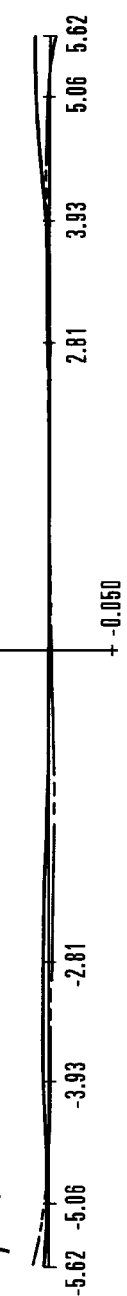
FIG.69A  FIG.69B  FIG.70A  FIG.70B  FIG.70C

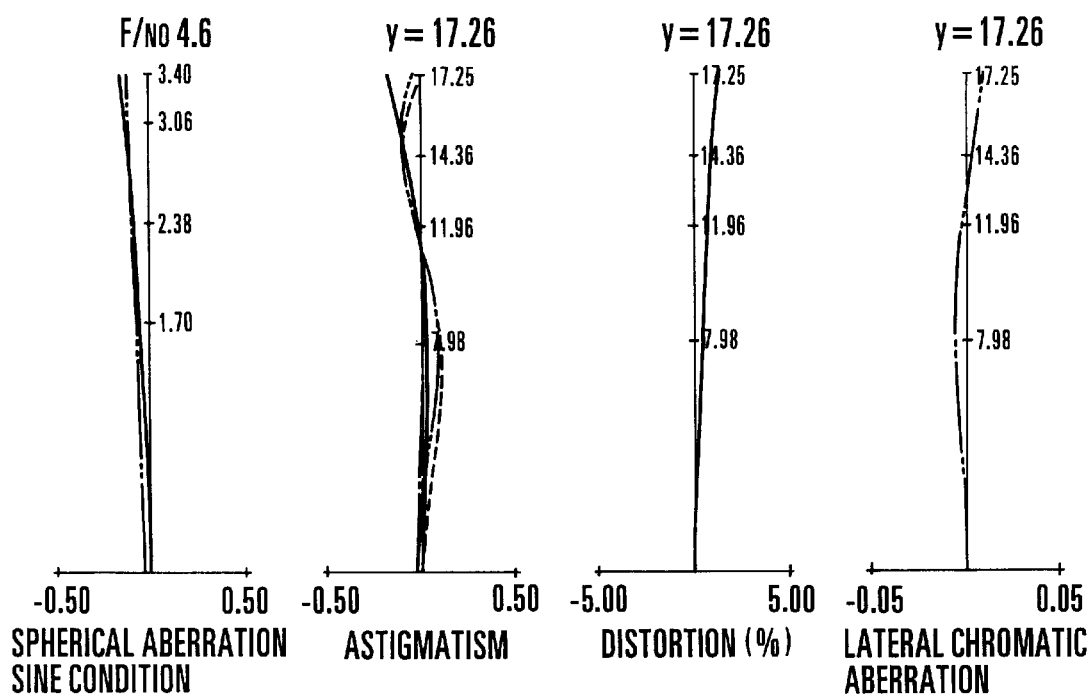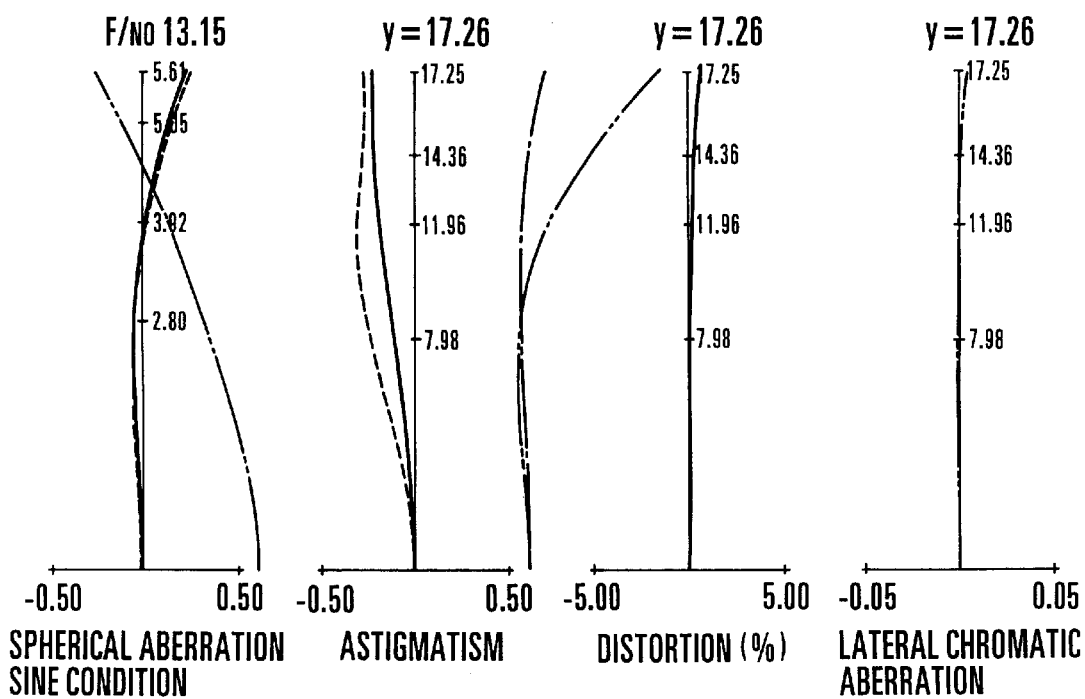

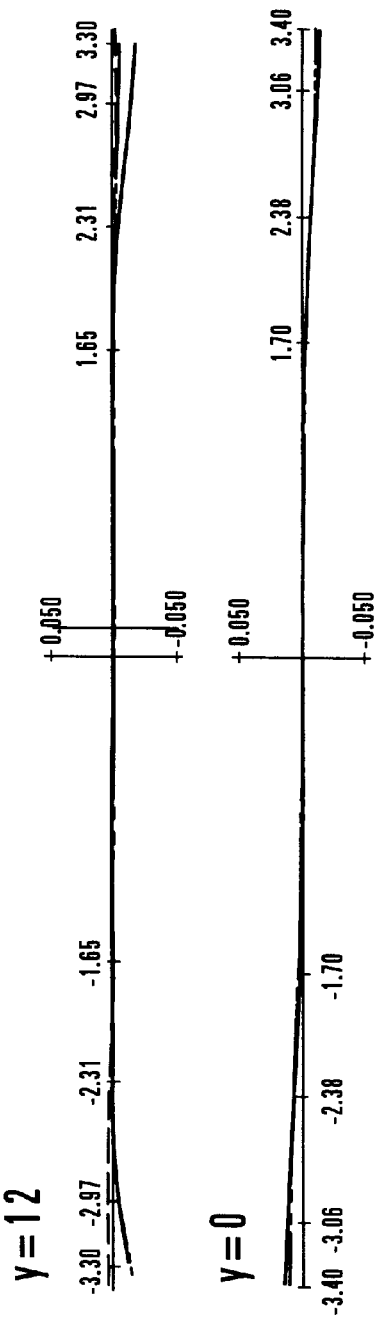
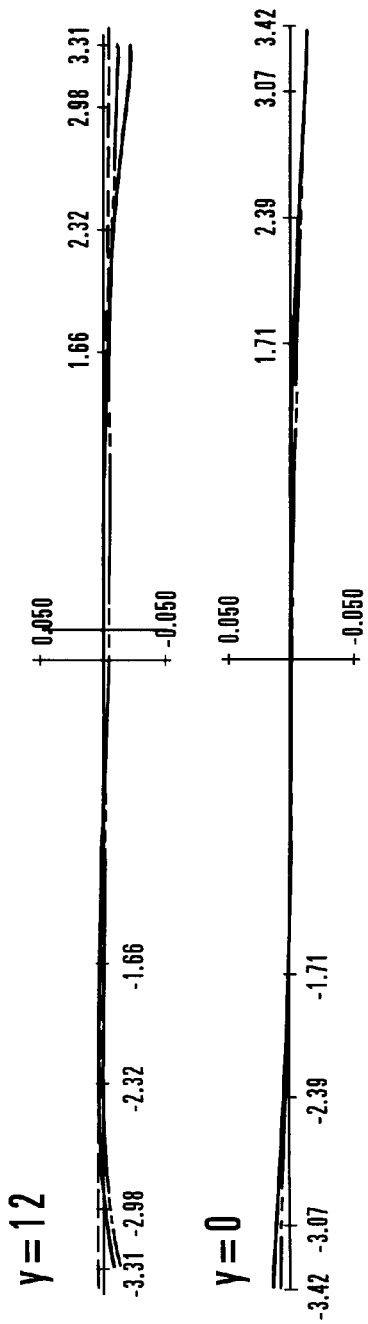
FIG.74A
FIG.74B
FIG.75A
FIG.75B
FIG.75C

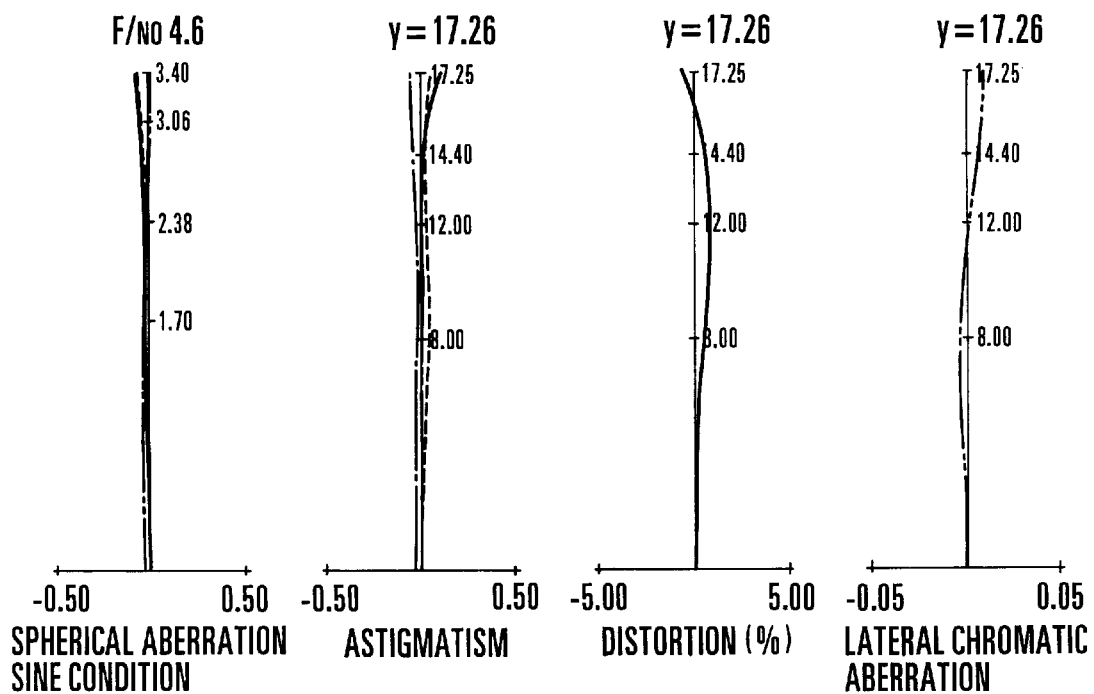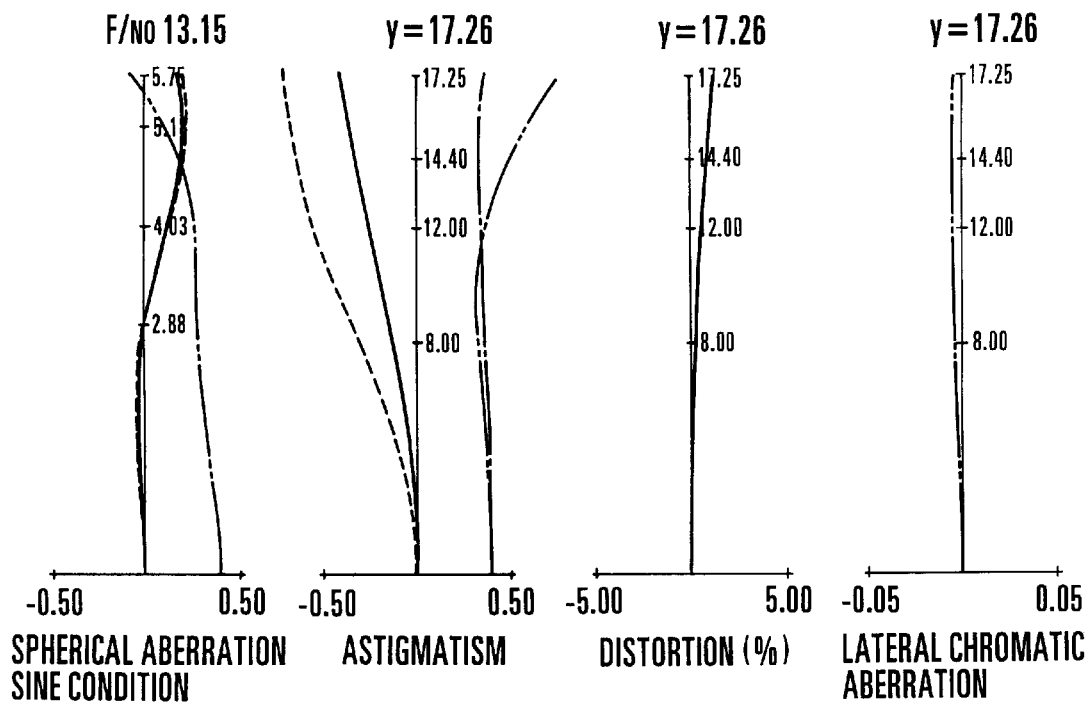

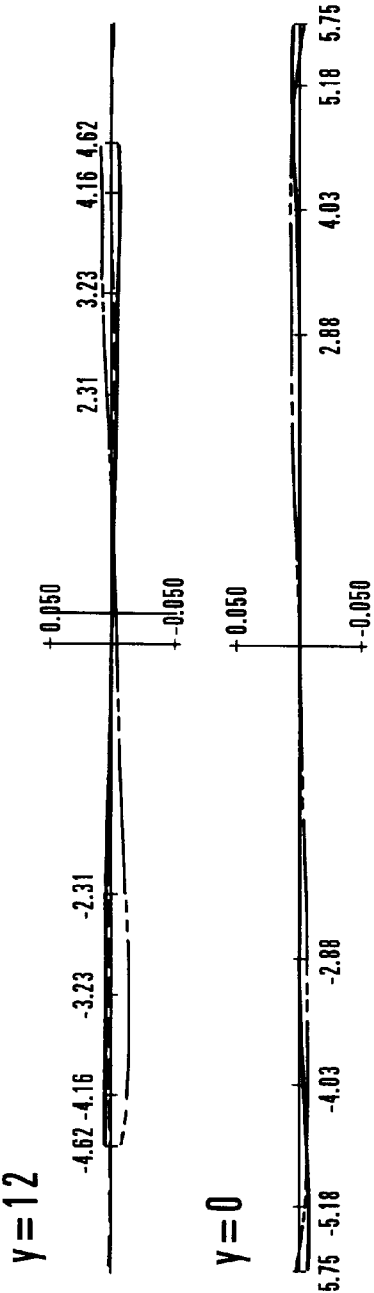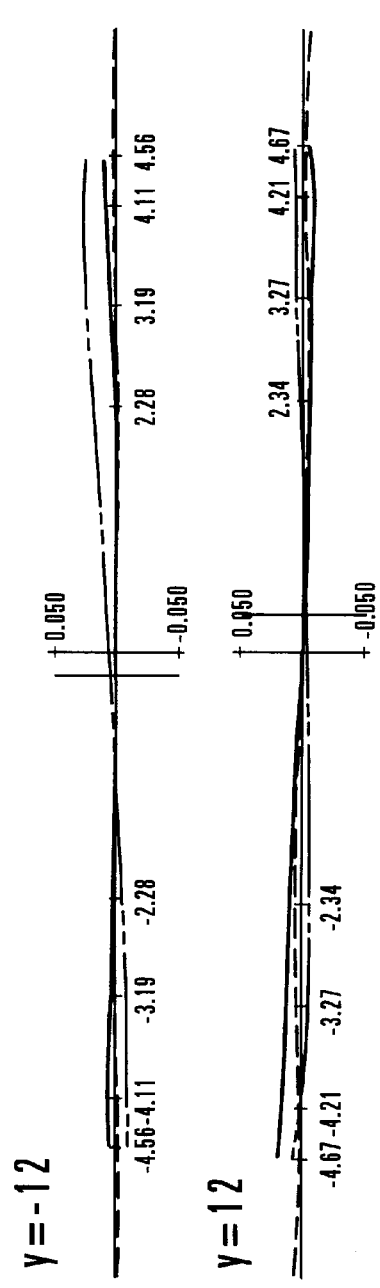
FIG.83A  FIG.83B  FIG.84A  FIG.84B  FIG.84C

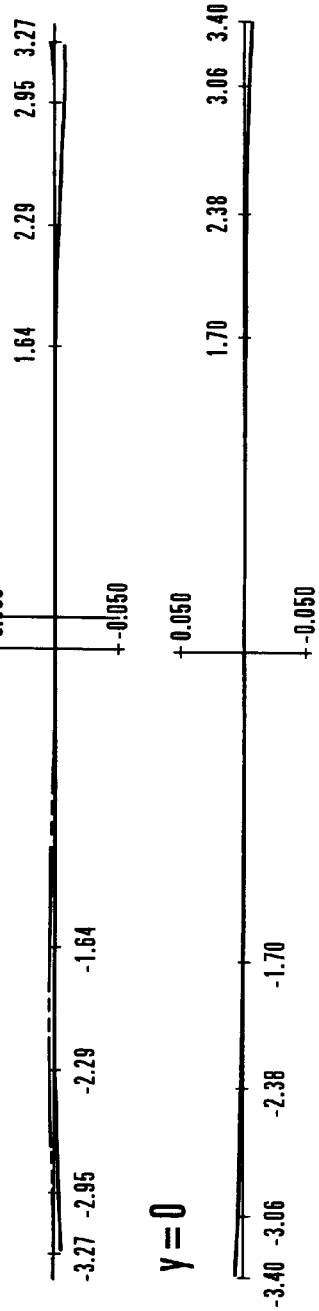
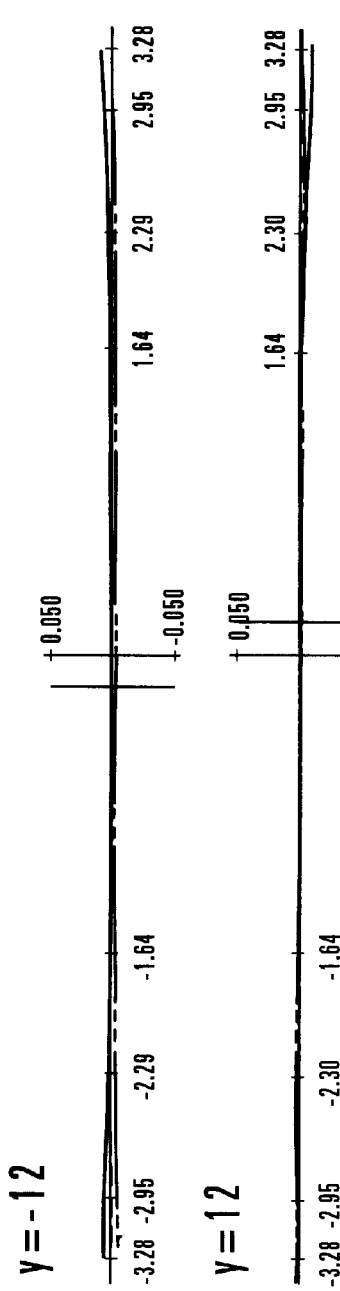
FIG.88A
FIG.88B
FIG.89A
FIG.89B
FIG.89C

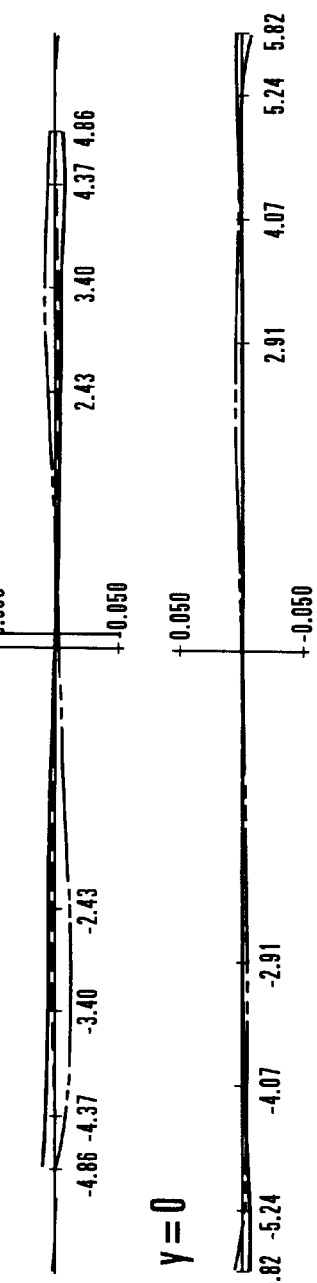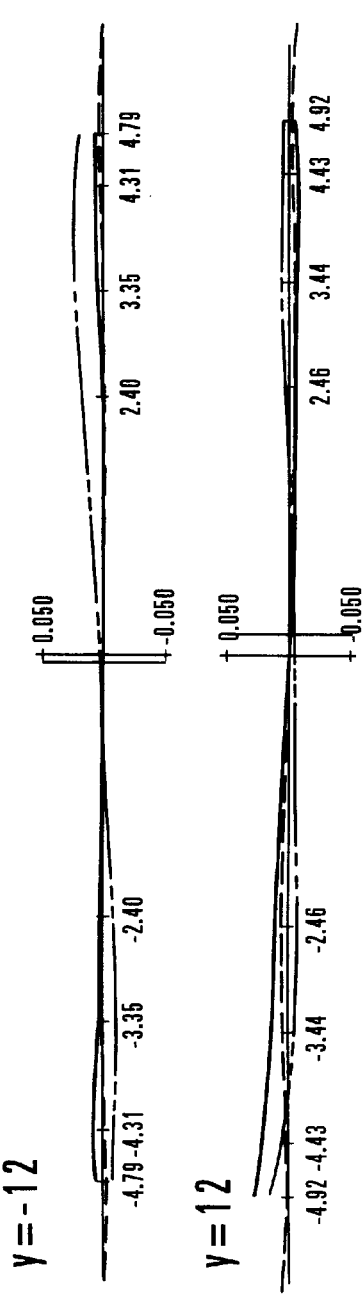
FIG.90A  FIG.90B  FIG.91A  FIG.91B  FIG.91C

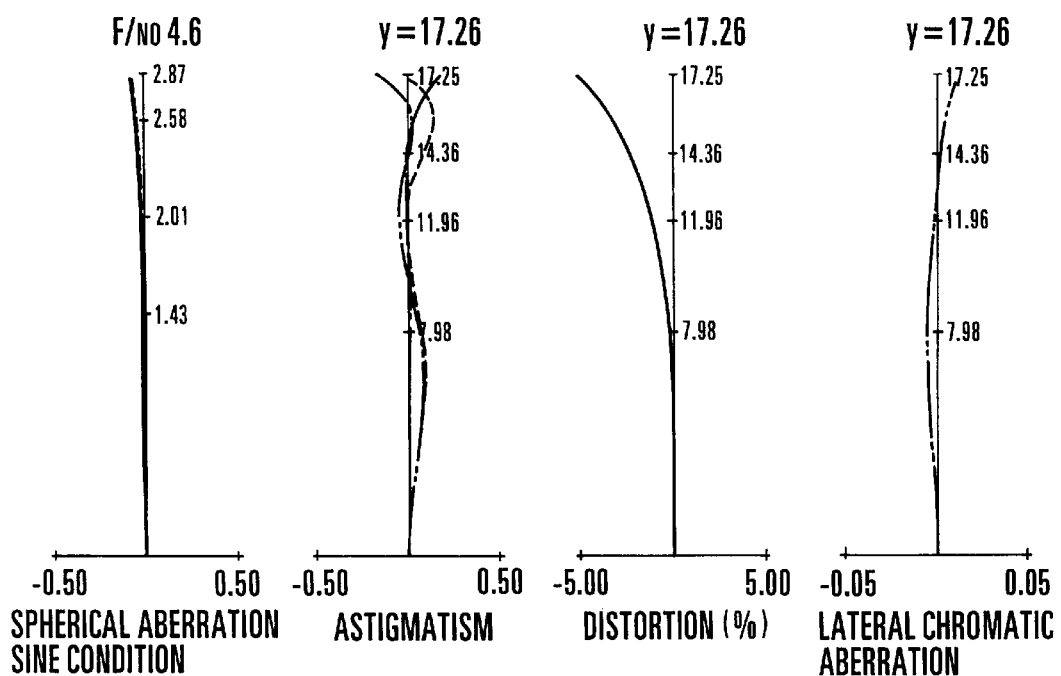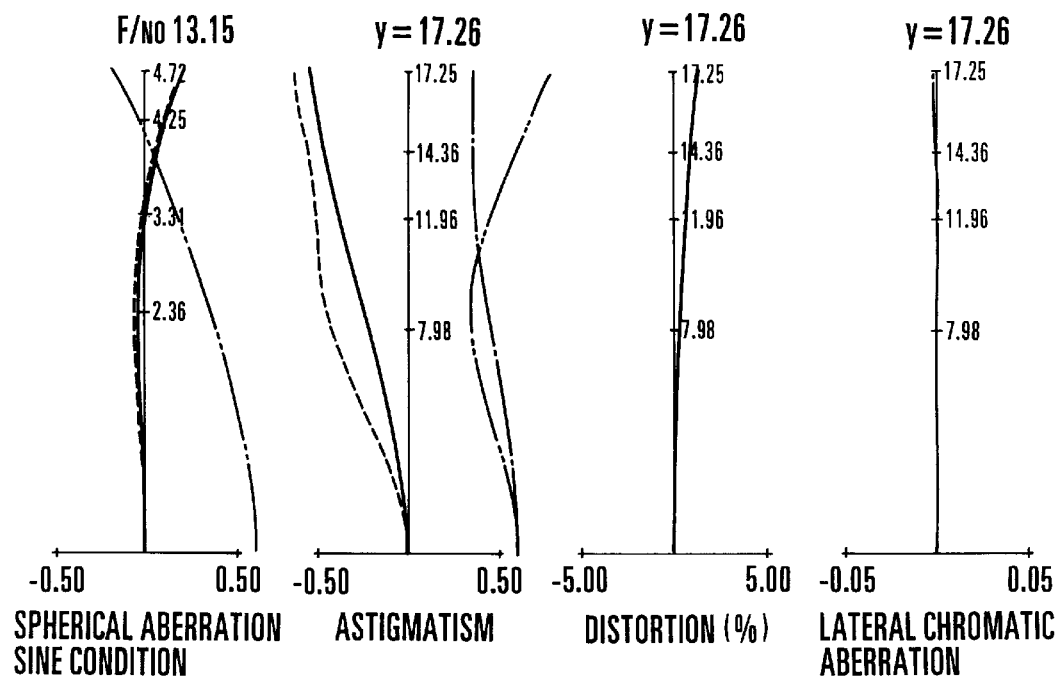

OPTICAL SYSTEM AND PHOTOGRAPHING APPARATUS HAVING IMAGE STABILIZING FUNCTION

BACKGROUND OF THE INVENTION

1. Field of the Invention

The present invention relates to an optical system having the function of automatically compensating for the shaking of a photographed image caused by the vibration of the optical system, i.e., the so-called image stabilizing function, and is more particularly directed to, for example, a 4-unit zoom lens whose back focal length is shortened to a compact size and which has a zoom ratio of about 5, wherein one of the lens units is made to move in directions perpendicular to an optical axis, while preventing the deterioration of optical performance from occurring when the image is stabilized, suitable for use as the optical system in silver-halide photography cameras, video cameras, electronic still cameras and the like.

2. Description of Related Art

When the housing of a photographic system tilts due to vibrations, the image at the focal plane changes its position by a distance depending on the tilt angle and the focal length of the photographic system. With a photographic apparatus for taking still pictures, therefore, in order to avoid deterioration of image quality, there has been a problem that the exposure time must be made short enough. Meanwhile, the motion picture camera has the problem that vibrations make it difficult to maintain the setting of a desired composition. For these reasons, a necessity arises for automatically compensating for the photographic system so that, even when the photographic system tilts due to vibrations, a change of the position of an image at the focal plane, i.e., the "shaking" of a photographed image, does not occur.

Attempts have been made to compensate for the image shaking by driving an optical element constituting part of the photographic system. As the arrangement of the optical element differs with different optical systems, a wide variety of methods of optically compensating for image shaking have been proposed.

In general, such optical methods of image stabilization have important prerequisites that the operating mechanism be relatively simple in construction, that the optical element to be used be as light in weight as possible, that the amount of driving be as small as possible, and that good optical performance be maintained against vibrations throughout as wide a range of tilt angles as possible. Also, in recent years, the development of high-range zoom lenses is flourishing. With such lenses, particularly in a telephoto setting, a large amount of image shaking is likely to occur. Because of this, a capability of compensating for image shaking is taken seriously. So, other attempts have been made to reconcile the above-described prerequisites and the extension of the zooming range toward longer focal lengths. With this in mind, many zoom lenses have been proposed.

Here, as the optical image stabilizing methods, there are a shift-image stabilizing method in which one of the lens units as a whole or in part is displaced in directions perpendicular to the optical axis, a tilt image stabilizing method in which one of the lens units as a whole or in part is rotated about an axis perpendicular to the optical axis, a variable-angle-prism image stabilizing method in which a variable-angle prism formed by filling a liquid of relatively high transmittance, such as silicon oil, in between a pair of transparent plates, is disposed near or inside the photographic optical system and the transparent plate is made to tilt with regard to the optical axis so as to effect image stabilization by the prism action, and so on. Many examples of application of these methods to zoom lenses are also known.

Among such methods of optically compensating for image shaking, the shift-image stabilizing method is widely used, although it is slightly inferior in the degree of freedom of aberration correction to the tilt image stabilizing method that allows relatively free choice of a position at which to put the axis of rotation, because the shift-image stabilizing method has the advantage that the operating mechanism for the lens unit is relatively simple. Another advantage of the shift-image stabilizing method is that, as compared even with the variable-angle-prism image stabilizing method, the chromatic aberrations of the stabilized optical system can be corrected with a greater degree of freedom. Thus, the shift-image stabilizing method has a relatively simple form, and still gets a relatively high optical performance.

Image-stabilizing zoom lenses employing such a shift-image stabilizing method have been proposed in, for example, Japanese Laid-Open Patent Applications No. Hei 6-265827, No. Hei 7-318865 and No. Hei 8-82769.

In Japanese Laid-Open Patent Application No. Hei 6-265827, there is disclosed a zoom lens comprising, in order from an object side, a first lens unit of positive refractive power, a second lens unit of positive refractive power and a third lens unit of negative refractive power, totaling three lens units. During zooming from the wide-angle end to the telephoto end, the separation between the first and second lens units increases, while the separation between the second and third lens units decreases. The second lens unit is divided into a front lens subunit and a rear lens subunit. The rear lens subunit is made to shift so as to effect image stabilization.

In Japanese Laid-Open Patent Application No. Hei 7-318865, there is disclosed a zoom lens comprising, in order from an object side, a first lens unit of positive refractive power, a second lens unit of negative refractive power, a third lens unit of positive refractive power, a fourth lens unit of positive refractive power and a fifth lens unit of negative refractive power. During zooming from the wide-angle end to the telephoto end, at least the first and fifth lens units are made to move toward the object side in such relation that the separation between the first and second lens units increases, the separation between the second and third lens units decreases, the separation between the third and fourth lens units increases and the separation between the fourth and fifth lens units decreases. The fourth lens unit is made to shift so as to effect image stabilization.

In Japanese Laid-Open Patent Application No. Hei 8-82769, there is disclosed a zoom lens comprising, in order from an object side, a first lens unit of positive refractive power, a second lens unit of positive refractive power, a stop and a third lens unit of negative refractive power. During zooming from the wide-angle end to the telephoto end, the separation between the first and second lens units increases, while the separation between the second and third lens units decreases. The second lens unit is made to shift so as to effect image stabilization.

The zoom lens proposed in Japanese Laid-Open Patent Application No. Hei 6-265827 has a zoom ratio as low as 2.6. Assuming that, with this configuration left unchanged, the zoom ratio is increased to 5 or thereabout, then the aberrations occurring during image stabilization, of course, and the ones in the normal state, too, deteriorate greatly. Hence, there is a problem that the aberrations can not be corrected well.

Also, because the image-stabilizing lens unit has a large number of constituent lenses, the lens weight is relatively heavy. Then, supposing the zoom ratio is increased and all aberrations occurring during image stabilization are corrected, a problem arises in that the number of constituent lenses increases greatly, which, in turn, causes an unduly great increase of the load on the operating mechanism during image stabilization.

Further, the zoom lens proposed in Japanese Laid-Open Patent Application No. Hei 7-318865 has a slightly higher zoom ratio at about 3.3. The form of the image-stabilizing lens unit is relatively simple. However, the aberrations deteriorate greatly during image stabilization. Therefore, a problem arises in that a further increase of the zoom ratio makes the deterioration of the aberrations unacceptable.

Further, the zoom lens proposed in Japanese Laid-Open Patent Application No. Hei 8-82769 is relatively high in the zoom ratio; particularly, for the embodiment 2 thereof, the zoom ratio is about 3.9. The aberrations occurring during image stabilization are corrected relatively well over a relatively wide range of angles of image stabilization. However, a large number of constituent lenses are used in the image-stabilizing lens unit. Therefore, a problem arises in that a large load is put on the operating mechanism during image stabilization. Moreover, in order to increase the zoom ratio to 5 or thereabout, the number of constituent lenses increases greatly, causing a great increase of the size of the lens system. It is, therefore, difficult to correct the aberrations for both of the normal state and the image stabilizing state while maintaining simple and compact form.

BRIEF SUMMARY OF THE INVENTION

The present invention is applied to an optical system in which one of lens units of the optical system is moved to decenter at least in directions perpendicular to an optical axis so as to compensate for the displacement (shaking) of a photographed image. In the optical system, all the lens elements are appropriately arranged to correct various decentering aberrations despite a great increase of the zoom ratio. Also, a possibility is realized that a small enough decentering movement suffices for a large enough displacement compensation. It is, therefore, an object of the invention to provide an optical system having the image stabilizing function in simple form, while still permitting a good stability of optical performance to be maintained between the normal state and the image stabilizing state.

To attain the above object, in accordance with an aspect of the invention, there is provided an optical system having an image stabilizing function, which comprises, in order from an object side, a first lens unit of positive refractive power, a second lens unit of positive refractive power, a third lens unit of positive refractive power and a fourth lens unit of negative refractive power, wherein, during zooming from a wide-angle end to a telephoto end, all the lens units move along an optical axis such that the separation between the first lens unit and the second lens unit increases and the separation between the third lens unit and the fourth lens unit decreases, and wherein the second lens unit is composed of a front lens subunit of negative refractive power and a rear lens subunit of positive refractive power, and the front lens subunit is so moved as to have directional components perpendicular to the optical axis, compensating for shaking of an image.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 2A to 2D are graphic representations of the aberrations of the numerical example 1 in the wide-angle end.

FIGS. 3A to 3D are graphic representations of the aberrations of the numerical example 1 in the telephoto end.

FIGS. 4A and 4B are graphic representations of the aberrations of the numerical example 1 in the wide-angle end at image heights of y=12 and y=0, respectively, in the normal state.

FIGS. 5A to 5C are graphic representations of the aberrations of the numerical example 1 in the wide-angle end at image heights of y=−12, y=12 and y=0, respectively, in the image stabilizing state for the tilting of 0.2°.

FIGS. 6A and 6B are graphic representations of the aberrations of the numerical example 1 in the telephoto end at image heights of y=12 and y=0, respectively, in the normal state.

FIGS. 7A to 7C are graphic representations of the aberrations of the numerical example 1 in the telephoto end at image heights of y=−12, y=12 and y=0, respectively, in the image stabilizing state for the tilting of 0.2°.

FIGS. 9A to 9D are graphic representations of the aberrations of the numerical example 2 in the wide-angle end.

FIGS. 10A to 10D are graphic representations of the aberrations of the numerical example 2 in the telephoto end.

FIGS. 13A and 13B are graphic representations of the aberrations of the numerical example 2 in the telephoto end at image heights of y=12 and y=0, respectively, in the normal state.

FIGS. 14A to 14C are graphic representations of the aberrations of the numerical example 2 in the telephoto end at image heights of y=−12, y=12 and y=0, respectively, in the image stabilizing state for the tilting of 0.2°.

FIGS. 18A and 18B are graphic representations of the aberrations of the numerical example 3 in the wide-angle end at image heights of y=12 and y=0, respectively, in the normal state.

FIGS. 19A to 19C are graphic representations of the aberrations of the numerical example 3 in the wide-angle end at image heights of y=−12, y=12 and y=0, respectively, in the image stabilizing state for the tilting of 0.2°.

FIGS. 20A and 20B are graphic representations of the aberrations of the numerical example 3 in the telephoto end at image heights of y=12 and y=0, respectively, in the normal state.

FIGS. 21A to 21C are graphic representations of the aberrations of the numerical example 3 in the telephoto end at image heights of y=−12, y=12 and y=0, respectively, in the image stabilizing state for the tilting of 0.2°.

FIGS. 27A and 27B are graphic representations of the aberrations of the numerical example 4 in the telephoto end at image heights of y=12 and y=0, respectively, in the normal state.

FIGS. 28A to 28C are graphic representations of the aberrations of the numerical example 4 in the telephoto end at image heights of y=−12, y=12 and y=0, respectively, in the image stabilizing state for the tilting of 0.2°.

FIGS. 32A and 32B are graphic representations of the aberrations of the numerical example 5 in the wide-angle end at image heights of y=12 and y=0, respectively, in the normal state.

FIGS. 33A to 33C are graphic representations of the aberrations of the numerical example 5 in the wide-angle end at image heights of y=−12, y=12 and y=0, respectively, in the image stabilizing state for the tilting of 0.2°.

FIGS. 34A and 34B are graphic representations of the aberrations of the numerical example 5 in the telephoto end at image heights of y=12 and y=0, respectively, in the normal state.

FIGS. 35A to 35C are graphic representations of the aberrations of the numerical example 5 in the telephoto end at image heights of y=−12, y=12 and y=0, respectively, in the image stabilizing state for the tilting of 0.2°.

FIGS. 37A to 37D are graphic representations of the aberrations of the numerical example 6 in the wide-angle end.

FIGS. 38A to 38D are graphic representations of the aberrations of the numerical example 6 in the telephoto end.

FIGS. 39A and 39B are graphic representations of the aberrations of the numerical example 6 in the wide-angle end at image heights of y=12 and y=0, respectively, in the normal state.

FIGS. 40A to 40C are graphic representations of the aberrations of the numerical example 6 in the wide-angle end at image heights of y=−12, y=12 and y=0, respectively, in the image stabilizing state for the tilting of 0.2°.

FIGS. 41A and 41B are graphic representations of the aberrations of the numerical example 6 in the telephoto end at image heights of y=12 and y=0, respectively, in the normal state.

FIGS. 42A to 42C are graphic representations of the aberrations of the numerical example 6 in the telephoto end at image heights of y=−12, y=12 and y=0, respectively, in the image stabilizing state for the tilting of 0.2°.

FIGS. 44A to 44D are graphic representations of the aberrations of the numerical example 7 in the wide-angle end.

FIGS. 45A to 45D are graphic representations of the aberrations of the numerical example 7 in the telephoto end.

FIGS. 48A and 48B are graphic representations of the aberrations of the numerical example 7 in the telephoto end at image heights of y=12 and y=0, respectively, in the normal state.

FIGS. 49A to 49C are graphic representations of the aberrations of the numerical example 7 in the telephoto end at image heights of y=−12, y=12 and y=0, respectively, in the image stabilizing state for the tilting of 0.2°.

FIG. 50 is a longitudinal section view of a numerical example 8 of the zoom lens.

FIGS. 51A to 51D are graphic representations of the aberrations of the numerical example 8 in the wide-angle end.

FIGS. 52A to 52D are graphic representations of the aberrations of the numerical example 8 in the telephoto end.

FIGS. 62A and 62B are graphic representations of the aberrations of the numerical example 9 in the telephoto end at image heights of y=12 and y=0, respectively, in the normal state.

FIGS. 63A to 63C are graphic representations of the aberrations of the numerical example 9 in the telephoto end at image heights of y=−12, y=12 and y=0, respectively, in the image stabilizing state for the tilting of 0.2°.

FIGS. 65A to 65D are graphic representations of the aberrations of the numerical example 10 in the wide-angle end.

FIGS. 66A to 66D are graphic representations of the aberrations of the numerical example 10 in the telephoto end.

FIGS. 69A and 69B are graphic representations of the aberrations of the numerical example 10 in the telephoto end at image heights of y=12 and y=0, respectively, in the normal state.

FIGS. 70A to 70C are graphic representations of the aberrations of the numerical example 10 in the telephoto end at image heights of y=−12, y=12 and y=0, respectively, in the image stabilizing state for the tilting of 0.2°.

FIGS. 72A to 72D are graphic representations of the aberrations of the numerical example 11 in the wide-angle end.

FIGS. 73A to 73D are graphic representations of the aberrations of the numerical example 11 in the telephoto end.

FIGS. 74A and 74B are graphic representations of the aberrations of the numerical example 11 in the wide-angle end at image heights of y=12 and y=0, respectively, in the normal state.

FIGS. 75A to 75C are graphic representations of the aberrations of the numerical example 11 in the wide-angle end at image heights of y=−12, y=12 and y=0, respectively, in the image stabilizing state for the tilting of 0.2°.

FIGS. 79A to 79D are graphic representations of the aberrations of the numerical example 12 in the wide-angle end.

FIGS. 80A to 80D are graphic representations of the aberrations of the numerical example 12 in the telephoto end.

FIGS. 83A and 83B are graphic representations of the aberrations of the numerical example 12 in the telephoto end at image heights of y=12 and y=0, respectively, in the normal state.

FIGS. 84A to 84C are graphic representations of the aberrations of the numerical example 12 in the telephoto end at image heights of y=−12, y=12 and y=0, respectively, in the image stabilizing state for the tilting of 0.2°.

FIGS. 88A and 88B are graphic representations of the aberrations of the numerical example 13 in the wide-angle end at image heights of y=12 and y=0, respectively, in the normal state.

FIGS. 89A to 89C are graphic representations of the aberrations of the numerical example 13 in the wide-angle end at image heights of y=−12, y=12 and y=0, respectively, in the image stabilizing state for the tilting of 0.2°.

FIGS. 90A and 90B are graphic representations of the aberrations of the numerical example 13 in the telephoto end at image heights of y=12 and y=0, respectively, in the normal state.

FIGS. 91A to 91C are graphic representations of the aberrations of the numerical example 13 in the telephoto end at image heights of y=−12, y=12 and y=0, respectively, in the image stabilizing state for the tilting of 0.2°.

FIGS. 93A to 93D are graphic representations of the aberrations of the numerical example 14 in the wide-angle end.

FIGS. 94A to 94D are graphic representations of the aberrations of the numerical example 14 in the telephoto end.

DETAILED DESCRIPTION OF THE INVENTION

Hereinafter, preferred embodiments of the invention will be described in detail with reference to the drawings.

Figure 1:
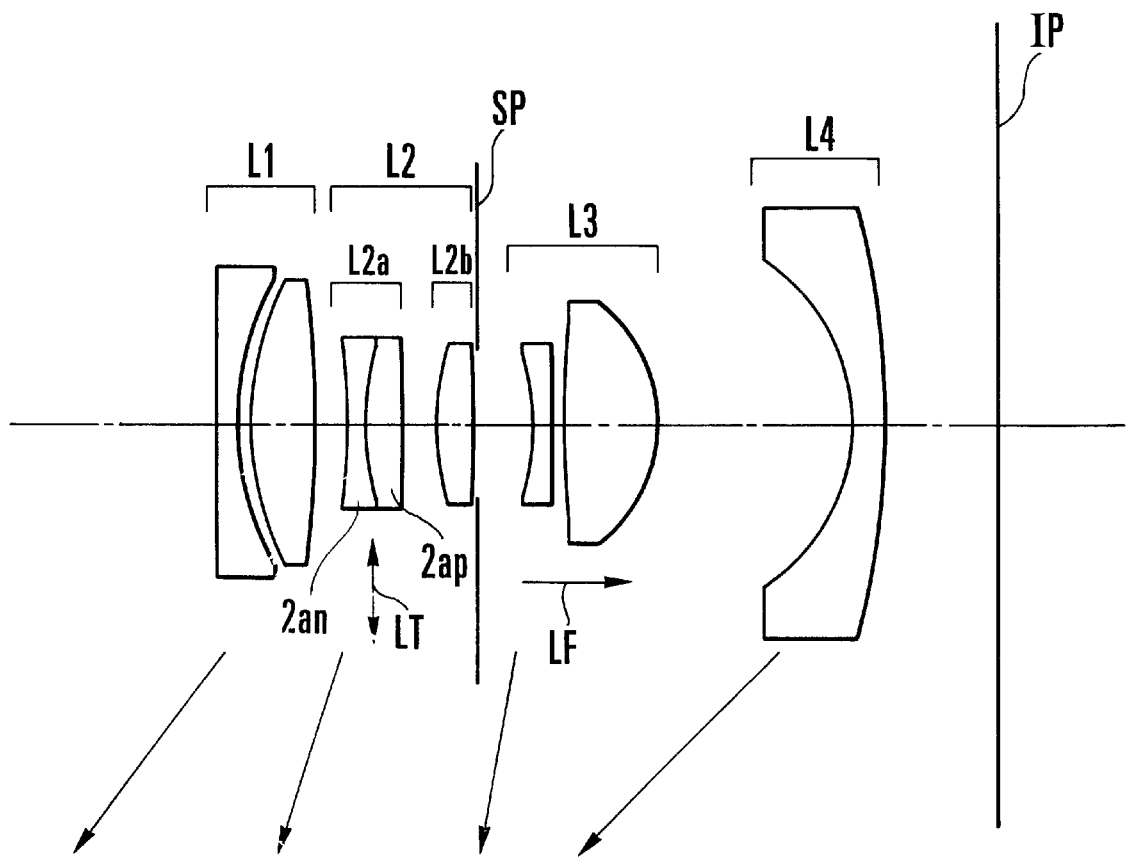
FIG. 1 is a longitudinal section view of a numerical example 1 of the zoom lens.
Figure 8:
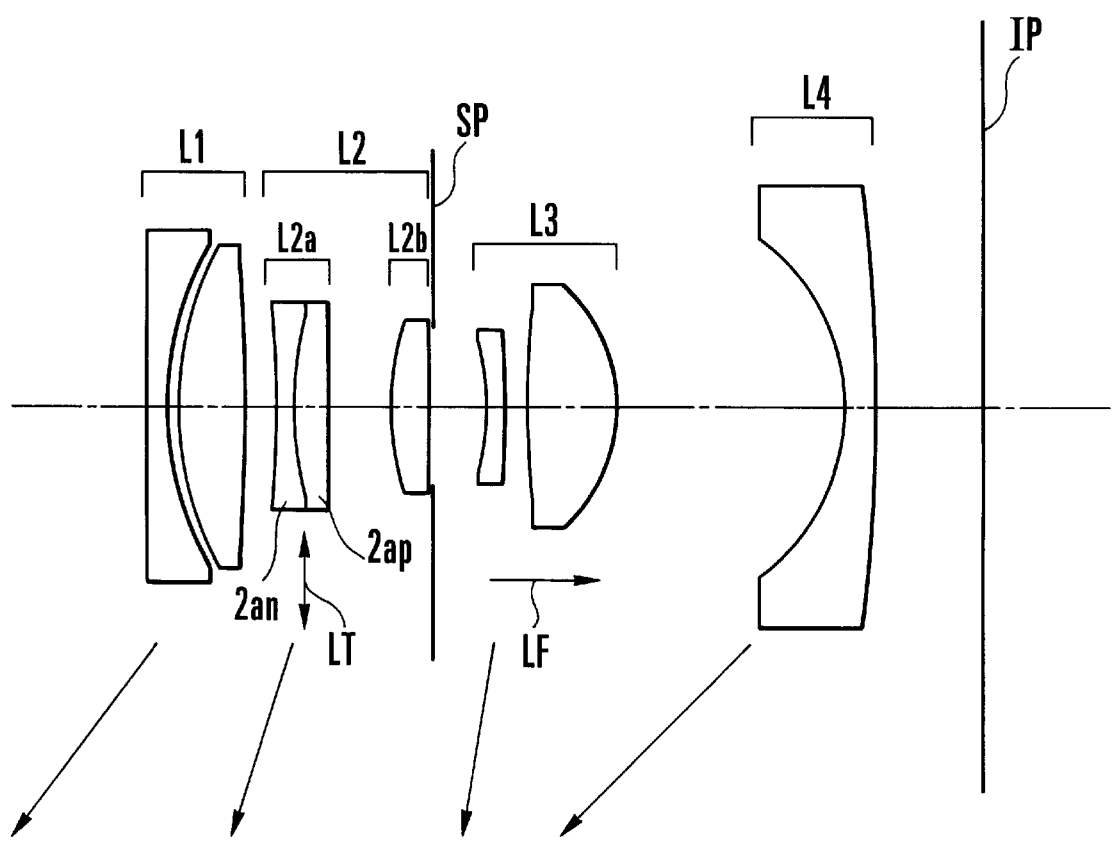
FIG. 8 is a longitudinal section view of a numerical example 2 of the zoom lens.
Figure 11A:
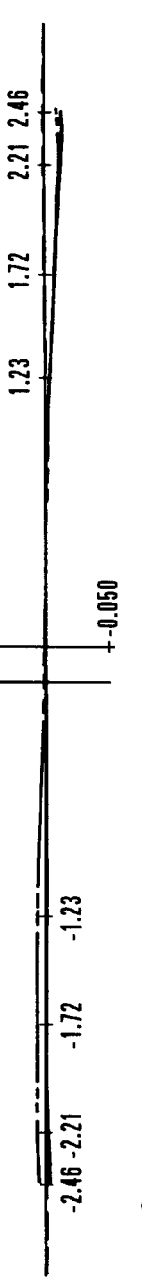
FIGS. 11A and 11B are graphic representations of the aberrations of the numerical example 2 in the wide-angle end at image heights of y=12 and y=0, respectively, in the normal state.
Figure 11B:
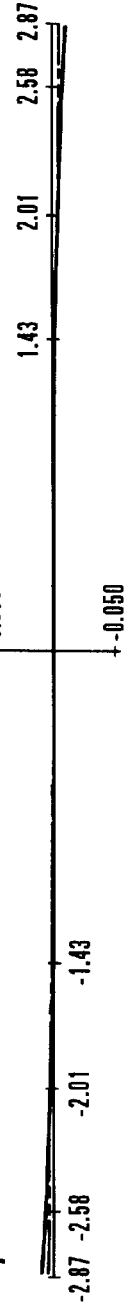
Figure 12A:
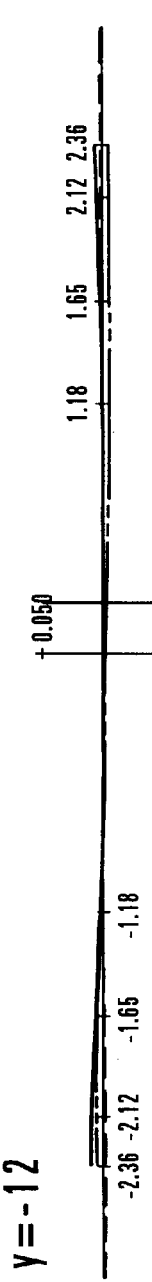
FIGS. 12A to 12C are graphic representations of the aberrations of the numerical example 2 in the wide-angle end at image heights of y=−12, y=12 and y=0, respectively, in the image stabilizing state for the tilting of 0.2°.
Figure 12B:
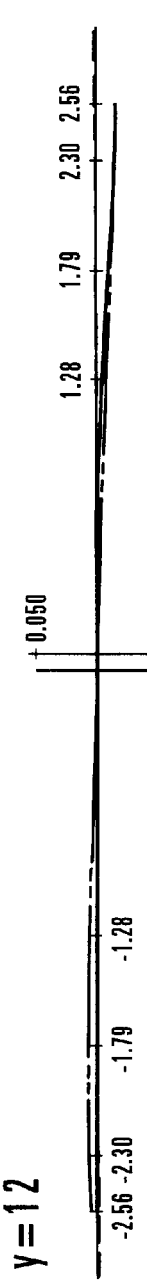
Figure 12C:
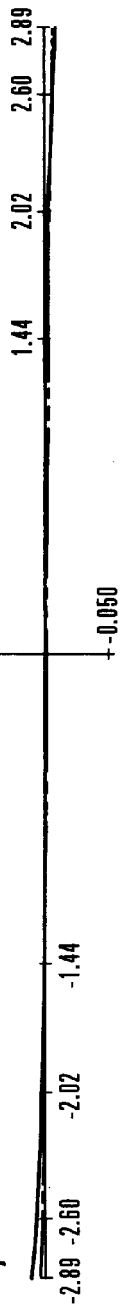
Figure 15:
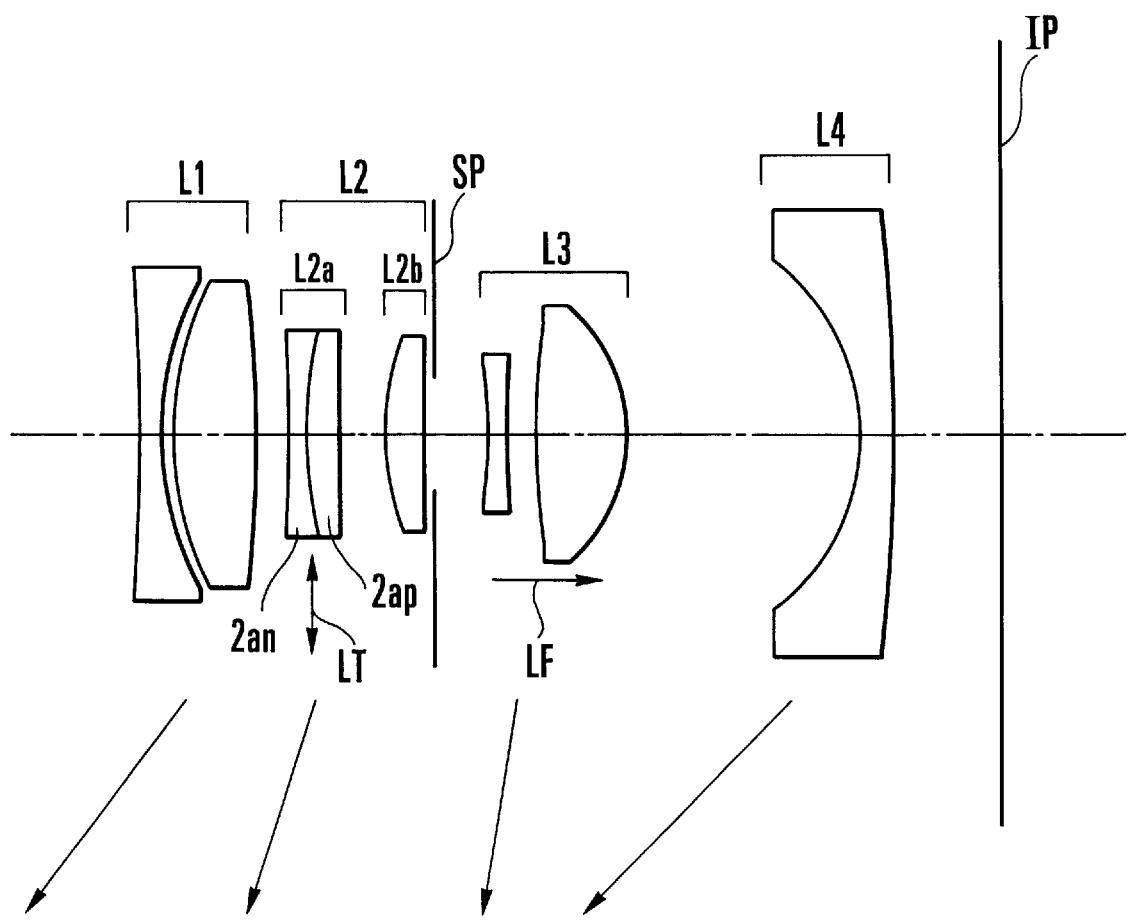
FIG. 15 is a longitudinal section view of a numerical example 3 of the zoom lens.
Figures 16A, 16B, 16C, 16D:
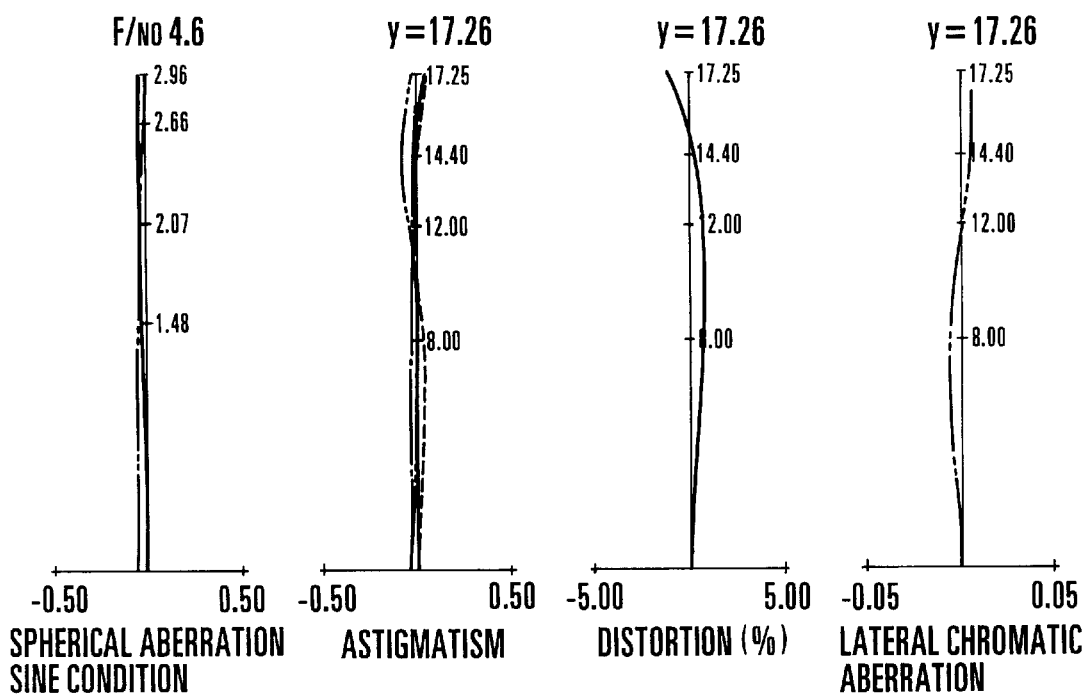
FIGS. 16A to 16D are graphic representations of the aberrations of the numerical example 3 in the wide-angle end.
Figures 17A, 17B, 17C, 17D:
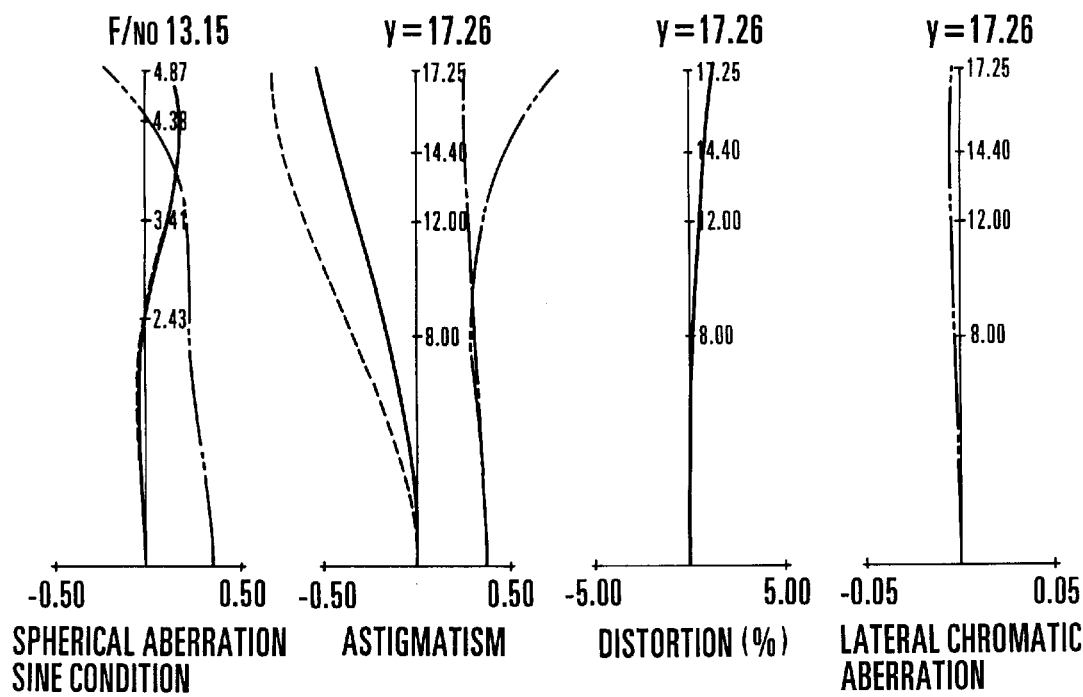
FIGS. 17A to 17D are graphic representations of the aberrations of the numerical example 3 in the telephoto end.
Figure 22:
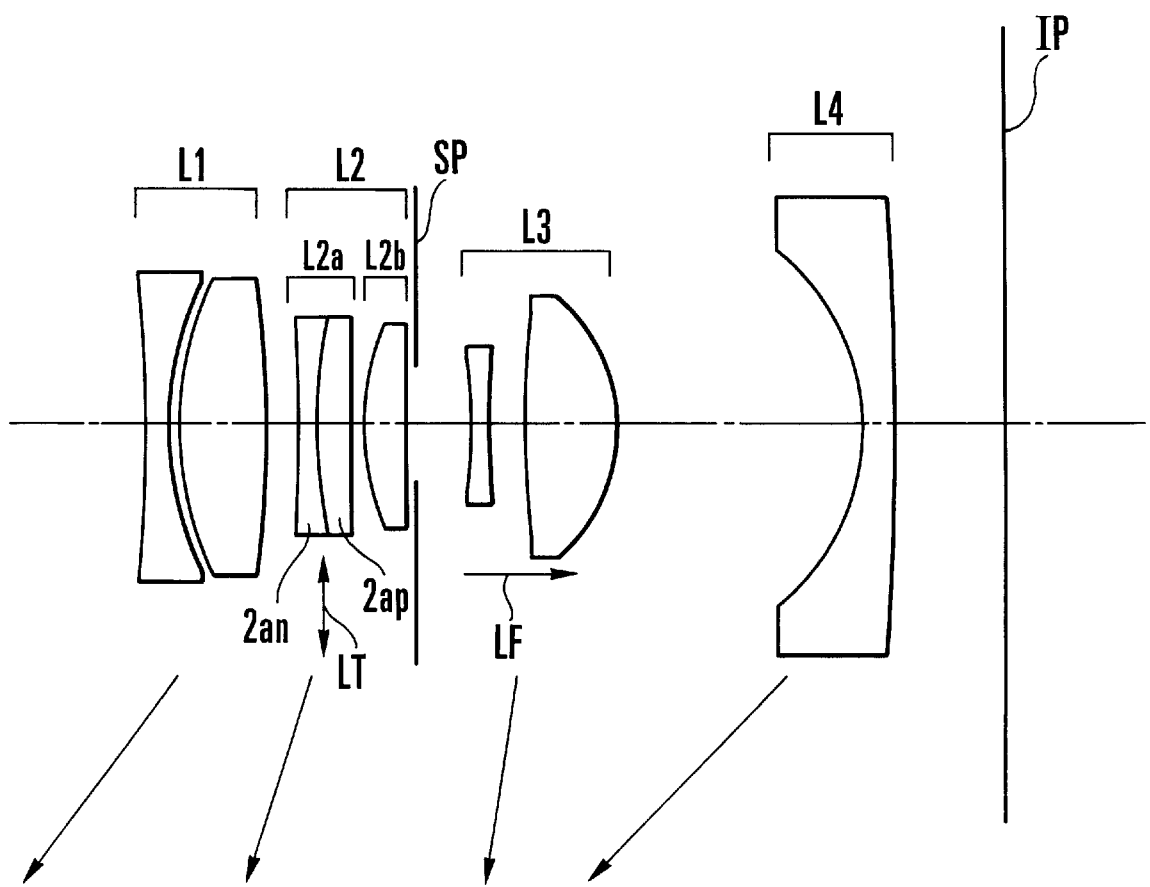
FIG. 22 is a longitudinal section view of a numerical example 4 of the zoom lens.
Figures 23A, 23B, 23C, 23D:
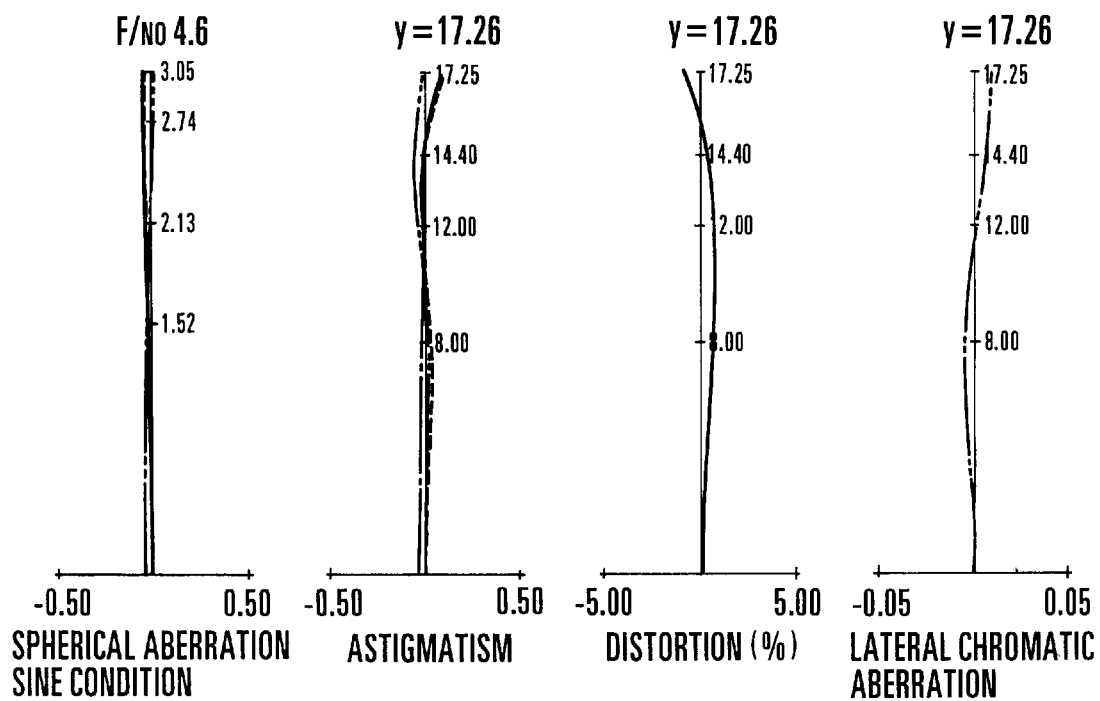
FIGS. 23A to 23D are graphic representations of the aberrations of the numerical example 4 in the wide-angle end.
Figures 24A, 24B, 24C, 24D:
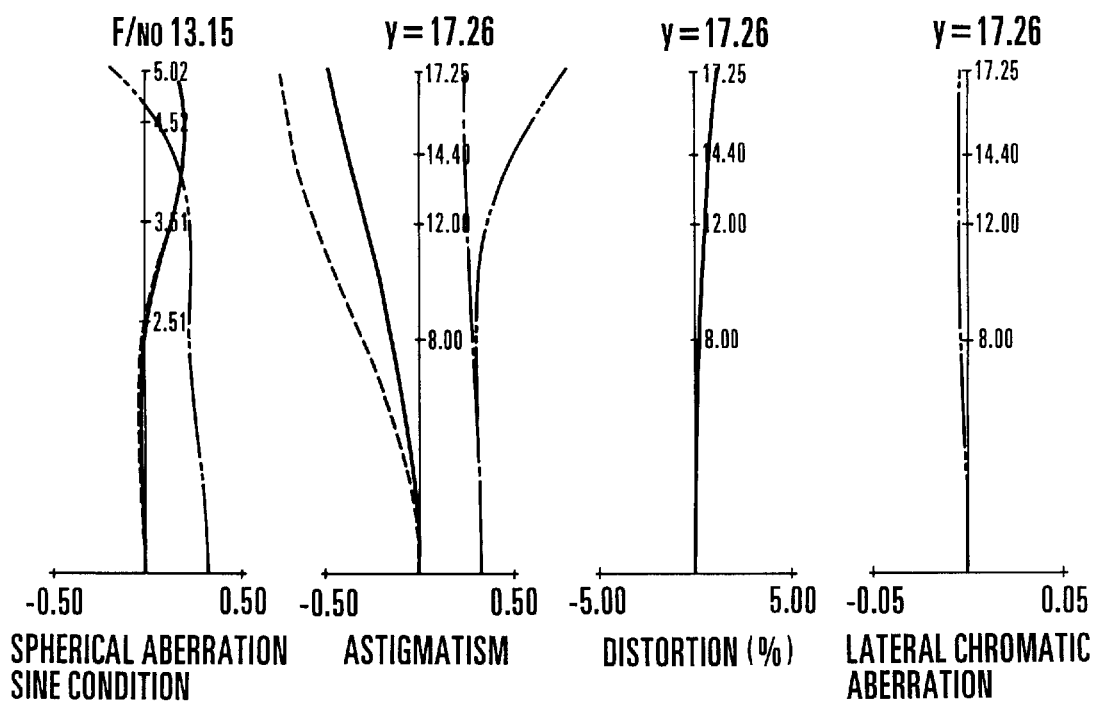
FIGS. 24A to 24D are graphic representations of the aberrations of the numerical example 4 in the telephoto end.
Figure 25A:
FIGS. 25A and 25B are graphic representations of the aberrations of the numerical example 4 in the wide-angle end at image heights of y=12 and y=0, respectively, in the normal state.
Figure 25B:
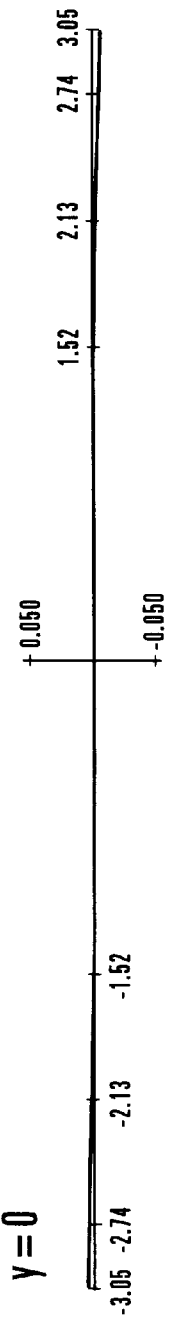
Figure 26A:
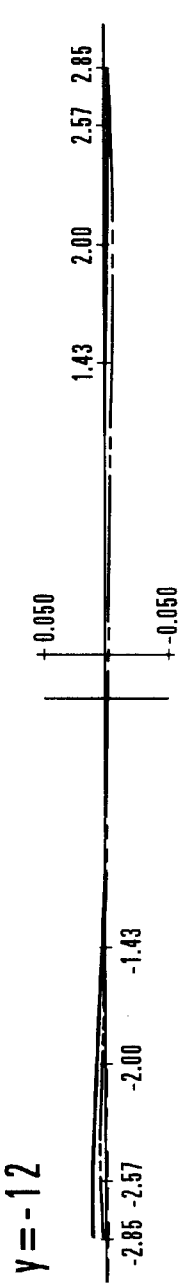
FIGS. 26A to 26C are graphic representations of the aberrations of the numerical example 4 in the wide-angle end at image heights of y=−12, y=12 and y=0, respectively, in the image stabilizing state for the tilting of 0.2°.
Figure 26B:
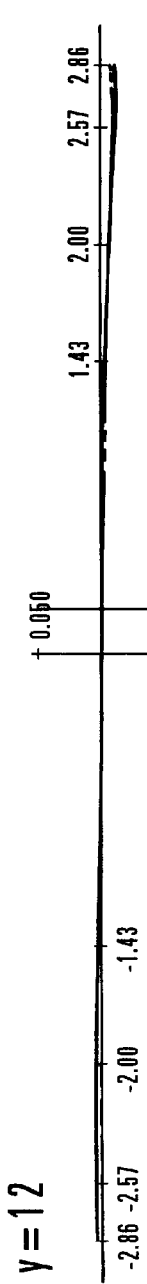
Figure 26C:
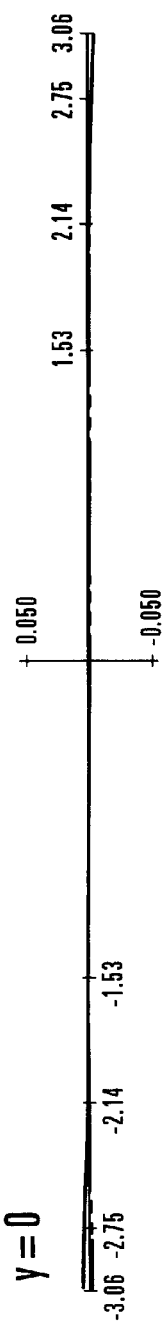
Figure 29:
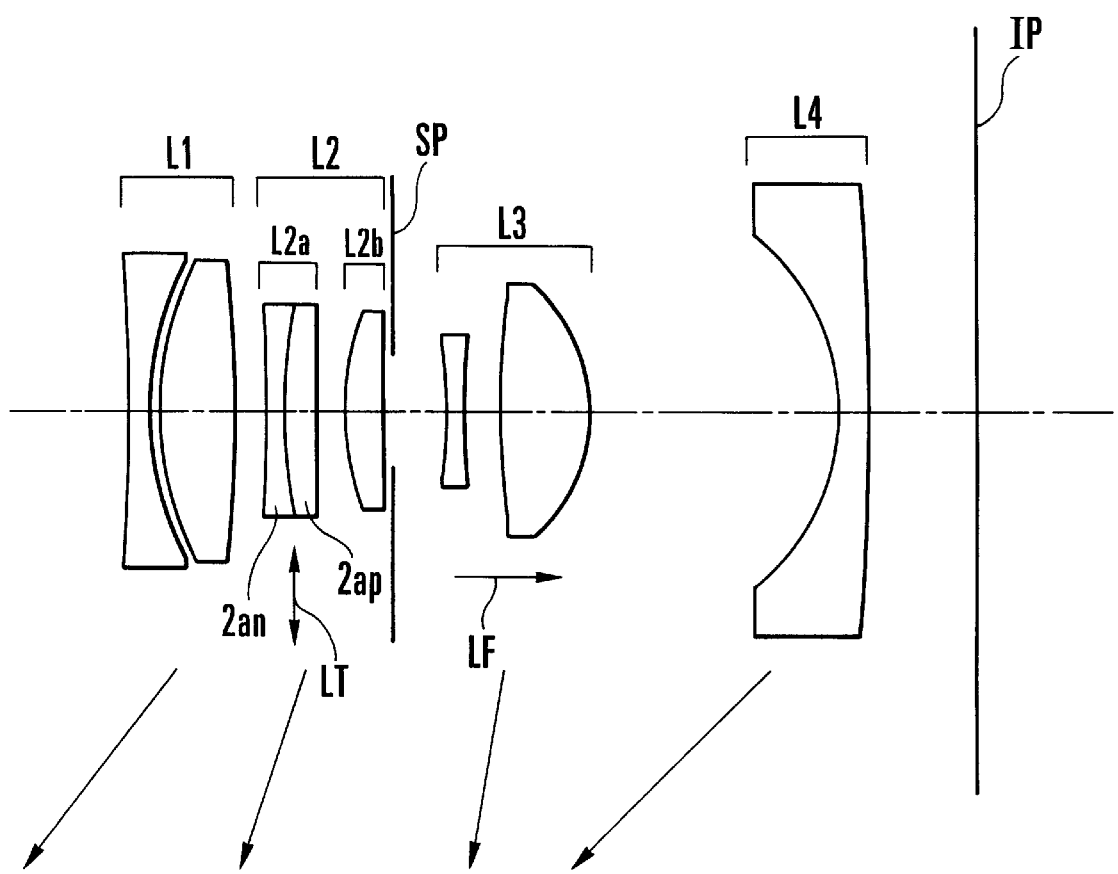
FIG. 29 is a longitudinal section view of a numerical example 5 of the zoom lens.
Figures 30A, 30B, 30C, 30D:
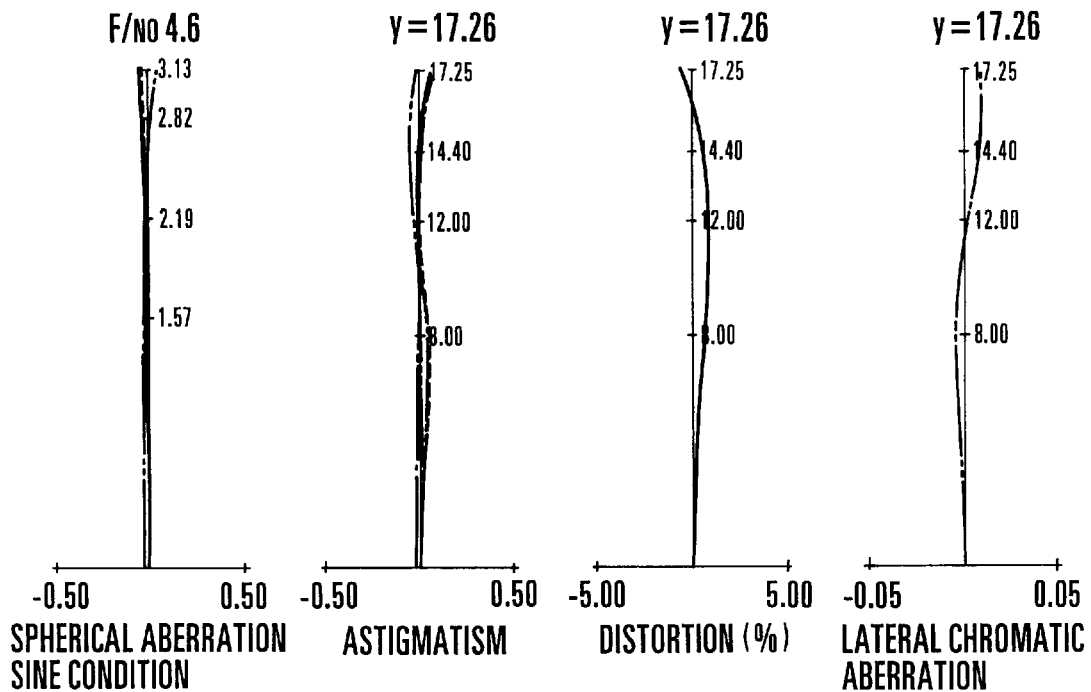
FIGS. 30A to 30D are graphic representations of the aberrations of the numerical example 5 in the wide-angle end.
Figures 31A, 31B, 31C, 31D:
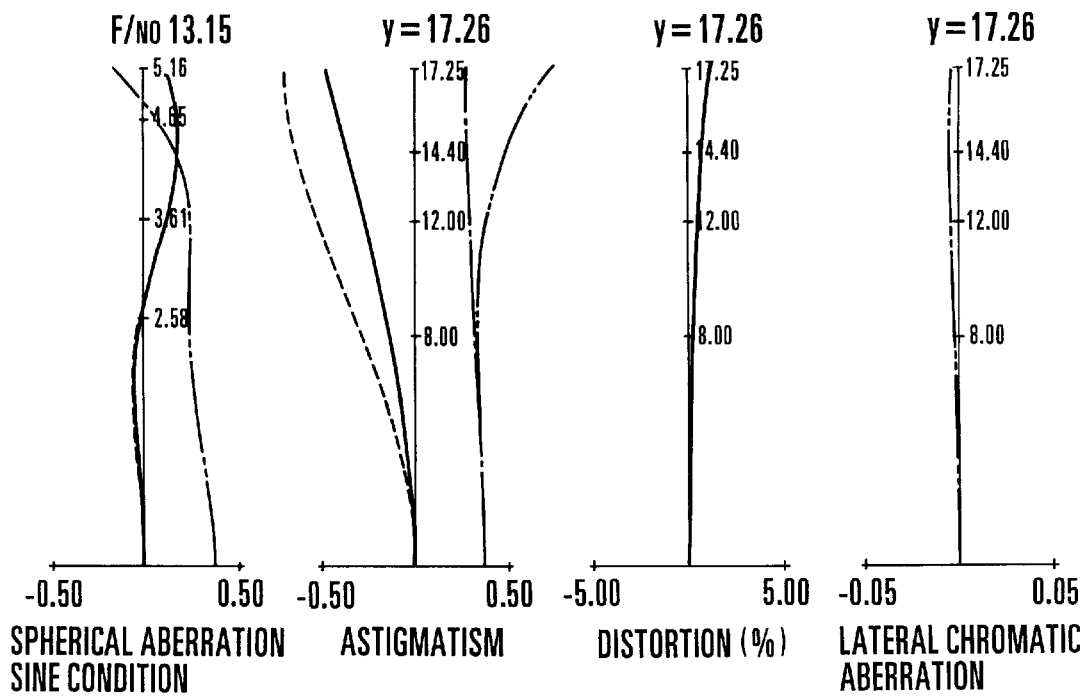
FIGS. 31A to 31D are graphic representations of the aberrations of the numerical example 5 in the telephoto end.
Figure 36:
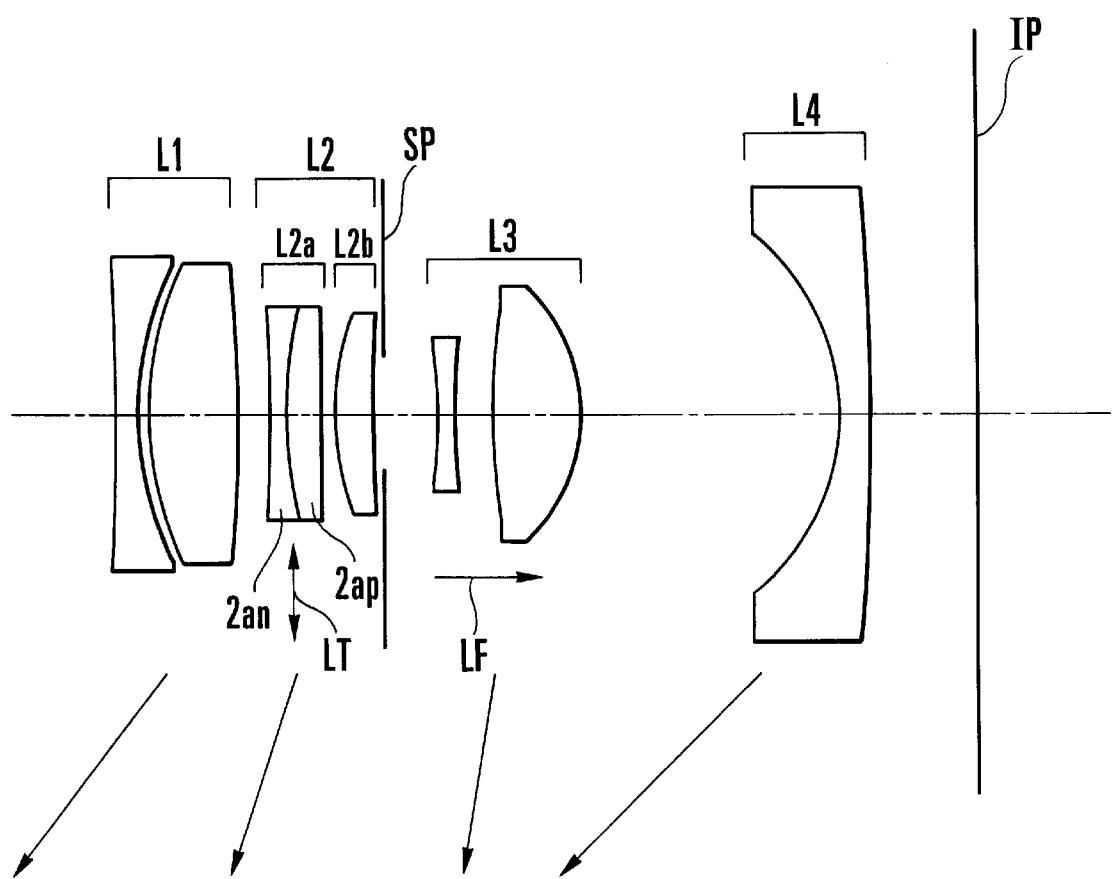
FIG. 36 is a longitudinal section view of a numerical example 6 of the zoom lens.
Figure 43:
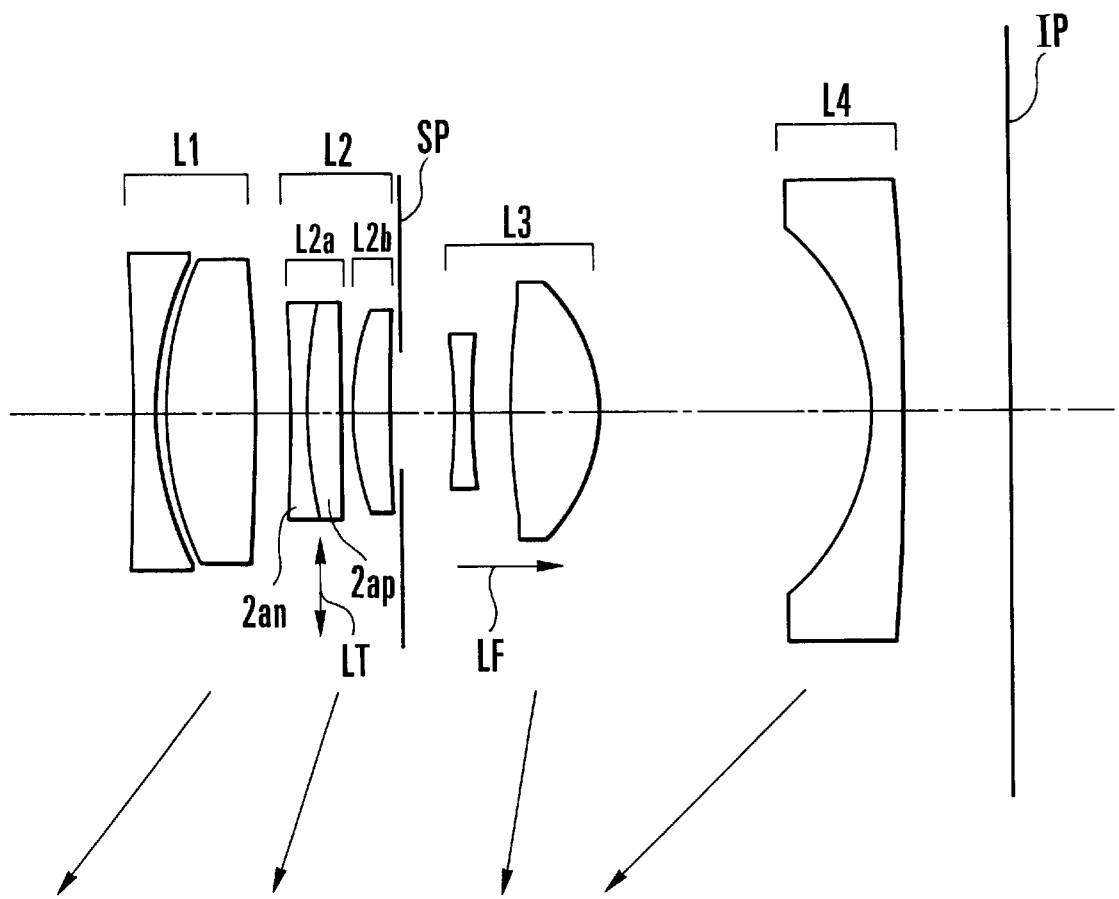
FIG. 43 is a longitudinal section view of a numerical example 7 of the zoom lens.
Figure 46A:
FIGS. 46A and 46B are graphic representations of the aberrations of the numerical example 7 in the wide-angle end at image heights of y=12 and y=0, respectively, in the normal state.
Figure 46B:
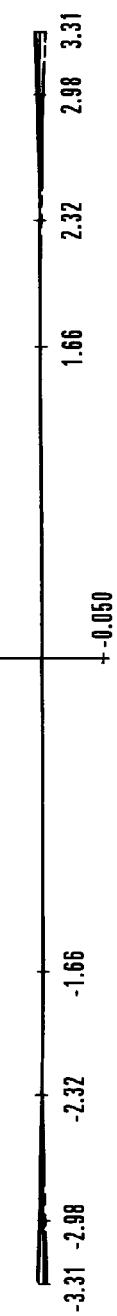
Figure 47A:
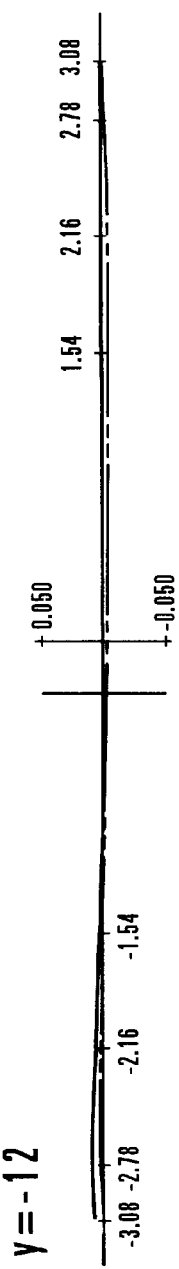
FIGS. 47A to 47C are graphic representations of the aberrations of the numerical example 7 in the wide-angle end at image heights of y=−12, y=12 and y=0, respectively, in the image stabilizing state for the tilting of 0.2°.
Figure 47B:
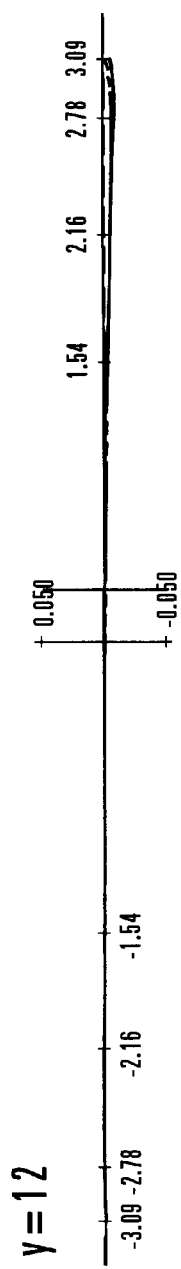
Figure 47C:
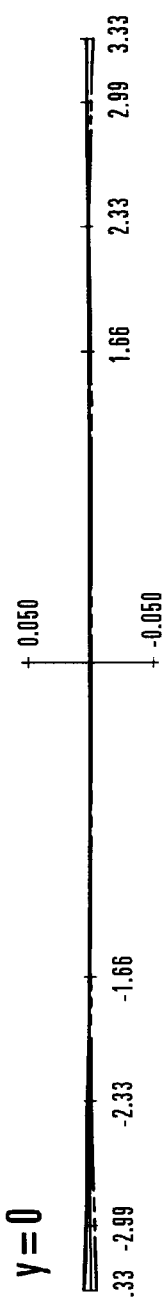
Figure 53A:
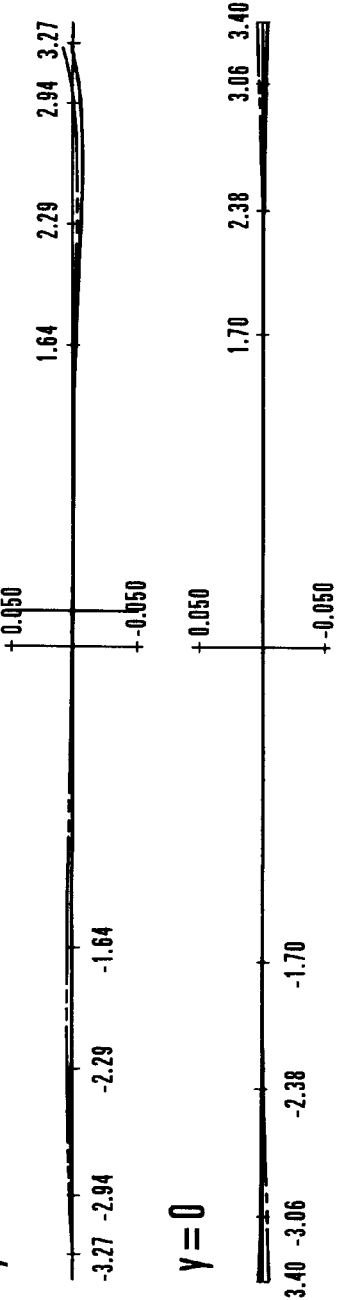
FIGS. 53A and 53B are graphic representations of the aberrations of the numerical example 8 in the wide-angle end at image heights of y=12 and y=0, respectively, in the normal state.
Figure 53B:
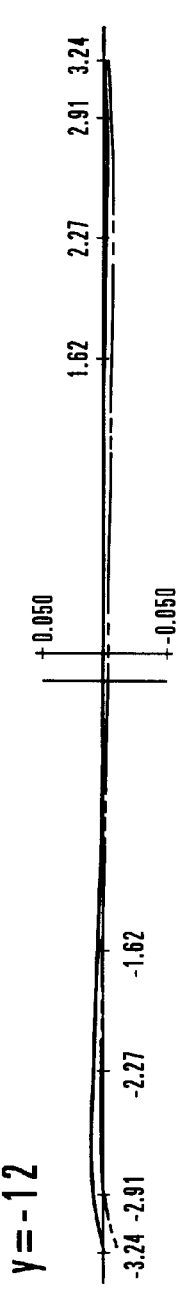
Figure 54A:
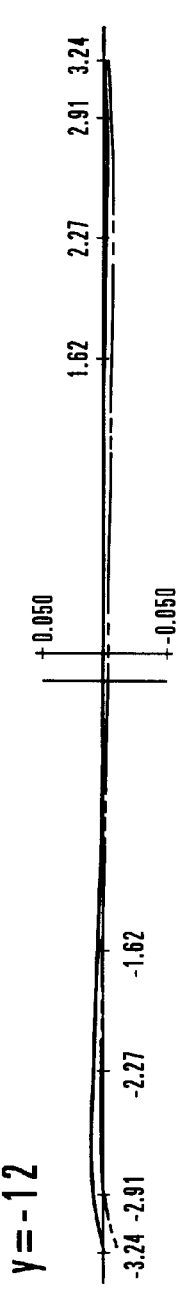
FIGS. 54A to 54C are graphic representations of the aberrations of the numerical example 8 in the wide-angle end at image heights of y=−12, y=12 and y=0, respectively, in the image stabilizing state for the tilting of 0.2°.
Figure 54B:
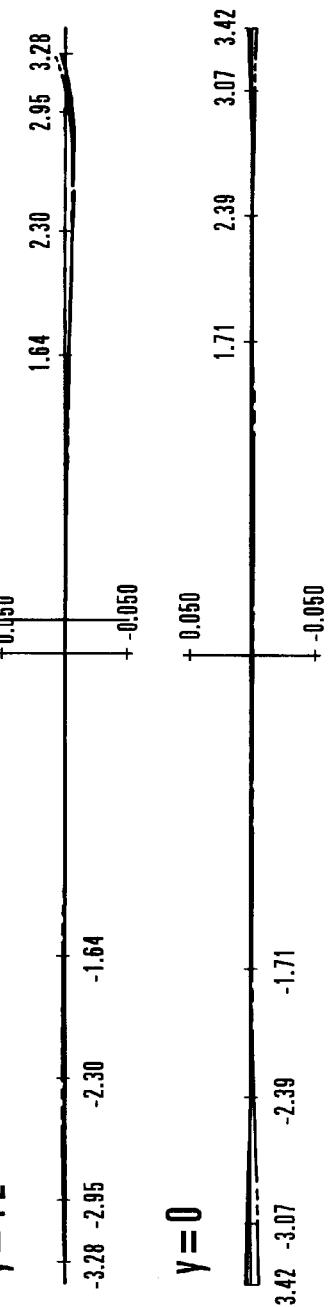
Figure 54C:
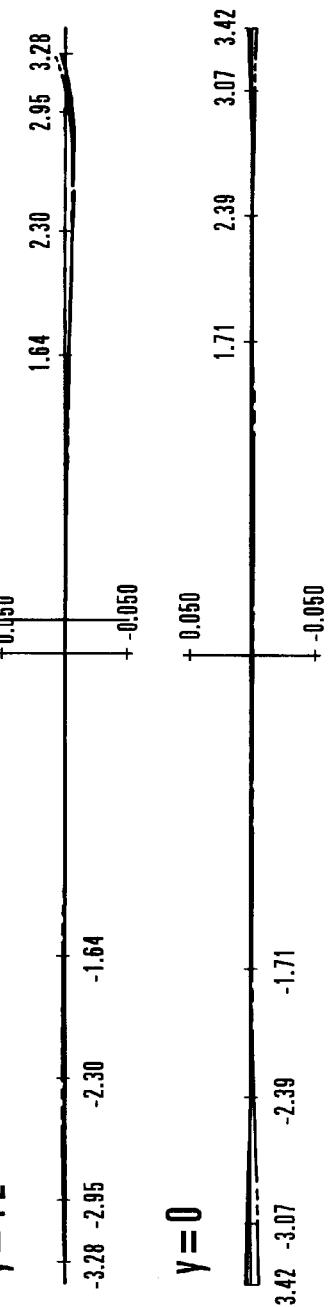
Figure 55A:
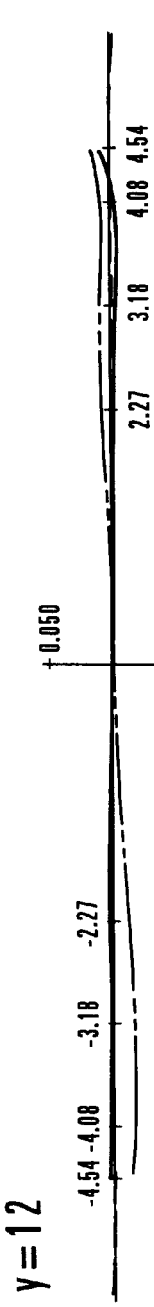
FIGS. 55A and 55B are graphic representations of the aberrations of the numerical example 8 in the telephoto end at image heights of y=12 and y=0, respectively, in the normal state.
Figure 55B:
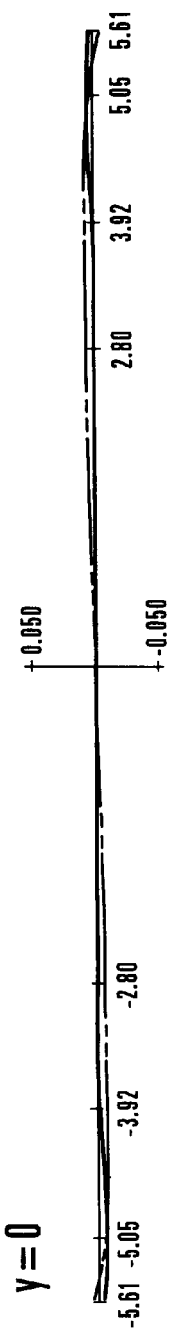
Figure 56A:
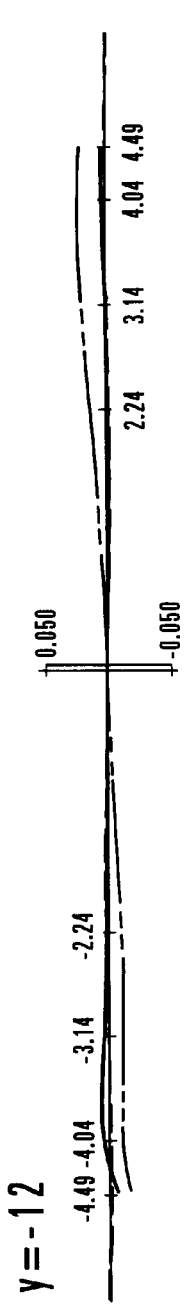
FIGS. 56A to 56C are graphic representations of the aberrations of the numerical example 8 in the telephoto end at image heights of y=−12, y=12 and y=0, respectively, in the image stabilizing state for the tilting of 0.2°.
Figure 56B:
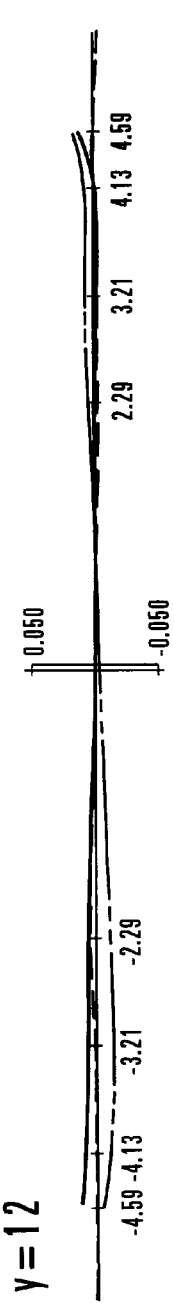
Figure 56C:
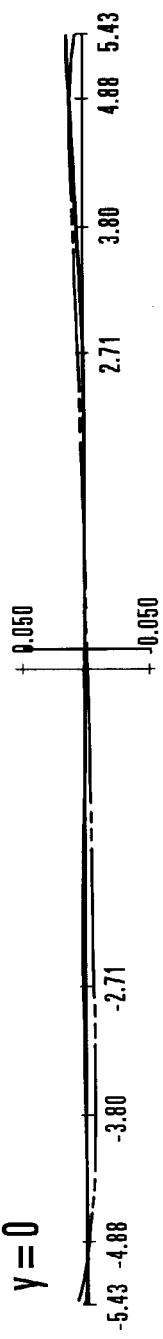
Figure 57:
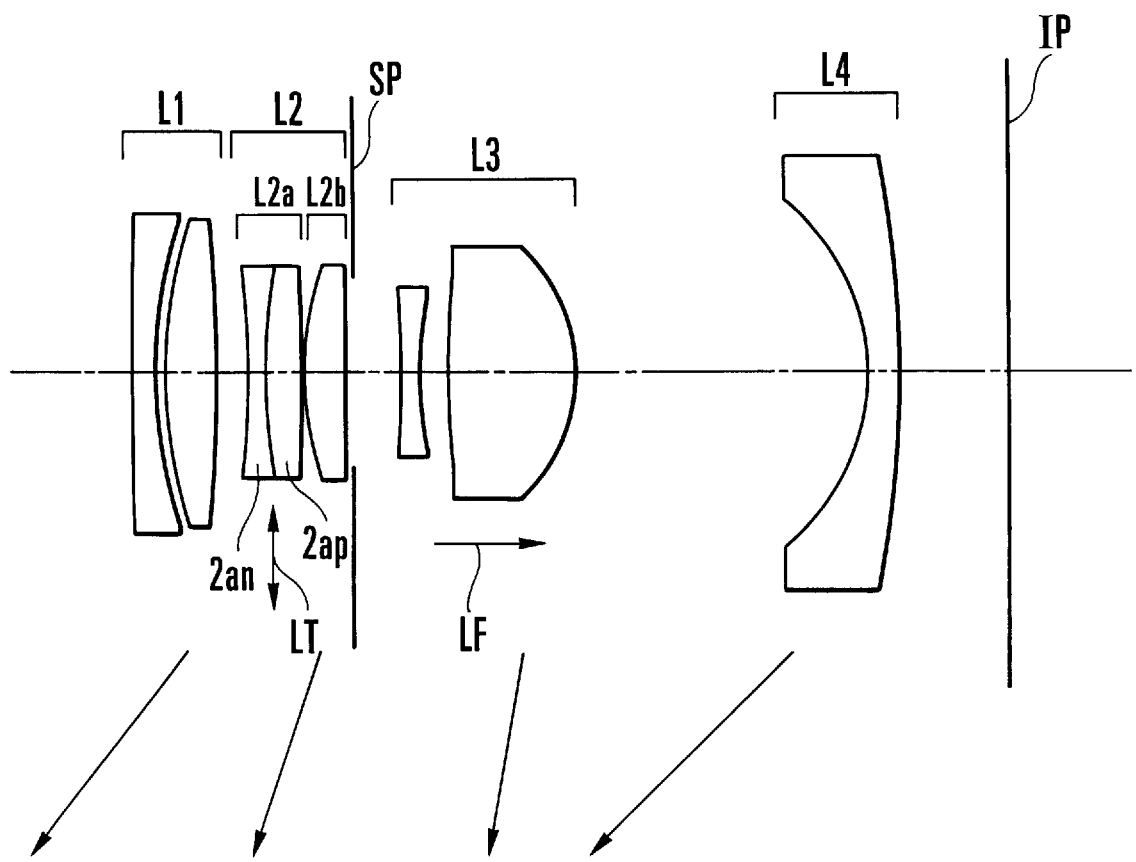
FIG. 57 is a longitudinal section view of a numerical example 9 of the zoom lens.
Figures 58A, 58B, 58C, 58D:
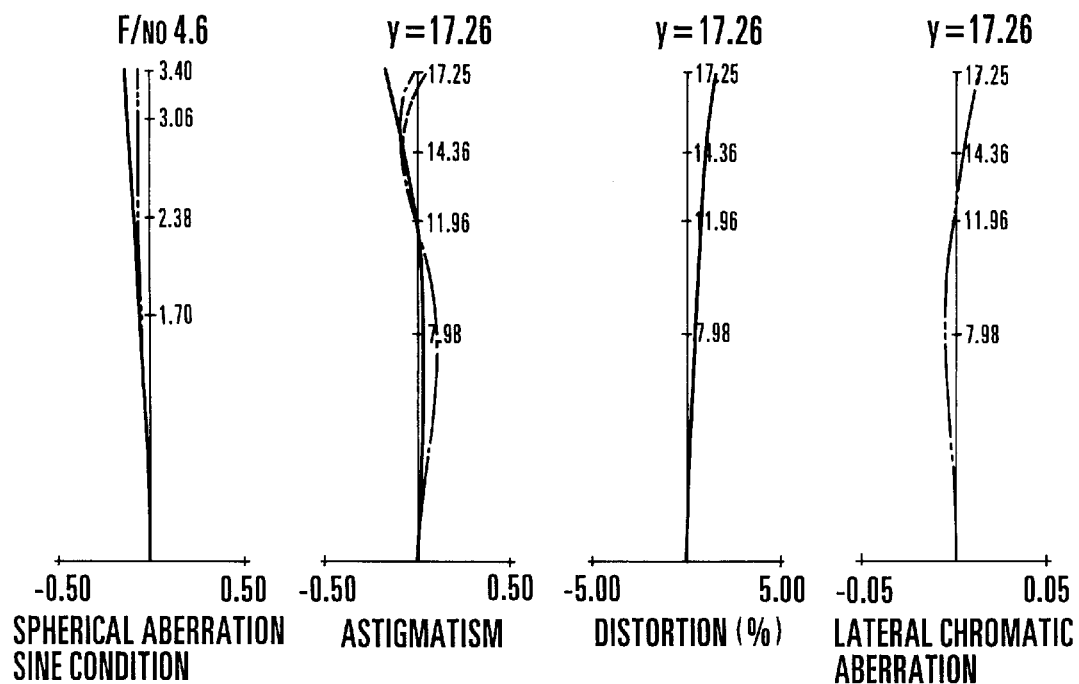
FIGS. 58A to 58D are graphic representations of the aberrations of the numerical example 9 in the wide-angle end.
Figures 59A, 59B, 59C, 59D:
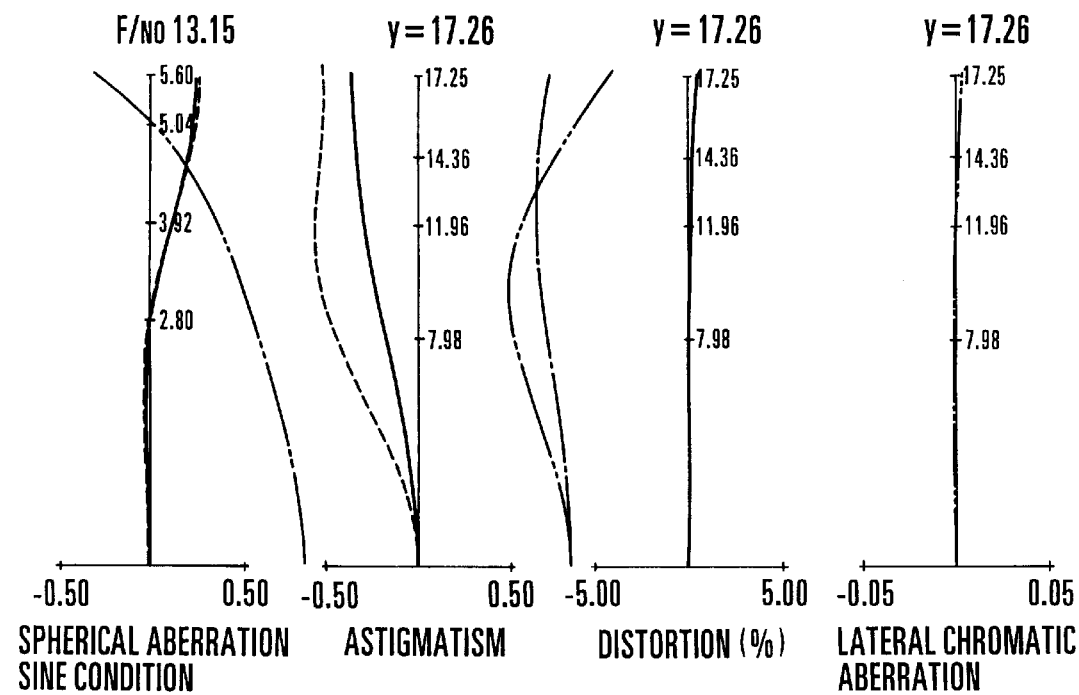
FIGS. 59A to 59D are graphic representations of the aberrations of the numerical example 9 in the telephoto end.
Figure 60A:
FIGS. 60A and 60B are graphic representations of the aberrations of the numerical example 9 in the wide-angle end at image heights of y=12 and y=0, respectively, in the normal state.
Figure 60B:
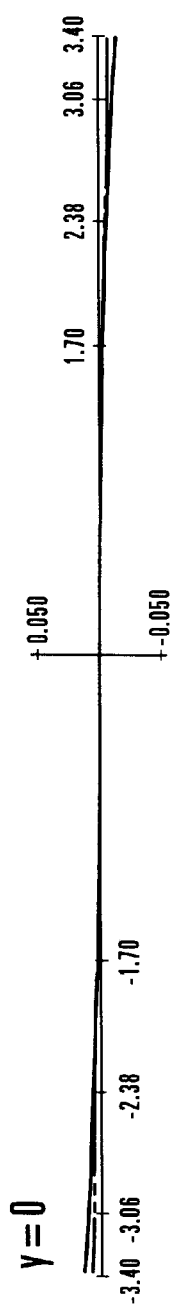
Figure 61A:
FIGS. 61A to 61C are graphic representations of the aberrations of the numerical example 9 in the wide-angle end at image heights of y=−12, y=12 and y=0, respectively, in the image stabilizing state for the tilting of 0.2°.
Figure 61B:
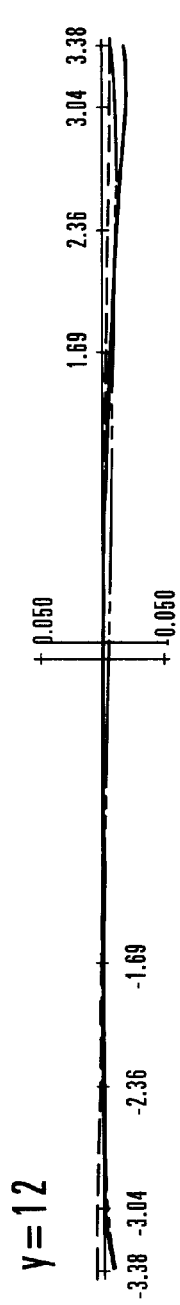
Figure 61C:
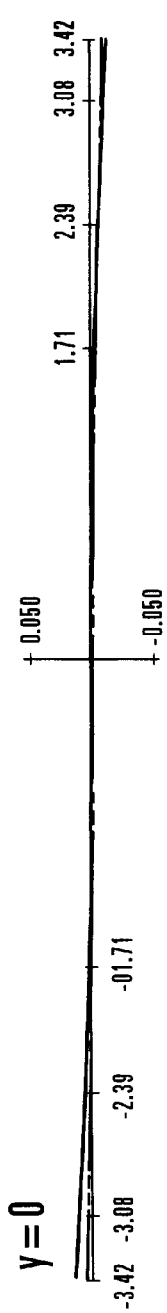
Figure 64:
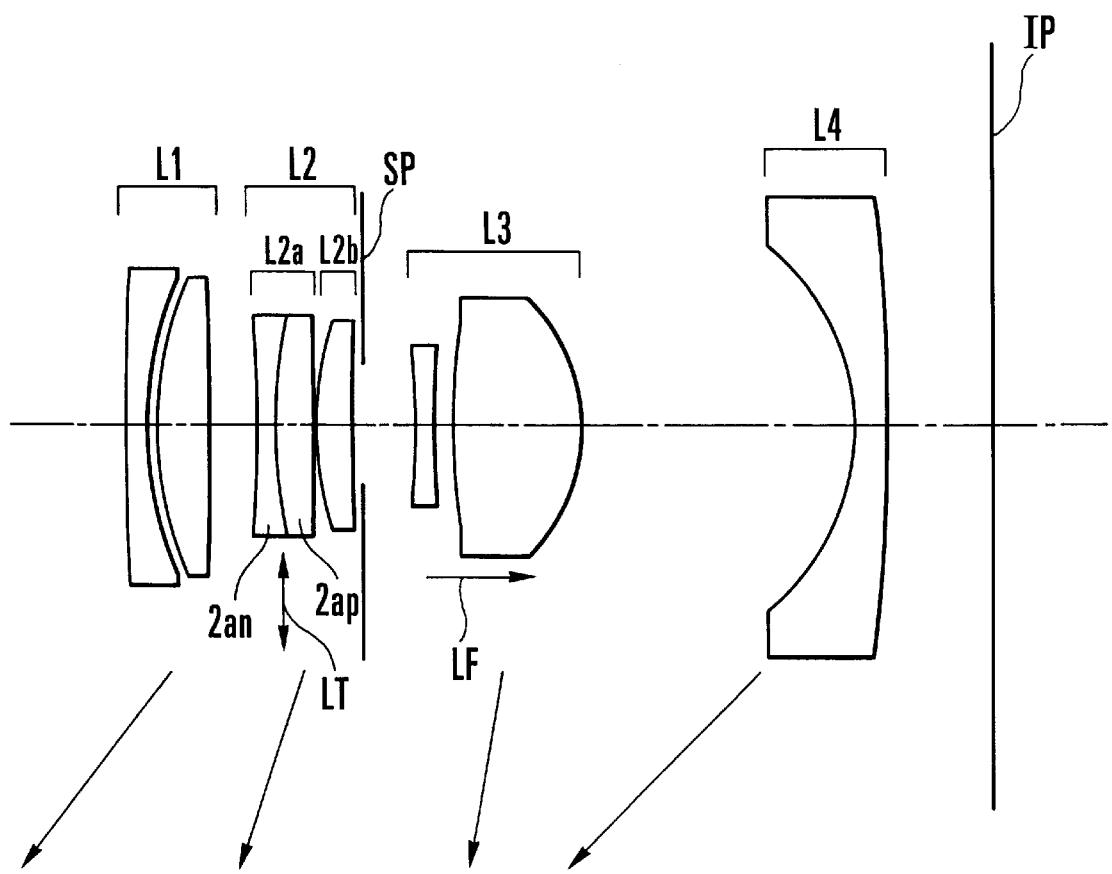
FIG. 64 is a longitudinal section view of a numerical example 10 of the zoom lens.
Figure 67A:
FIGS. 67A and 67B are graphic representations of the aberrations of the numerical example 10 in the wide-angle end at image heights of y=12 and y=0, respectively, in the normal state.
Figure 67B:
Figure 68A:
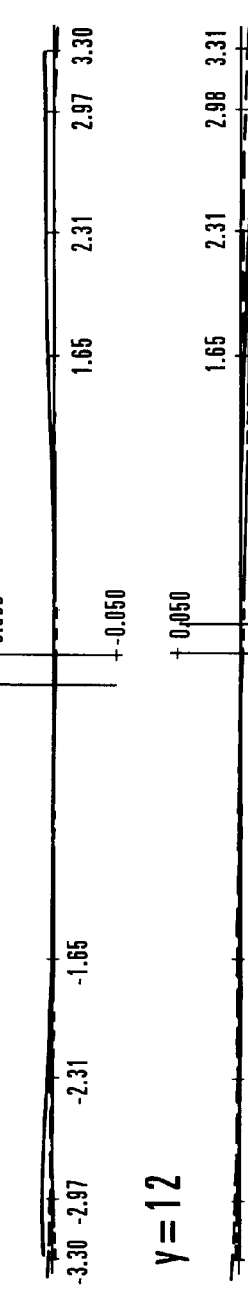
FIGS. 68A to 68C are graphic representations of the aberrations of the numerical example 10 in the wide-angle end at image heights of y=−12, y=12 and y=0, respectively, in the image stabilizing state for the tilting of 0.2°.
Figure 68B:
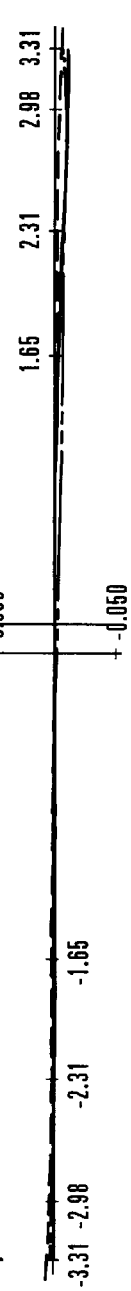
Figure 68C:
Figure 71:
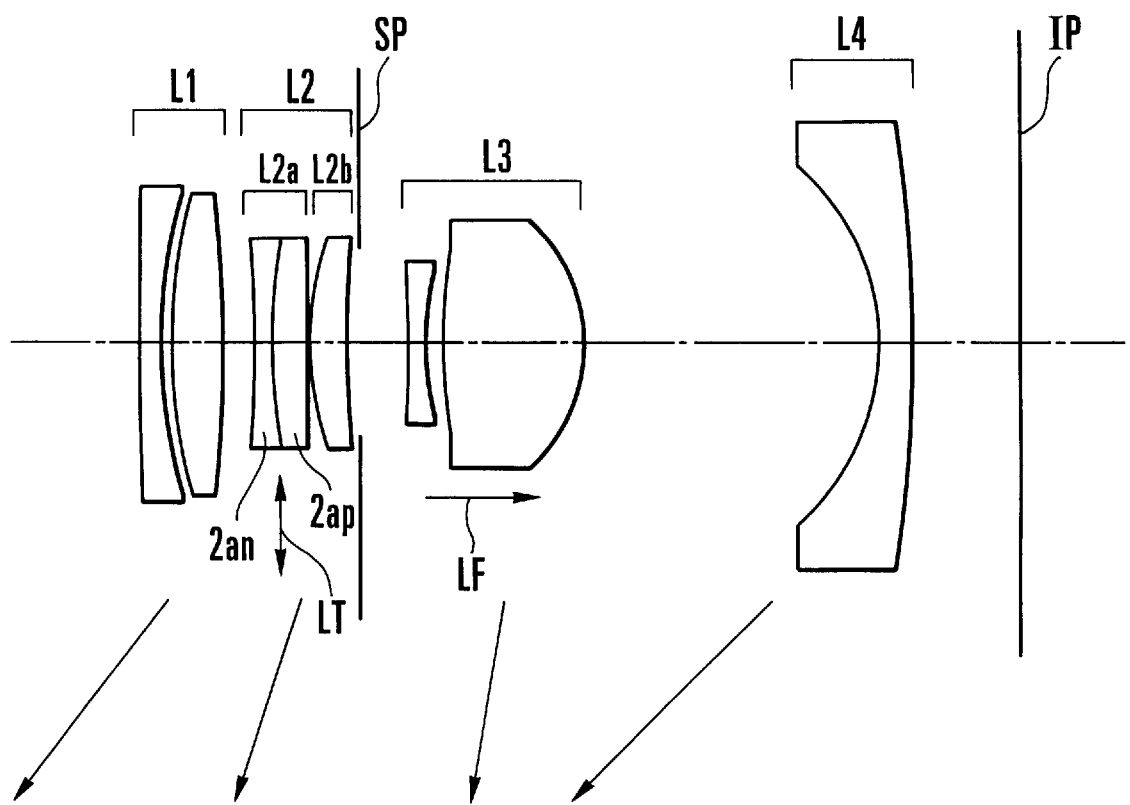
FIG. 71 is a longitudinal section view of a numerical example 11 of the zoom lens.
Figure 76A:
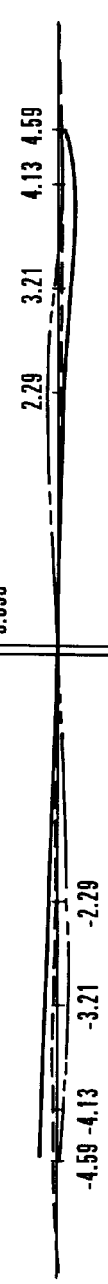
FIGS. 76A and 76B are graphic representations of the aberrations of the numerical example 11 in the telephoto end at image heights of y=12 and y=0, respectively, in the normal state.
Figure 76B:
Figure 77A:
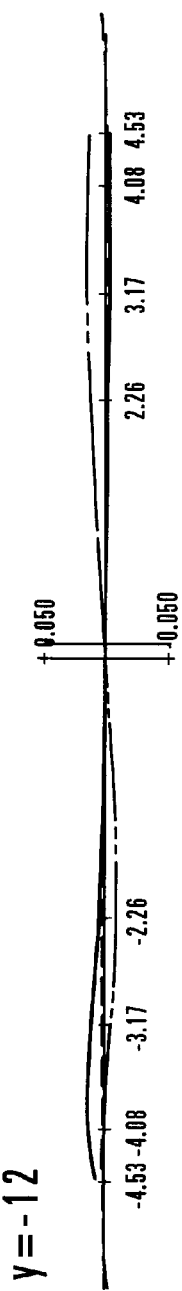
FIGS. 77A to 77C are graphic representations of the aberrations of the numerical example 11 in the telephoto end at image heights of y=−12, y=12 and y=0, respectively, in the image stabilizing state for the tilting of 0.2°.
Figure 77B:
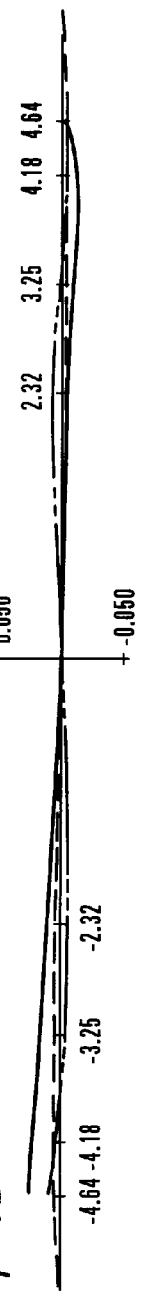
Figure 77C:
Figure 78:
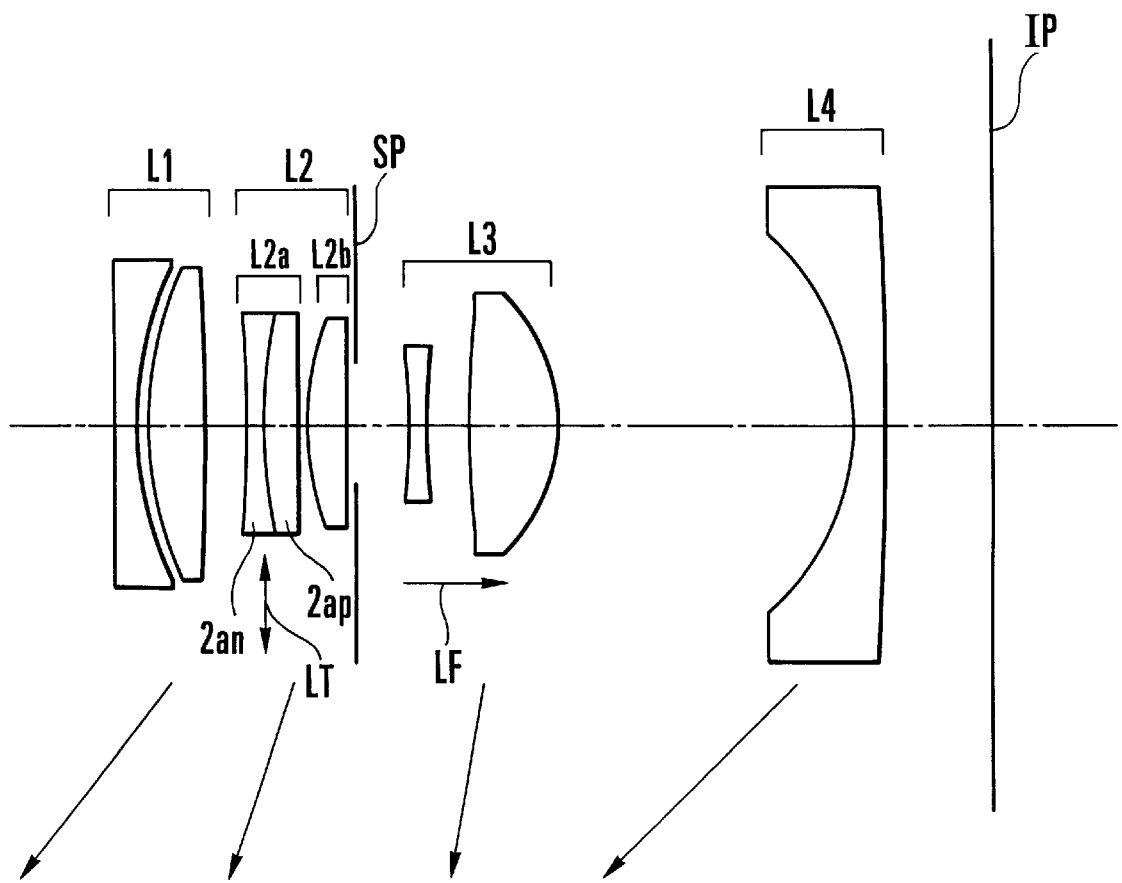
FIG. 78 is a longitudinal section view of a numerical example 12 of the zoom lens.
Figure 81A:
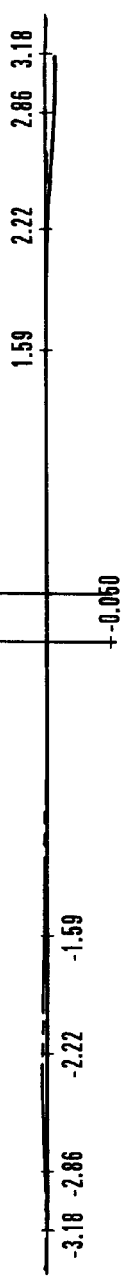
FIGS. 81A and 81B are graphic representations of the aberrations of the numerical example 12 in the wide-angle end at image heights of y=12 and y=0, respectively, in the normal state.
Figure 81B:
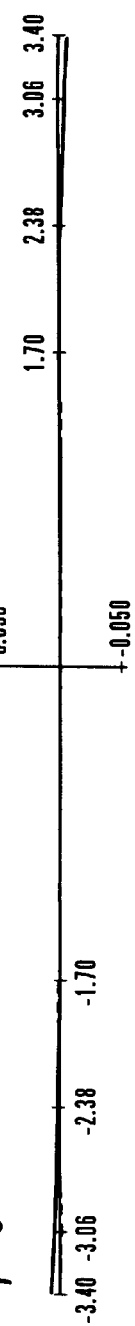
Figure 82A:
FIGS. 82A to 82C are graphic representations of the aberrations of the numerical example 12 in the wide-angle end at image heights of y=−12, y=12 and y=0, respectively, in the image stabilizing state for the tilting of 0.2°.
Figure 82B:
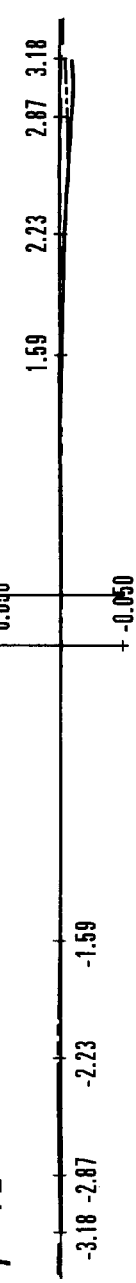
Figure 82C:
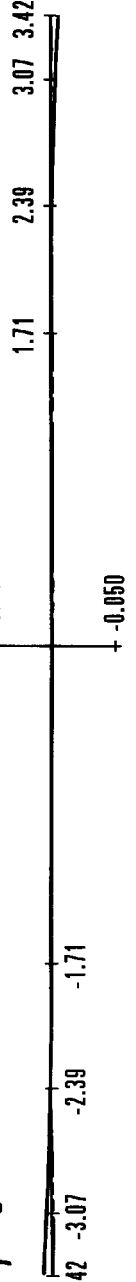
Figure 85:
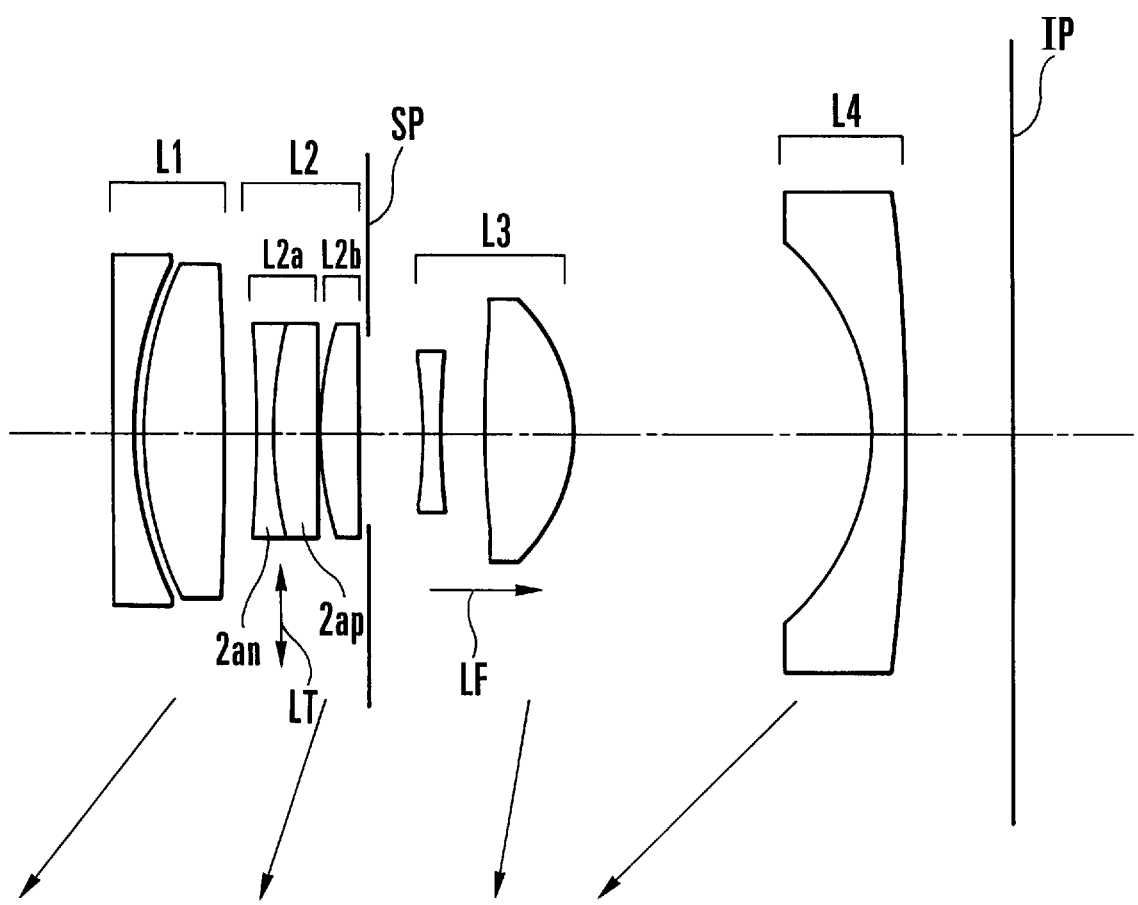
FIG. 85 is a longitudinal section view of a numerical example 13 of the zoom lens.
Figures 86A, 86B, 86C, 86D:
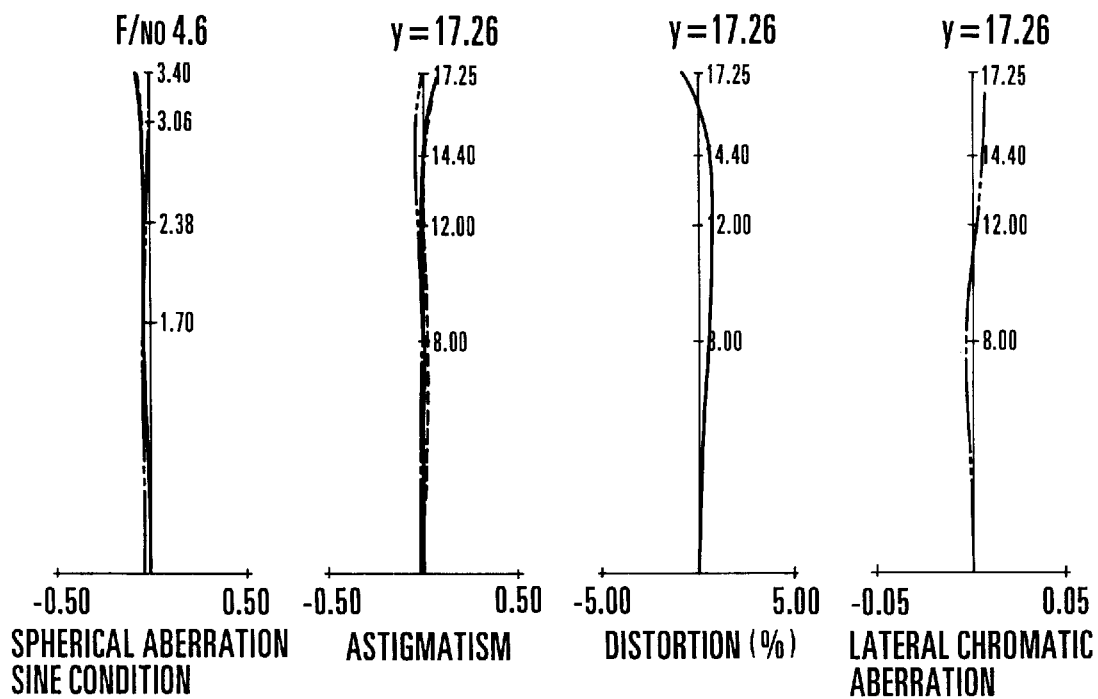
FIGS. 86A to 86D are graphic representations of the aberrations of the numerical example 13 in the wide-angle end.
Figures 87A, 87B, 87C, 87D:
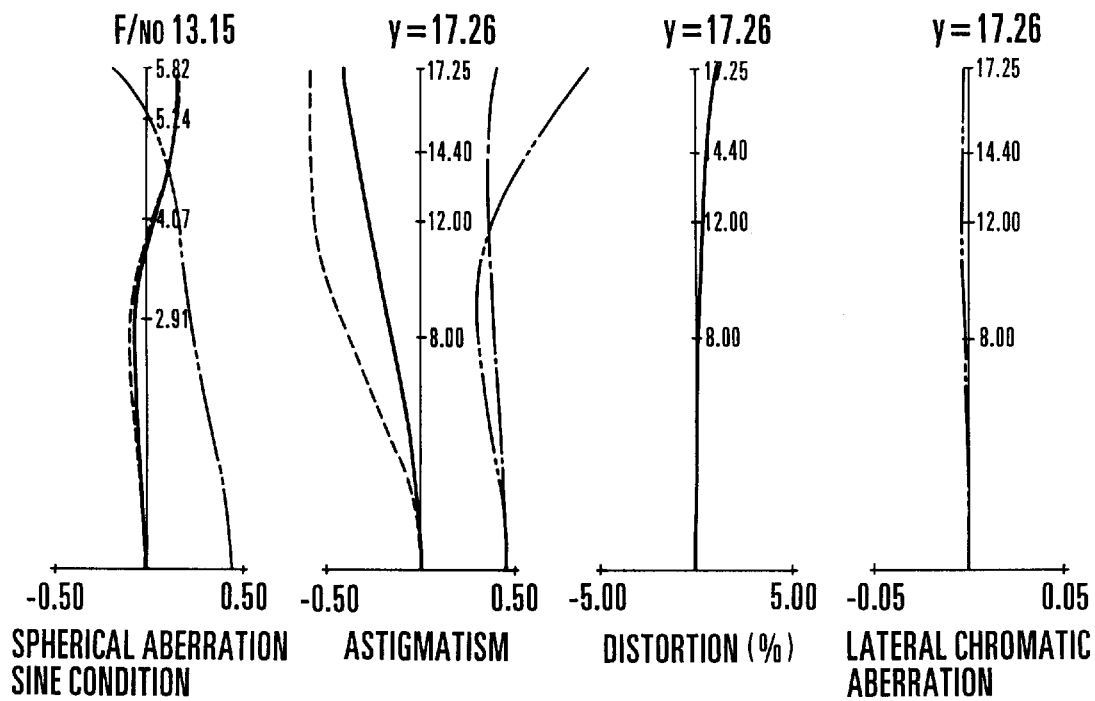
FIGS. 87A to 87D are graphic representations of the aberrations of the numerical example 13 in the telephoto end.
Figure 92:
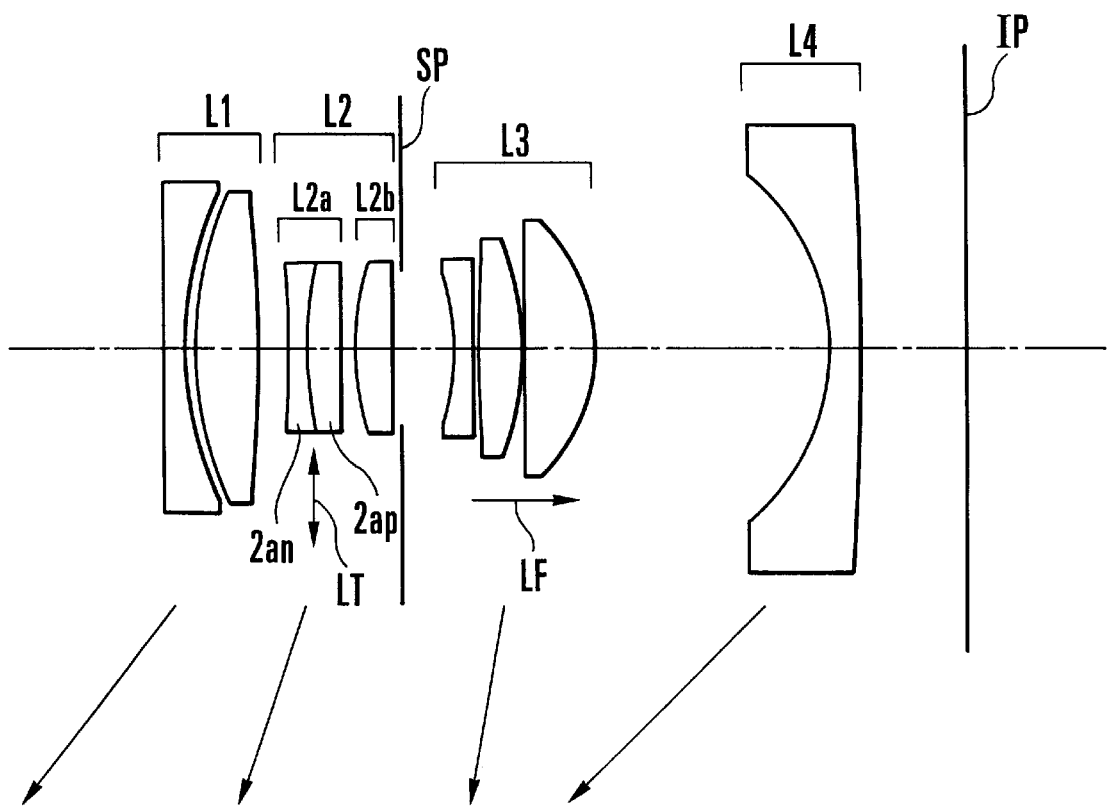
FIG. 92 is a longitudinal section view of a numerical example 14 of the zoom lens.
Figure 95A:
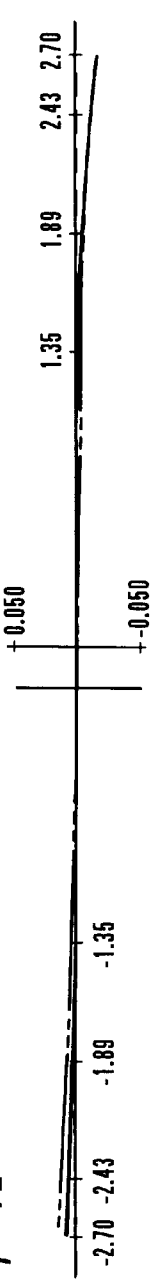
FIGS. 95A and 95B are graphic representations of the aberrations of the numerical example 14 in the wide-angle end at image heights of y=12 and y=0, respectively, in the normal state.
Figure 95B:
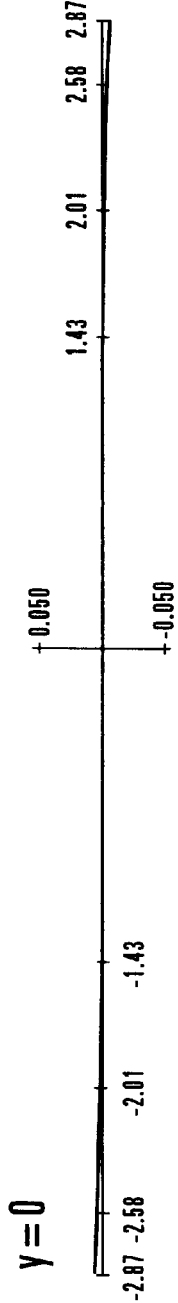
Figure 96A:
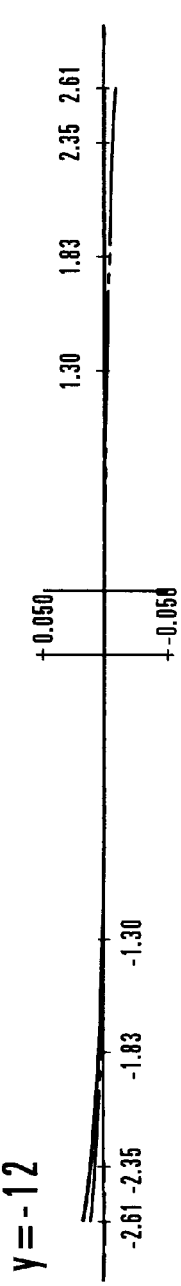
FIGS. 96A to 96C are graphic representations of the aberrations of the numerical example 14 in the wide-angle end at image heights of y=−12, y=12 and y=0, respectively, in the image stabilizing state for the tilting of 0.2°.
Figure 96B:
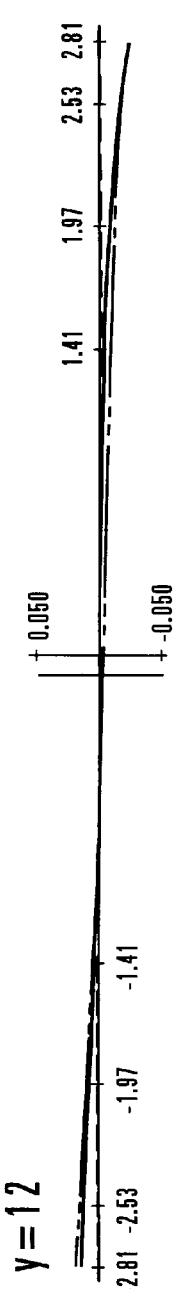
Figure 96C:
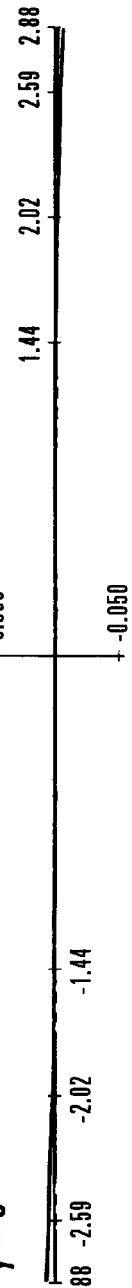
Figure 97A:
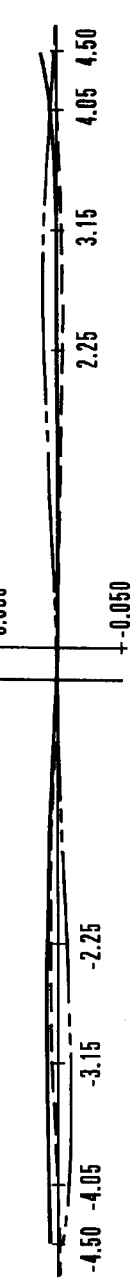
FIGS. 97A and 97B are graphic representations of the aberrations of the numerical example 14 in the telephoto end at image heights of y=12 and y=0, respectively, in the normal state.
Figure 97B:
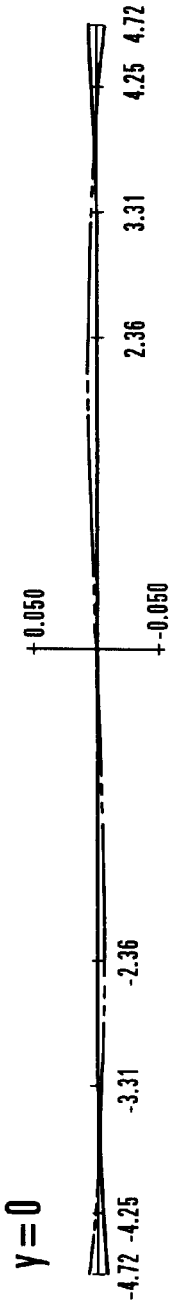
Figure 98A:
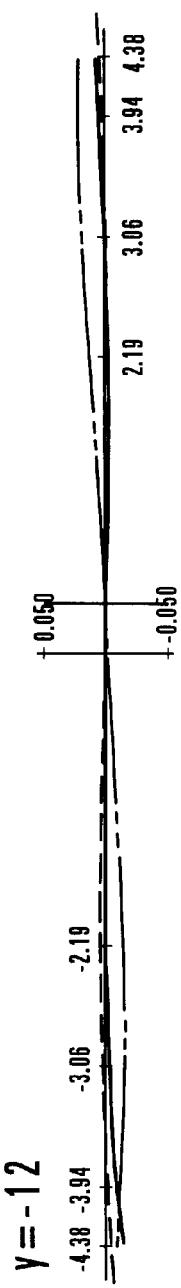
FIGS. 98A to 98C are graphic representations of the aberrations of the numerical example 14 in the telephoto end at image heights of y=−12, y=12 and y=0, respectively, in the image stabilizing state for the tilting of 0.2°.
Figure 98B:
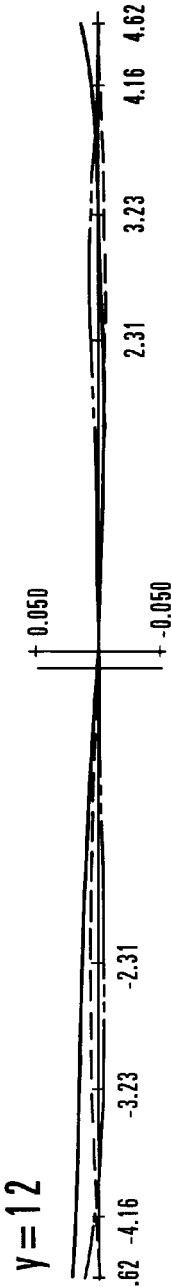
Figure 98C:
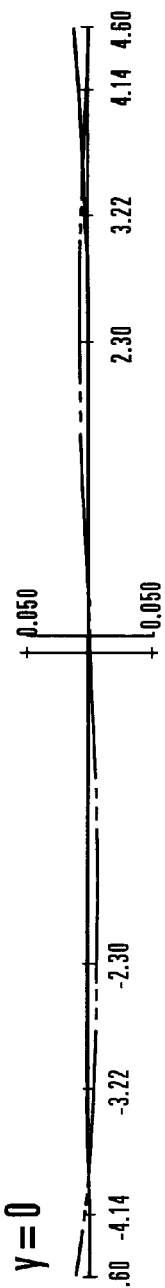
Figures 99A, 99B, 99C:
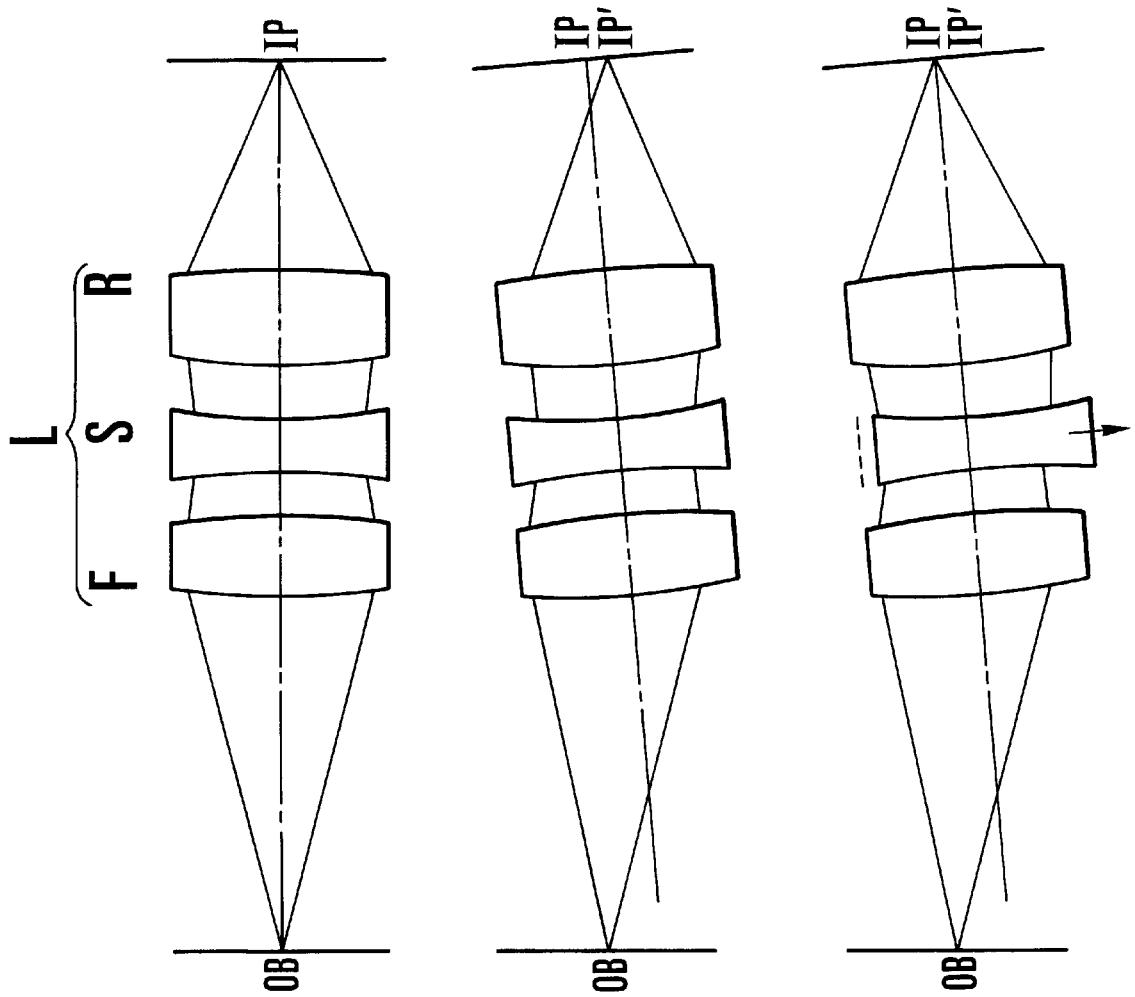
FIGS. 99A to 99C are diagrams for explaining the compensation for the shaking of an image by the shift image stabilizing method.

FIGS. 1, 8, 15, 22, 29, 36, 43, 50, 57, 64, 71, 78, 85 and 92 in block diagrams respectively show numerical examples 1 to 14 of zoom lenses of the invention at the wide-angle end. FIGS. 99A to 99C are diagrams of geometry for explaining the shift-image stabilizing method for compensating for the shaking of a photographed image caused by the vibration of the optical system.

FIGS. 2A to 2D, 9A to 9D, 16A to 16D, 23A to 23D, 30A to 30D, 37A to 37D, 44A to 44D, 51A to 51D, 58A to 58D, 65A to 65D, 72A to 72D, 79A to 79D, 86A to 86D and 93A to 93D graphically show the aberrations of the numerical examples 1 to 14 of the optical systems, respectively, at the wide-angle end. FIGS. 3A to 3D, 10A to 10D, 17A to 17D, 24A to 24D, 31A to 31D, 38A to 38D, 45A to 45D, 52A to 52D, 59A to 59D, 66A to 66D, 73A to 73D, 80A to 80D, 87A to 87D and 94A to 94D graphically show the aberrations of the numerical examples 1 to 14 of the optical systems, respectively, at the telephoto end.

FIGS. 4A and 4B, 11A and 11B, 18A and 18B, 25A and 25B, 32A and 32B, 39A and 39B, 46A and 46B, 53A and 53B, 60A and 60B, 67A and 67B, 74A and 74B, 81A and 81B, 88A and 88B and 95A and 95B graphically show the aberrations of the numerical examples 1 to 14 of the optical systems at the wide-angle end at image heights of y=12 and y=0, respectively, in the normal state. FIGS. 5A to 5C, 12A to 12C, 19A to 19C, 26A to 26C, 33A to 33C, 40A to 40C, 47A to 47C, 54A to 54C, 61A to 61C, 68A to 68C, 75A to 75C, 82A to 82C, 89A to 89C and 96A to 96C graphically show the aberrations of the numerical examples 1 to 14 of optical systems at the wide-angle end at image heights of y=−12, y=12 and y=0, respectively, in the image stabilizing state for the tilting of 0.2°. FIGS. 6A and 6B, 13A and 13B, 20A and 20B, 27A and 27B, 34A and 34B, 41A and 41B, 48A and 48B, 55A and 55B, 62A and 62B, 69A and 69B, 76A and 76B, 83A and 83B, 90A and 90B and 97A and 97B graphically show the aberrations of the numerical examples 1 to 14 of the optical systems at the telephoto end at image heights of y=12 and y=0, respectively, in the normal state. FIGS. 7A to 7C, 14A to 14C, 21A to 21C, 28A to 28C, 35A to 35C, 42A to 42C, 49A to 49C, 56A to 56C, 63A to 63C, 70A to 70C, 77A to 77C, 84A to 84C, 91A to 91C and 98A to 98C graphically show the aberrations of the numerical examples 1 to 14 of optical systems at the telephoto end at image heights of y=−12, y=12 and y=0, respectively, in the image stabilizing state for the tilting of 0.2°.

Incidentally, in the normal state, the aberration curves at another image height y=−12 is symmetric to those at the image height y=+12. Therefore, the aberrations at the image height y=+12 only are shown.

Of the aberration curves, the longitudinal and lateral spherical aberrations are shown by the solid line for the spectral d-line, by the dashed line for the sine condition, and by the double-dot and single-dash line for the spectral g-line.

The astigmatism is shown in the sagittal image plane by the solid line for the d-line and in the meridional image plane by the dashed line for the d-line, in the sagittal image plane by the dot and dash line for the g-line and in the meridional image plane by the double-dot and single-dash line for the g-line. (The same applies to all the following.)

The distortion is shown by the solid line for the d-line, and the lateral chromatic aberration is shown by the double-dot and single-dash line for the g-line.

First, with reference to FIGS. 99A to 99C, an explanation will be provided about the shift-image stabilizing method for compensating for the shaking of an image of an object to be photographed caused by the vibration of an optical system. FIG. 99A represents the correlation between an object point OB and an image IP formed by a photographic lens L, in the normal state, which is obtained before the photographic lens L vibrates.

In the state shown in FIG. 99A, the position of the image IP on a focal plane is a predetermined location within the frame at which the photographer intends to form the object image. When, from the position shown in FIG. 99A, the optical system vibrates as shown in FIG. 99B, the image IP would move to a point IP'. To compensate for this movement, a lens unit S serving as an image-stabilizing lens is made to shift in a direction perpendicular to an optical axis until the image IP' reaches the same position that the photographer desires (i.e., the position of the image IP), as shown in FIG. 99C.

In the following, using the diagrams of this principle, the image qualities in the normal state and the image-stabilizing state will be considered. First, what can be said on the principle of compensation for the image shaking is that, in comparison between before the image shakes, i.e., in the normal state shown in FIG. 99A, and after the image shake has been compensated for, i.e., in the image-stabilizing state shown in FIG. 99C, the path of light rays, that have emerged from the image-stabilizing lens S, then pass through a lens unit R and then reach the focal plane hardly changes at all between before and after the compensation, and that only the light path in the image-stabilizing lens S and a lens unit F that lies on the object side thereof is caused to change. In other words, a variation of image quality occurring during the image stabilization (hereinafter referred to as image-stabilizing aberration components) results from the variation of each of the light paths in the front lens unit F and in the image-stabilizing lens S, and the rear lens unit R does not contribute to the occurrence of the image-stabilizing aberration components.

Therefore, a theory of suppressing the occurrence of the image-stabilizing aberration components to a minimum may be discussed in the dimensions of aberration coefficients. If so, for the reasons described above, there is a need to rewrite the decentering aberration coefficients which have been usually defined on the basis of the object side, taking the image side as the basis to obtain other decentering aberration coefficients (hereinafter referred to as image-stabilizing aberration coefficients). Then, aberration coefficients that are the elements of the image-stabilizing aberration coefficients, i.e., the values of contribution to the aberration coefficients that the image-stabilizing lens S and the front lens unit F make respectively, must be determined appropriately to reduce the image-stabilizing aberration coefficients to zero or within the tolerances. Further, in the zoom lens, for every focal length, desired ones of the image-stabilizing aberration coefficients have to be satisfied. For this purpose, it is necessary to set forth the aberration coefficients of the image-stabilizing lens S and the front lens unit F as simultaneous solutions of zooming.

However, even if the occurrence of the image-stabilizing aberration components for every focal length has been suppressed to a minimum, this does not always assure that the resultant values of aberration coefficients of the image-stabilizing lens S and the front lens unit F coincide with those for obtaining a good image quality in the normal state. Therefore, it is also necessary that this subsystem has such aberration coefficients as to satisfy the aberration coefficients for the normal state of the entire system. As has been discussed above, conclusively, the various correlations must be formed and simultaneously satisfied.

Next, the correlations of the aberration coefficients are described in a bit more detail by decomposing them to intrinsic coefficients and characteristic matrices in the optical system (see "A study on the optical design of zoom lens" by Keizo Yamaji (Canon Research Report No. 3)).

For a j-th zooming position, the aberration coefficient of a subsystem or an i-th lens unit in a domain of degree "n" is written by vector as Sijn, the intrinsic coefficient as S0in and the characteristic matrix as Aijn. The following correlation is then established:

Sijn=S0in·Aijn (n=1, 3, 5 . . . )

Concerning the composite system (entire system), assuming that the total sum of the lens units is N, the following expression is established:

$$Sjn = \sum_{i=1}^{N} Sijn$$

Here, the intrinsic coefficient is a set of aberration coefficients obtained by calculation with the absolute value of the refractive power taken at "1", the front principal plane in coincidence with the pupil, a paraxial ray of light at an incident height of "1" with the angle of incidence at "0", and a principal ray of the axial beam at an incident height of "0" with the angle of incidence at "−1", and depends only on the parameters of the subsystem, such as the radius of curvature, the refractive index, the thickness, and the air separation, or the so-called "lens shape". The characteristic matrix, on the other hand, does not depend on the lens shape at all. That is, the characteristic matrix is a composite matrix of those matrices which represent the focal length, the position of the object point, the position of a stop and the passage of light rays, representing, so to speak, the operative position of the subsystem of a certain shape, and depends only on the so-called "power arrangement".

Now assuming that the image-stabilizing lens S is the K-th lens, the simultaneous fulfillment of the requirements of minimizing the produced amount of image-stabilizing aberrations in each focal length and of correcting well the image aberrations in the normal state is, therefore, translated to nothing more than that the lens units constituting the image-stabilizing lens S and the front lens unit F having their respective intrinsic coefficients S0in (i=1, . . . , K) and their respective characteristic matrices Aijn (i=1, . . . , K) determined appropriately to obtain the motion characteristics by linear transformation in the form of the aberration coefficients Sijn (i=1, . . . , K) which satisfy desired ones of the image-stabilizing aberration coefficients. At the same time, since the (N−K) remaining lens units constitute the rear lens unit R, these aberration coefficients are made to be canceled by other aberration coefficients Sijn (i=K+1, . . . , N), which are also the motion characteristics obtained by linear transformation from their respective intrinsic coefficients S0in (i=K+1, . . . , N) and their respective characteristic matrices Aijn (i=K+1, . . . , N). Thus, for every focal length, desired values of the aberration coefficients Sjn of the entire system can be obtained.

According to the present invention, as described above, the optical system is decomposed to the intrinsic coefficients and characteristic matrices, which are then analyzed, so that a compact image-stabilizing zoom lens in a simple form can be obtained, despite the increase of the zoom ratio to as high as 5, while nonetheless permitting good correction of aberrations to be achieved in both of the normal state and the image-stabilizing state. In actual practice, it has been found that the construction and arrangement should be made as follows.

First, the zoom lens is constructed as comprising, in order from an object side, a first lens unit of positive refractive power, a second lens unit of positive refractive power, a third lens unit of positive refractive power and a fourth lens unit of negative refractive power, in which, during zooming from the wide-angle end to the telephoto end, the separation between the first lens unit and the second lens unit increases and the separation between the third lens unit and the fourth lens unit decreases.

Then, it has been found that the second lens unit should be constructed as comprising a front lens subunit of negative refractive power and a rear lens subunit of positive refractive power, and the front lens subunit is made to move in directions perpendicular to an optical axis so as to compensate for image shaking.

Next, specific embodiments of the invention are described. In all the lens block diagrams, L1 denotes the first lens unit of positive refractive power, L2 denotes the second lens unit of positive refractive power, L3 denotes the third lens unit of positive refractive power and L4 denotes the fourth lens unit of negative refractive power. The second lens unit L2 is composed of the front lens subunit L2a of negative refractive power and the rear lens subunit L2b of positive refractive power. An aperture stop SP is disposed adjacent to the second lens unit L2 on the image side thereof. IP stands for an image plane or focal plane. During zooming from the wide-angle end to the telephoto end, all the lens units L1 to L4 move toward the object side as indicated by the arrows in each of the lens block diagrams, in such relation that the separation between the first lens unit L1 and the second lens unit L2 increases and the separation between the third lens unit L3 and the fourth lens unit L4 decreases.

In order to compensate for the shaking of a photographed image (image shake) occurring when the optical system vibrates, the front lens subunit L2a is made to move in directions perpendicular to the optical axis, as indicated by the arrow LT. That is, the shift-image stabilizing method is employed.

Focusing from an infinitely distant object to an object at the minimum distance is carried out by moving the third lens unit L3 toward the image side as indicated by the arrow LF.

In the present embodiments, such an inner-focusing method is employed and the shaking of the image at the focal plane is compensated for in such a way. Along with this, all the lens units are specified as described above. With the help of these, the shake of the image is compensated for while limiting the bulk and size of the optical system as a whole to a minimum. As the front lens subunit L2a moves in directions perpendicular to the optical axis, decentering aberrations, especially, decentering coma, decentering astigmatism and decentering field curvature, are produced. However, the produced amount of aberrations is minimized to obtain good optical performance.

The object of the invention can be accomplished when the optical system takes the above-described features. To further lessen the range of variation of decentering aberrations with variation of the magnitude of vibrations to obtain good optical performance, it is preferred to satisfy at least one of the following features or conditions.

(a) The overall focal length f12at at the telephoto end of the first lens unit L1 and the front lens subunit L2a and the focal length f1 of the first lens unit L1 lie within the following ranges:

$$-3 < \text{ft}/\text{f12}at < -0.6 \tag{1}$$

$$0.1 < \text{ft}/\text{f1} < 1.5 \tag{2}$$

where ft is the focal length in the telephoto end of the entire lens system.

The inequalities of condition (1) are concerned with the overall focal length of the first lens unit L1 and the front lens subunit L2a in the telephoto end, and the inequalities of condition (2) are concerned with the focal length of the first lens unit L1. Particularly, in the telephoto end, the produced amount of image-stabilizing aberration components increases largely. On this account, the conditions (1) and (2) specify the power arrangement (characteristic matrices) of the first lens unit L1 and the front lens subunit L2a and have the aim chiefly to maintain good stability of image aberrations in the normal state over the entire zooming range, while still permitting the produced amount of image-stabilizing aberration components to be suppressed to a minimum.

Either when the upper limits of the conditions (1) and (2) are exceeded, or when their lower limits are exceeded, it becomes difficult to improve the image-stabilizing aberration components, beginning with the image-stabilizing coma and image-stabilizing astigmatism, at first at the telephoto end and then at all the other focal lengths in correlation with all aberrations in the normal state, beginning with the spherical aberration and coma, no matter how the power arrangement (characteristic matrices) of the subsequent lens units may be changed. Also, particularly, when the upper limit of the condition (2) is exceeded, as this means that the refractive power of the first lens unit L1 is too strong, strengthening of the powers of the front lens subunit L2a and the rear lens subunit L2b results. Then, although the driving movement of the front lens subunit L2a is reduced, the resultant values of all the intrinsic coefficients are not satisfied as the simultaneous solutions, if the first lens unit L1, the front lens subunit L2a and the rear lens subunit L2b remain in simple forms. So, the bulk and size of the lens system come to increase objectionably.

In the present embodiments, for more improved results, it is preferred to alter the numerical ranges of the conditions (1) and (2) as follows:

$$-1.87 < \text{ft}/\text{f12}at < -0.92 \tag{1a}$$

$$0.32 < \text{ft}/\text{f1} < 0.82 \tag{2a}$$

When these conditions are satisfied, an even better quality is obtained with the optical system both in the image-stabilizing state and the normal state.

(b) The front lens subunit L2a includes one negative lens 2an and one positive lens 2ap, and, letting the mean value of refractive indices and Abbe numbers of the materials of negative lenses included in the front lens subunit L2a be denoted by N2an and ν2an, respectively, and the mean value of refractive indices and Abbe numbers of the materials of positive lenses included in the front lens subunit L2a be denoted by N2ap and ν2ap, respectively, the following conditions are satisfied:

$$\nu 2ap < \nu 2an \tag{3}$$

$$N2ap < N2an \tag{4}$$

Incidentally, the term "refractive index" herein used means the one for the spectral d-line. The inequalities of conditions (3) and (4) have an aim to improve optical performance during image stabilization. In the present embodiments, the front lens subunit L2a is made to include one negative lens and one positive lens, and the conditions (3) and (4) are satisfied to thereby suppress the production of, mainly, decentering chromatic aberrations. At the same time, for the second lens unit L2 as a whole, the intrinsic coefficients of the first degree required as the values of contribution in the normal state are satisfied to obtain good image quality.

(c) The front lens subunit L2a consists of, in order from the object side, a negative lens of bi-concave form and a positive lens having a convex surface facing the object side.

These forms are determined according to the invention as simultaneous solutions between the image-stabilizing state and the normal state in each focal length of the optical system, being simplest among the lens forms which satisfy all the required intrinsic coefficients in the domains of first, third and fifth degrees of the front lens subunit L2a at once. By this, the load on the drive for moving the image-stabilizing lens is reduced. Further, the two lenses of the front lens subunit L2a may otherwise be formed as a cemented lens, so that the influence due to the error in manufacturing can be reduced.

(d) The front lens subunit L2a consists of, in order from the object side, a negative lens of bi-concave form and a positive lens having a convex surface facing the object side, and the radius of curvature R2a1 of a surface on the object side of the negative lens and the radius of curvature R2a2 of a surface on the image side of the positive lens fall in the following relationship:

$$-1.78 < \frac{R2a1 + R2a2}{R2a1 - R2a2} < -0.18 \tag{5}$$

By satisfying the condition (5), both of the optical performances in the image stabilizing state and the normal state are satisfactorily maintained.

(e) The first lens unit L1 consists of, in order from the object side, a negative lens of meniscus form having a concave surface facing the image side and a positive lens having a convex surface facing the object side.

These forms are determined according to the invention as simultaneous solutions between the image-stabilizing state and the normal state in each focal length of the optical system, being simplest among the lens forms which satisfy all the required intrinsic coefficients in the domains of first, third and fifth degrees of the first lens unit L1 at once. By this, the construction and arrangement of the constituent lenses in the first lens unit L1 are simplified, which, in turn, assure minimization of the size of the entire lens system, while still permitting high optical performance to be obtained throughout the entire zooming range.

(f) The focal lengths f2b, f3 and f4 of the rear lens subunit L2b, the third lens unit L3 and the fourth lens unit L4 respectively lie within the following ranges:

$$2.5 < \text{ft}/\text{f2}b < 8 \tag{6}$$

$$2 < \text{ft}/\text{f3} < 9 \tag{7}$$

$$-14 < ft/f4 < -5 \quad (8)$$

where ft is the focal length at the telephoto end of the entire lens system.

The inequalities of conditions (6), (7) and (8) are concerned with the focal lengths of the ones of the lens units of the optical system which follow the movable lens unit for stabilizing the image (the front lens subunit L2$a$) or which constitute the rear lens unit R (in FIGS. 99A to 99C), which specify the power arrangement (characteristic matrices) of these lens units and which have an aim to cancel the aberration coefficients of the composite system of the front lens subunit L2$a$ (the image-stabilizing lens S in FIGS. 99A to 99C) and the first lens unit L1 (the front lens unit F in FIGS. 99A to 99C) in order to maintain good image quality between the normal state and the image-stabilizing state.

Either when the upper limits of the conditions (6), (7) and (8) are exceeded, or when their lower limits are exceeded, it becomes difficult to balance all aberrations, beginning with spherical aberration and coma in each focal length.

In the present embodiments, it is more preferred to alter the numerical ranges of the conditions (6), (7) and (8) as follows:

$$4.1 < ft/f2b < 5.6 \quad (6a)$$

$$4.0 < ft/f3 < 5.9 \quad (7a)$$

$$-9.9 < ft/f4 < -7.1 \quad (8a)$$

By this, an even better performance is obtained in the image-stabilizing state and the normal state.

(g) The rear lens subunit L2$b$ consists of a single positive lens. The third lens unit L3 consists of a negative lens at least one surface of which is aspherical and a positive lens at least one surface of which is aspherical. The fourth lens unit L4 consists of a single negative lens of meniscus form concave toward the object side, at least one surface of which is aspherical.

These forms are determined according to the invention as simultaneous solutions in each focal length of the optical system, being simplest among the lens forms which satisfy all the required intrinsic coefficients in the domains of first, third and fifth degrees of those lens units which constitute the rear lens unit R that follows the front lens subunit L2$a$, at once. By this, the optical performance is well maintained in the image-stabilizing state and the normal state.

For the third lens unit L3, if one positive lens is added, the intrinsic coefficients are better satisfied. However, the introduction of the aspheric surface provides a high degree of freedom for satisfying the intrinsic coefficients for spherical aberration and coma. So, even if it is constructed with only two lenses in total as described above, the intrinsic coefficients are sufficiently satisfied. Further, for the fourth lens unit L4, even if, as the aspheric surface is introduced, only one negative lens is in use, the intrinsic coefficients in the domain of the third degree are almost satisfied. Concerning the intrinsic coefficients in the domain of the first degree (chromatic aberrations), if the conditions (1) and (2) and the intrinsic coefficients of the first lens unit L1 in the domain of the first degree are satisfied, it results in the characteristic matrices (power arrangement) that the chromatic aberrations fall in canceling relationship with those of the first lens unit L1, since the aberration structure is such that, even if the fourth lens unit L4 is composed of only one negative lens, the intrinsic coefficients in the domain of the first degree, too, are satisfied.

In such a manner, the fourth lens unit L4 as the main variator is constructed with only one negative lens. Even if a compact layout is employed, therefore, the spaces for zooming movements can be adequate, giving an additional advantage of achieving a great increase of the zoom ratio.

(h) Incidentally, in the embodiments of the invention, focusing is performed by moving the third lens unit L3 along the optical axis toward the image side. However, the first lens unit L1 may be moved supplementally.

(i) The stop SP is preferably disposed between the second lens unit L2 and the third lens unit L3 in view of the aberration structure. Accordingly, the first lens unit L1 and the fourth lens unit L4, too, can be made relatively smaller in diameter.

(j) During zooming, the stop SP may be moved in unison with the second lens unit L2. Accordingly, the operating mechanism can be simplified in structure. Also, the fourth lens unit L4, too, may be moved in unison with the second lens unit L2. According to this, the operating mechanism can be further simplified. Incidentally, in the case of retracting the lens barrel, it is better to move the fourth lens unit L4 independently, because the total length of the complete lens when retracted can be made shorter.

(k) For the negative lens in the fourth lens unit L4, if the material to be used has a refractive index of not less than 1.8, good image plane characteristics are obtained particularly at the wide-angle end. However, even if the refractive index is equal to or higher than 1.6 and lower than 1.8, a sufficiently good performance can be obtained. The glasses in this range of refractive index are available at relatively low cost. If the negative lens in the fourth lens unit L4 is made aspherical at both surfaces, the intrinsic coefficients are better satisfied. If only one of the surfaces is made aspherical, the asphere is better applied to the surface on the image side, so that the intrinsic coefficients are satisfied more easily.

The surface on the object side and the surface on the image side, if taken out of coaxial relation in manufacturing, are decentered relative to each other, differently affecting the optical performance. The aspheric surface on the object side gives lesser influence. Therefore, except for production techniques of high accuracy, it is preferred to apply the aspheric surface to the surface on the object side.

Next, fourteen numerical examples 1 to 14 of the invention are shown. In the numerical data for the examples 1 to 14, ri is the radius of curvature of the i-th lens surface, when counted from the object side, di is the i-th lens thickness or air separation, when counted from the object side, and ni and vi are respectively the refractive index and Abbe number of the material of the i-th lens element, when counted from the object side.

The shape of an aspheric surface is expressed in the coordinates with an X axis in the axial direction (advancing direction of light) and a Y axis in the direction perpendicular to an optical axis, by the following equation:

$$X = \frac{(1/R)Y^2}{1 + \sqrt{1-(1+K)(Y/R)^2}} + BY^4 + CY^6 + DY^8 + EY^{10}$$

where R is the radius of the osculating sphere, K is the eccentricity, and B, C, D and E are the aspheric coefficients.

In the values of the aberration coefficients, the notation "e-X" means "$\times 10^{-X}$". The values of the factors in the above-described conditions (1) to (8) for the numerical examples 1 to 14 are listed in Table-1.

Numerical Example 1:

f = 23.07~108.65    Fno = 1:4.60~13.15    2ω = 73.6°~18.0°

| | | | |
|---|---|---|---|
| r1 = 395.080 | d1 = 1.20 | n1 = 1.78178 | ν1 = 25.7 |
| r2 = 16.176 | d2 = 0.65 | | |
| r3 = 17.088 | d3 = 3.45 | n2 = 1.70385 | ν2 = 54.6 |
| r4 = −67.697 | d4 = Variable | | |
| r5 = −31.420 | d5 = 1.00 | n3 = 1.87551 | ν3 = 41.3 |
| r6 = 17.757 | d6 = 1.88 | n4 = 1.84700 | ν4 = 23.8 |
| r7 = −179.302 | d7 = 1.83 | | |
| r8 = 15.810 | d8 = 1.98 | n5 = 1.61192 | ν5 = 38.1 |
| r9 = −88.737 | d9 = 0.20 | | |
| r10 = ∞(Stop) | d10 = Variable | | |
| *r11 = −14.921 | d11 = 1.00 | n6 = 1.84700 | ν6 = 23.8 |
| r12 = −130.115 | d12 = 0.64 | | |
| r13 = 64.398 | d13 = 5.00 | n7 = 1.58551 | ν7 = 61.2 |
| *r14 = −7.781 | d14 = Variable | | |
| r15 = −10.657 | d15 = 1.75 | n8 = 1.88100 | ν8 = 41.0 |
| *r16 = −10345.970 | d16 = Variable | | |

*) Aspheric Surface

| Variable Separation | Focal 23.07 | Length 108.65 |
|---|---|---|
| d4 | 1.75 | 18.15 |
| d10 | 3.00 | 13.31 |
| d14 | 10.45 | 2.00 |

Aspheric Coefficients:

| | | | |
|---|---|---|---|
| r11: | K = 6.0689e + 00 | B = −7.8230e − 05 | C = −2.9198e − 06 |
| | D = 2.4093e − 07 | E = −2.0559e − 09 | |
| r14: | K = 0.0000e + 00 | B = 1.3212e − 04 | C = 1.1836e − 06 |
| | D = −1.9550e − 08 | E = 1.1472e − 09 | |
| r16: | K = 0.0000e + 00 | B = −1.2768e − 04 | C = 5.9753e − 07 |
| | D = −2.6892e − 09 | E = 4.5436e − 12 | |

Numerical Example 2:

f = 26.37~124.19    Fno = 1:4.60~13.15    2ω = 66.4°~15.8°

| | | | |
|---|---|---|---|
| r1 = 390.681 | d1 = 1.20 | n1 = 1.69858 | ν1 = 30.0 |
| r2 = 18.170 | d2 = 0.64 | | |
| r3 = 19.052 | d3 = 3.76 | n2 = 1.68171 | ν2 = 56.1 |
| r4 = −134.010 | d4 = Variable | | |
| r5 = −64.714 | d5 = 1.00 | n3 = 1.86070 | ν3 = 42.0 |
| r6 = 20.897 | d6 = 1.86 | n4 = 1.84700 | ν4 = 23.8 |
| r7 = 235.548 | d7 = 3.57 | | |
| r8 = 15.913 | d8 = 2.13 | n5 = 1.55950 | ν5 = 44.1 |
| r9 = −205.847 | d9 = 0.20 | | |
| r10 = ∞(Stop) | d10 = Variable | | |
| *r11 = −17.373 | d11 = 1.00 | n6 = 1.84700 | ν6 = 23.8 |
| r12 = −100.585 | d12 = 1.31 | | |
| r13 = 63.491 | d13 = 5.00 | n7 = 1.51323 | ν7 = 67.3 |
| *r14 = −8.708 | d14 = Variable | | |
| r15 = −11.925 | d15 = 1.75 | n8 = 1.70062 | ν8 = 55.0 |
| *r16 = 98.355 | d16 = Variable | | |

*) Aspheric Surface

| Variable Separation | Focal 26.37 | Length 124.19 |
|---|---|---|
| d4 | 1.75 | 23.95 |
| d10 | 3.00 | 13.38 |
| d14 | 12.87 | 2.00 |

Aspheric Coefficients:

| | | | |
|---|---|---|---|
| r11: | K = 5.4758e + 00 | B = −4.6748e − 05 | C = −1.1883e − 06 |
| | D = 1.3241e − 07 | E = −3.0295e − 09 | |
| r14: | K = 0.0000e + 00 | B = 1.0914e − 04 | C = 8.8794e − 07 |
| | D = −8.9055e − 09 | E = 4.5992e − 10 | |
| r16: | K = 0.0000e + 00 | B = 9.4592e − 05 | C = 3.2952e − 07 |
| | D = −1.0150e − 09 | E = 9.9944e − 13 | |

Numerical Example 3:

f = 27.19~128.06    Fno = 1:4.60~13.15    2ω = 64.8°~15.3°

| | | | |
|---|---|---|---|
| r1 = −147.142 | d1 = 1.20 | n1 = 1.66734 | ν1 = 31.4 |
| r2 = 17.736 | d2 = 0.65 | | |
| r3 = 18.692 | d3 = 4.56 | n4 = 1.67423 | ν2 = 56.4 |
| r4 = −79.859 | d4 = Variable | | |
| r5 = −107.326 | d5 = 1.00 | n5 = 1.88100 | ν3 = 41.0 |
| r6 = 24.105 | d6 = 1.83 | n6 = 1.84700 | ν4 = 23.8 |
| r7 = 195.594 | d7 = 2.49 | | |
| r8 = 14.739 | d8 = 2.12 | n8 = 1.59792 | ν5 = 38.0 |
| r9 = 143.109 | d9 = 0.58 | | |
| r10 = ∞(Stop) | d10 = Variable | | |
| *r11 = −29.165 | d11 = 1.00 | n6 = 1.84880 | ν6 = 24.4 |
| r12 = 72.022 | d12 = 1.61 | | |
| r13 = 44.741 | d13 = 5.00 | n7 = 1.48700 | ν7 = 70.4 |
| *r14 = −8.703 | d14 = Variable | | |
| r15 = −12.169 | d15 = 1.75 | n8 = 1.69700 | ν8 = 55.5 |
| *r16 = 90.625 | d16 = Variable | | |

*) Aspheric Surface

| Variable Separation | Focal 27.19 | Length 128.06 |
|---|---|---|
| d4 | 1.75 | 22.36 |
| d10 | 3.00 | 11.67 |
| d14 | 12.74 | 2.00 |

Aspheric Coefficients:

| | | | |
|---|---|---|---|
| r11: | K = 1.2566e + 01 | B = −1.3859e − 04 | C = −2.1713e − 06 |
| | D = 1.0259e − 07 | E = −3.8278e − 09 | |
| r14: | K = 0.0000e + 00 | B = 8.9051e − 05 | C = 6.1426e − 07 |
| | D = −1.2156e − 08 | E = 4.6838e − 10 | |
| r16: | K = 0.0000e + 00 | B = −8.6357e − 05 | C = 3.0732e − 07 |
| | D = −9.9206e − 10 | E = 1.0478e − 12 | |

Numerical Example 4:

f = 28.02~131.94    Fno = 1:4.60~13.15    2ω = 63.3°~14.9°

| | | | |
|---|---|---|---|
| r1 = −94.083 | d1 = 1.20 | n2 = 1.64873 | ν1 = 32.8 |
| r2 = 18.077 | d2 = 0.62 | | |
| r3 = 19.019 | d3 = 4.68 | n2 = 1.65266 | ν2 = 57.4 |
| r4 = −66.921 | d4 = Variable | | |
| r5 = −113.809 | d5 = 1.00 | n3 = 1.88100 | ν3 = 41.0 |
| r6 = 28.739 | d6 = 1.82 | n4 = 1.84700 | ν4 = .23.8 |
| r7 = 278.504 | d7 = 0.80 | | |
| r8 = 15.358 | d8 = 2.14. | n5 = 1.59856 | ν5 = 37.9 |
| r9 = 148.984 | d9 = 0.58 | | |
| r10 = ∞(Stop) | d10 = Variable | | |
| *r11 = −34.460 | d11 = 1.00 | n6 = 1.84980 | ν6 = 24.7 |
| r12 = 57.762 | d12 = 1.93 | | |
| r13 = 49.572 | d13 = 5.00 | n7 = 1.48762 | ν7 = 70.3 |
| *r14 = −9.012 | d14 = Variable | | |
| r15 = −12.763 | d15 = 1.75 | n8 = 1.69700 | ν8 = 55.5 |
| *r16 = 89.781 | d16 = Variable | | |

*) Aspheric Surface

| Variable Separation | Focal 28.02 | Length 131.94 |
|---|---|---|
| d4 | 1.75 | 24.64 |
| d10 | 3.00 | 12.14 |
| d14 | 13.39 | 2.00 |

Aspheric Coefficients:

| | | | |
|---|---|---|---|
| r11: | K = 1.4396e + 01 | B = −1.4263e − 04 | C = −1.8780e − 06 |
| | D = 6.5434e − 08 | E = −2.4923e − 09 | |
| r14: | K = 0.0000e + 00 | B = 7.4931e − 05 | C = 4.4220e − 07 |
| | D = −8.3272e − 09 | E = 3.0566e − 10 | |
| r16: | K = 0.0000e + 00 | B = −7.5242e − 05 | C = 2.4318e − 07 |
| | D = −7.3640e − 10 | E = 7.0852e − 13 | |

Numerical Example 5:

| | | | |
|---|---|---|---|
| f = 28.84~135.80 | Fno = 1:4.60~13.15 | 2ω = 61.8°~14.5° | |
| r1 = −143.524 | d1 = 1.20 | n1 = 1.64782 | ν1 = 32.8 |
| r2 = 18.666 | d2 = 0.62 | | |
| r3 = 19.553 | d3 = 4.14 | n2 = 1.64957 | ν2 = 57.6 |
| r4 = −86.519 | d4 = Variable | | |
| r5 = −141.630 | d5 = 1.00 | n3 = 1.88100 | ν3 = 41.0 |
| r6 = 30.085 | d6 = 1.80 | n4 = 1.84700 | ν4 = 23.8 |
| r7 = 227.813 | d7 = 1.58 | | |
| r8 = 15.708 | d8 = 2.15 | n5 = 1.59073 | ν5 = 38.9 |
| r9 = 149.990 | d9 = 0.59 | | |
| r10 = ∞ (Stop) | d10 = Variable | | |
| *r11 = 33.937 | d11 = 1.00 | n6 = 1.85167 | ν6 = 25.3 |
| r12 = 62.519 | d12 = 2.04 | | |
| r13 = 51.161 | d13 = 5.00 | n7 = 1.48700 | ν7 = 70.4 |
| *r14 = −9.260 | d14 = Variable | | |
| r15 = −12.886 | d15 = 1.75 | n8 = 1.69394 | ν8 = 55.6 |
| *r16 = 100.387 | d16 = Variable | | |

*) Aspheric Surface

| Variable Separation | Focal | Length |
|---|---|---|
| | 28.84 | 135.80 |
| d4 | 1.75 | 26.34 |
| d10 | 3.00 | 12.74 |
| d14 | 13.96 | 2.00 |

Aspheric Coefficients:

| | | | |
|---|---|---|---|
| r11: | K = 1.1677e + 01 | B = −1.3037e − 04 | C = −2.1288e − 06 |
| | D = 9.8850e − 08 | E = −3.4649e − 09 | |
| r14: | K = 0.0000e + 00 | B = 7.1160e − 05 | C = 2.7998e − 07 |
| | D = −3.9509e − 09 | E = 2.2035e − 10 | |
| r16: | K = 0.0000e + 00 | B = −7.1277e − 05 | C = 2.2242e − 07 |
| | D = −7.1353e − 10 | E = 7.2242e − 13 | |

Numerical Example 6:

| | | | |
|---|---|---|---|
| f = 29.66~139.68 | Fno = 1:4.60~13.15 | 2ω = 60.4°~14.1° | |
| r1 = −191.725 | d1 = 1.20 | n1 = 1.65594 | ν1 = 32.2 |
| r2 = 18.801 | d2 = 0.62 | | |
| r3 = 19.693 | d3 = 5.00 | n2 = 1.66504 | ν2 = 56.8 |
| r4 = −98.734 | d4 = Variable | | |
| r5 = −138.728 | d5 = 1.00 | n3 = 1.88100 | ν3 = 41.0 |
| r6 = 28.689 | d6 = 1.82 | n4 = 1.84700 | ν4 = 23.8 |
| r7 = 215.111 | d7 = 0.87 | | |
| r8 = 15.872 | d8 = 2.14 | n5 = 1.59713 | ν5 = 38.1 |
| r9 = 138.822 | d9 = 0.59 | | |
| r10 = ∞(Stop) | d10 = Variable | | |
| *r11 = −37.461 | d11 = 1.00 | n6 = 1.85129 | ν6 = 25.2 |
| r12 = 51.051 | d12 = 2.12 | | |
| r13 = 47.923 | d13 = 5.00 | n7 = 1.48700 | ν7 = 70.4 |
| *r14 = −9.497 | d14 = Variable | | |
| r15 = −13.076 | d15 = 1.75 | n8 = 1.68266 | ν8 = 56.1 |
| *r16 = 182.808 | d16 = Variable | | |

*) Aspheric Surface

| Variable Separation | Focal | Length |
|---|---|---|
| | 29.66 | 139.68 |
| d4 | 1.80 | 26.30 |
| d10 | 3.00 | 12.75 |
| d14 | 14.47 | 2.00 |

Aspheric Coefficients:

| | | | |
|---|---|---|---|
| r11: | K = 1.2090e + 01 | B = −1.3174e − 04 | C = −2.1766e − 06 |
| | D = 1.0281e − 07 | E = −3.5045e − 09 | |
| r14: | K = 0.0000e + 00 | B = 6.0926e − 05 | C = 1.7072e − 07 |
| | D = −2.4472e − 09 | E = 1.7178e − 10 | |
| r16: | K = 0.0000e + 00 | B = −6.6470e − 05 | C = 1.9625e − 07 |
| | D = −6.5471e − 10 | E = 6.6215e − 13 | |

Numerical Example 7:

| | | | |
|---|---|---|---|
| f = 30.49~143.56 | Fno = 1:4.60~13.15 | 2ω = 59.0°~13.7° | |
| r1 = −172.851 | d= 1.20 | n1 = 1.65867 | ν1 = 32.0 |
| r2 = 19.256 | d2 = 0.62 | | |
| r3 = 20.212 | d3 = 5.00 | n2 = 1.68122 | ν2 = 56.1 |
| r4 = −98.243 | d4 = Variable | | |
| r5 = −138.689 | d5 = 1.00 | n3 = 1.88100 | ν3 = 41.0 |
| r6 = 28.984 | d6 = 1.83 | n4 = 1.84700 | ν4 = 23.8 |
| r7 = 211.096 | d7 = 0.64 | | |
| r8 = 16.293 | d8 = 2.12 | n5 = 1.60613 | ν5 = 36.9 |
| r9 = 127.348 | d9 = 0.60 | | |
| r10 = (Stop) | d10 = Variable | | |
| *r11 = −40.161 | d11 = 1.00 | n6 = 1.85149 | ν6 = 25.2 |
| r12 = 46.937 | d12 = 2.15 | | |
| r13 = 49.843 | d13 = 5.00 | n7 = 1.48700 | ν7 = 70.4 |
| *r14 = −9.724 | d14 = Variable | | |
| r15 = −13.556 | d15 = 1.75 | n8 = 1.67706 | ν8 = 56.3 |
| *r16 = 110.000 | d16 = Variable | | |

*) Aspheric Surface

| Variable Separation | Focal | Length |
|---|---|---|
| | 30.49 | 143.56 |
| d4 | 1.91 | 26.73 |
| d10 | 3.00 | 13.02 |
| d14 | 15.27 | 2.00 |

Aspheric Coefficients:

| | | | |
|---|---|---|---|
| r11: | K = 1.1738e + 01 | B = −1.3109e − 04 | C = −1.9990e − 06 |
| | D = 8.9861e − 08 | E = −3.0803e − 09 | |
| r14: | K = 0.0000e + 00 | B = 4.8874e − 05 | C = 8.1531e − 08 |
| | D = −1.3529e − 09 | E = 1.2217e − 10 | |
| r16: | K = 0.0000e + 00 | B = −5.7629e − 05 | C = 1.4892e − 07 |
| | D = −4.7057e − 10 | E = 4.0782e − 13 | |

Numerical Example 8:

| | | | |
|---|---|---|---|
| f = 31.32~147.43 | Fno = 1:4.60~13.15 | 2ω = 57.7°~13.4° | |
| r1 = −962.538 | d1 = 1.20 | n1 = 1.65344 | ν1 = 32.4 |
| r2 = 19.419 | d2 = 0.59 | | |
| r3 = 28.145 | d3 = 3.92 | n2 = 1.64503 | ν2 = 57.8 |
| r4 = −134.032 | d4 = Variable | | |
| r5 = −.138.479 | d5 = 1.00 | n3 = 1.88100 | ν3 = 41.0 |
| r6 = 30.274 | d6 = 1.83 | n4 = 1.84700 | ν4 = 23.8 |
| r7 = 235.322 | d7 = 0.57 | | |
| r8 = 16.458 | d8 = 2.17 | n5 = 1.57941 | ν5 = 40.6 |
| r9 = 171.685 | d9= 0.58 | | |
| r10 = (Stop) | d10 = Variable | | |
| *r11 = −34.037 | d11 = 1.00 | n6 = 1.85802 | ν6 = 27.7 |
| r12 = 51.207 | d12 = 2.03 | | |
| r13 = 48.447 | d13 = 5.00 | n7 = 1.48700 | ν7 = 70.4 |
| *r14 = −9.455 | d14 = Variable | | |
| r15 = −13.211 | d15 = 1.75 | n8 = 1.61258 | ν8 = 59.5 |
| *r16 = 74.012 | d16 = Variable | | |

*) Aspheric Surface

| Variable Separation | Focal | Length |
|---|---|---|
| | 31.32 | 147.43 |
| d4 | 1.75 | 27.50 |
| d10 | 3.00 | 13.89 |
| d14 | 15.63 | 2.00 |

Aspheric Coefficients:

| | | | |
|---|---|---|---|
| r11: | K = 1.0941e + 01 | B = −1.2579e − 04 | C = −2.2857e − 06 |
| | D = 1.0563e − 07 | E = −3.4672e − 09 | |
| r14: | K = 0.0000e + 00 | B = 5.2044e − 05 | C = 1.9721e − 07 |
| | D = −4.2315e − 09 | E = 1.8610e − 10 | |
| r16: | K = 0.0000e + 00 | B = −6.6456e − 05 | C = 1.9593e − 07 |
| | D = −6.6787e − 10 | E = 7.5104e − 13 | |

Numerical Example 9:

f = 31.31~147.28    Fno = 1:4.60~13.15    2ω = 57.7°~13.4°

| | | | |
|---|---|---|---|
| r1 = 305.194 | d1 = 1.20 | n1 = 1.76503 | υ1 = 29.2 |
| r2 = 25.783 | d2 = 0.59 | | |
| r3 = 26.970 | d3 = 2.82 | n2 = 1.63935 | υ2 = 58.1 |
| r4 = −110.820 | d4 = Variable | | |
| r5 = −53.000 | d5 = 1.00 | n3 = 1.87482 | υ3 = 41.3 |
| r6 = 32.088 | d6 = 1.97 | n4 = 1.84700 | υ4 = 23.8 |
| r7 = −224.126 | d7 = 0.20 | | |
| r8 = 19.294 | d8 = 2.10 | n5 = 1.70277 | υ5 = 54.7 |
| r9 = 308.623 | d9 = 0.55 | | |
| r10 = ∞(Stop) | d10 = Variable | | |
| *r11 = −131.454 | d11 = 1.00 | n6 = 1.84925 | υ6 = 30.1 |
| r12 = 25.106 | d12 = 1.53 | | |
| r13 = 48.293 | d13 = 7.00 | n7 = 1.49202 | υ7 = 69.8 |
| *r14 = −9.712 | d14 = Variable | | |
| *r15 = −10.519 | d15 = 1.75 | n8 = 1.73257 | υ8 = 51.3 |
| r16 = −68.360 | d16 = Variable | | |

*) Aspheric Surface

| Variable Separation | Focal 31.31 | Length 147.28 |
|---|---|---|
| d4 | 1.75 | 30.96 |
| d10 | 2.62 | 16.57 |
| d14 | 16.08 | 2.00 |

Aspheric Coefficients:

r11:  K = 1.0749e + 02   B = −1.5103e − 04   C = −2.2208e − 06
      D = 5.6034e − 08   E = −2.0053e − 09
r14:  K = 0.0000e + 00   B = 2.0344e − 05    C = 2.7207e − 08
      D = −3.6543e − 09  E = 2.6537e − 11
r15:  K = −6.4042e − 01  B = 3.8297e − 05    C = 4.8352e − 09
      D = 7.6473e − 10   E = −1.1378e − 11

Numerical Example 10:

f = 31.31~147.44    Fno = 1:4.60~13.15    2ω = 57.7°~13.3°

| | | | |
|---|---|---|---|
| r1 = 155.142 | d1 = 1.20 | n1 = 1.69680 | υ1 = 29.5 |
| r2 = 21.156 | d2 = 0.58 | | |
| r3 = 21.484 | d3 = 2.91 | n2 = 1.62868 | υ2 = 58.6 |
| r4 = −452.874 | d4 = Variable | | |
| r5 = −87.738 | d5 = 1.00 | n3 = 1.87844 | υ3 = 41.1 |
| r6 = 30.234 | d6 = 2.11 | n4 = 1.84700 | υ4 = 23.8 |
| r7 = 998.040 | d7 = 0.20 | | |
| r8 = 19.278 | d8 = 2.01 | n5 = 1.72040 | υ5 = 43.5 |
| r9 = 113.181 | d9 = 0.62 | | |
| r10 = ∞(Stop) | d10 = Variable | | |
| *r11 = −41.818 | d11 = 1.00 | n6 = 1.85805 | υ6 = 27.7 |
| r12 = 50.303 | d12 = 1.10 | | |
| r13 = 38.884 | d13 = 7.27 | n7 = 1.48700 | υ7 = 70.4 |
| *r14 = −9.963 | d14 = Variable | | |
| r15 = −13.434 | d15 = 1.75 | n8 = 1.69700 | υ8 = 55.5 |
| *r16 = 122.667 | d16 = Variable | | |

*) Aspheric Surface

| Variable Separation | Focal 31.31 | Length 147.44 |
|---|---|---|
| d4 | 2.71 | 29.31 |
| d10 | 3.00 | 16.18 |
| d14 | 15.37 | 2.19 |

Aspheric Coefficients:

r11:  K = 6.7485e + 00   B = −1.1049e − 04   C = −2.4484e − 06
      D = 1.1253e − 07   E = −2.9118e − 09
r14:  K = 0.0000e + 00   B = 5.9814e − 05    C = −1.6442e − 08
      D = 2.2143e − 09   E = 7.2657e − 11
r16:  K = 0.0000e + 00   B = −6.3878e − 05   C = 2.0627e − 07
      D = −8.3079e − 10  E = 1.1561e − 12

Numerical Example 11:

f = 31.31~147.46    Fno = 1:4.60~13.15    2ω = 57.7°~13.3°

| | | | |
|---|---|---|---|
| r1 = 391.436 | d1 = 1.20 | n1 = 1.77122 | υ1 = 28.1 |
| r2 = 30.310 | d2 = 0.58 | | |
| r3 = 31.878 | d3 = 2.69 | n2 = 1.60945 | υ2 = 59.7 |
| r4 = −92.398 | d4 = Variable | | |
| r5 = −73.239 | d5 = 1.00 | n3 = 1.86640 | υ3 = 41.7 |
| r6 = 34.478 | d6 = 1.92 | n4 = 1.84700 | υ4 = 23.8 |
| r7 = −2091.672 | d7 = 0.20 | | |
| r8 = 18.191 | d8 = 1.98 | n5 = 1.75212 | υ5 = 46.6 |
| r9 = 71.771 | d9 = 0.69 | | |
| r10 = ∞(Stop) | d10 = Variable | | |
| *r11 = −168.167 | d11 = 1.00 | n6 = 1.82050 | υ6 = 31.2 |
| r12 = 20.635 | d12 = 0.95 | | |
| r13 = 34.845 | d13 = 7.76 | n7 = 1.49083 | υ7 = 69.9 |
| *r14 = −9.413 | d14 = Variable | | |
| *r15 = −11.047 | d15 = 1.75 | n8 = 1.70604 | υ8 = 54.3 |
| r16 = −92.391 | d16 = Variable | | |

*) Aspheric Surface

| Variable Separation | Focal 31.31 | Length 147.46 |
|---|---|---|
| d4 | 1.75 | 31.02 |
| d10 | 2.64 | 16.43 |
| d14 | 16.28 | 2.49 |

Aspheric Coefficients:

r11:  K = 4.2574e + 02   B = −1.6791e − 04   C = −2.1453e − 06
      D = 3.9244e − 08   E = −2.1290e − 09
r14:  K = 0.0000e + 00   B = 1.6394e − 05    C = −7.0685e − 08
      D = −1.7003e − 10  E = −6.6592e − 11
r15:  K = −6.4311e − 01  B = 3.5297e − 05    C = 4.1903e − 08
      D = 9.7848e − 10   E = −1.2938e − 11

Numerical Example 12:

f = 31.31~151.26    Fno = 1:4.60~13.15    2ω = 57.7°~13.0°

| | | | |
|---|---|---|---|
| r1 = −566.609 | d1 = 1.20 | n1 = 1.66472 | υ1 = 31.5 |
| r2 = 20.313 | d2 = 0.61 | | |
| r3 = 21.227 | d3 = 3.23 | n2 = 1.68406 | υ2 = 56.0 |
| r4 = −141.452 | d4 = Variable | | |
| r5 = −86.672 | d5 = 1.00 | n3 = 1.88100 | υ3 = 41.0 |
| r6 = 28.324 | d6 = 1.89 | n4 = 1.84700 | υ4 = 23.8 |
| r7 = 409.330 | d7 = 0.54 | | |
| r8 = 18.381 | d8 = 2.12 | n5 = 1.63023 | υ5 = 40.9 |
| r9 = 351.36.1 | d9 = 0.54 | | |
| r10 = ∞(Stop) | d10 = Variable | | |
| *r11 = −41.212 | d11 = 1.00 | n6 = 1.85364 | υ6 = 26.0 |
| r12 = 49.825 | d12 = 2.30 | | |
| r13 = 60.232 | d13 = 5.00 | n7 = 1.48700 | υ7 = 70.4 |
| *r14 = −9.834 | d14 = Variable | | |
| r15 = −14.060 | d15 = 1.75 | n8 = 1.64355 | υ8 = 57.9 |
| *r16 = 88.878 | d16 = Variable | | |

*) Aspheric Surface

| Variable Separation | Focal 31.31 | Length 151.26 |
|---|---|---|
| d4 | 2.21 | 29.35 |
| d10 | 3.00 | 14.64 |
| d14 | 16.44 | 2.00 |

Aspheric Coefficients:

r11:  K = 1.0529e + 01   B = −1.2870e − 04   C = −1.7078e − 06
      D = 6.0283e − 08   E = −2.0709e − 09
r14:  K = 0.0000e + 00   B = 4.0870e − 05    C = 9.8153e − 08
      D = −3.2579e − 09  E = 1.0826e − 10
r16:  K = 0.0000e + 00   B = −5.5657e − 05   C = 1.6241e − 07
      D = −5.6580e − 10  E = 6.0893e − 13

Numerical Example 13:

| | | | |
|---|---|---|---|
| f = 31.23~153.00 | Fno = 1:4.60~13.15 | 2ω = 57.8°~12.9° | |
| r1 = 429.850 | d1 = 1.20 | n1 = 1.65856 | ν1 = 32.0 |
| r2 = 21.446 | d2 = 0.59 | | |
| r3 = 22.077 | d3 = 4.39 | n2 = 1.62056 | ν2 = 59.1 |
| r4 = −166.599 | d4 = Variable | | |
| r5 = −80.714 | d5 = 1.00 | n3 = 1.87648 | ν3 = 41.2 |
| r6 = 27.313 | d6 = 2.33 | n4 = 1.84700 | ν4 = 23.8 |
| r7 = 502.780 | d7 = 0.20 | | |
| r8 = 20.107 | d8 = 2.09 | n5 = 1.70913 | ν5 = 50.4 |
| r9 = 288.922 | d9 = 0.55 | | |
| r10 = ∞(Stop) | d10 = Variable | | |
| *r11 = −39.838 | d11 = 1.00 | n6 = 1.85695 | ν6 = 27.2 |
| r12 = 57.388 | d12 = 2.36 | | |
| r13 = 68.729 | d13 = 5.00 | n7 = 1.48700 | ν7 = 70.4 |
| *r14 = −9.690 | d14 = Variable | | |
| r15 = −13.837 | d15 = 1.75 | n8 = 1.69700 | ν8 = 55.5 |
| *r16 = 141.880 | d16 = Variable | | |

*) Aspheric Surface

| Variable Separation | Focal | Length |
|---|---|---|
| | 31.23 | 153.00 |
| d4 | 1.75 | 33.52 |
| d10 | 3.00 | 16.63 |
| d14 | 16.37 | 2.00 |

Aspheric Coefficients:

r11: K = 1.0432e + 01   B = −1.2751e − 04   C = −1.9690e − 06
     D = 6.2238e − 08   E = −1.8774e − 09
r14: K = 0.0000e + 00   B = 4.3482e − 05   C = 9.5367e − 08
     D = −2.0319e − 09  E = 9.6226e − 11
r16: K = 0.0000e + 00   B = −5.6714e − 05   C = 1.5549e − 07
     D = −5.7381e − 10  E = 6.3284e − 13

Numerical Example 14:

| | | | |
|---|---|---|---|
| f = 26.37~124.19 | Fno = 1:4.60~13.15 | 2ω = 66.4°~15.8° | |
| r1 = 2090.727 | d1 = 1.20 | n1 = 1.74471 | ν1 = 28.6 |
| r2 = 20.793 | d2 = 0.60 | | |
| r3 = 21.642 | d3 = 3.49 | n2 = 1.69229 | ν2 = 55.7 |
| r4 = −101.899 | d4 = Variable | | |
| r5 = −56.374 | d5 = 1.00 | n3 = 1.85169 | ν3 = 42.4 |
| r6 = 22.627 | d6 = 1.89 | n4 = 1.84700 | ν4 = 23.8 |
| r7 = 563.881 | d7 = 0.92 | | |
| r8 = 17.055 | d8 = 1.99 | n5 = 1.66870 | ν5 = 44.1 |
| r9 = 323.738 | d9 = 0.53 | | |
| r10 = ∞(Stop) | d10 = Variable | | |
| *r11 = −16.135 | d11 = 1.00 | n6 = 1.86337 | ν6 = 30.0 |
| r12 = 104.653 | d12 = 0.32 | | |
| r13 = 82.894 | d13 = 2.61 | n7 = 1.48700 | ν7 = 70.4 |
| r14 = −17.180 | d14 = 0.20 | | |
| r15 = −168.227 | d15 = 3.94 | n8 = 1.52677 | ν8 = 66.0 |
| *r16 = −9.445 | d16 = Variable | | |
| *r17 = −12.925 | d17 = 1.75 | n9 = 1.67790 | ν9 = 55.3 |
| *r18 = 60.418 | d18 = Variable | | |

*) Aspheric Surface

| Variable Separation | Focal | Length |
|---|---|---|
| | 26.37 | 124.19 |
| d4 | 1.75 | 24.54 |
| d10 | 3.00 | 14.61 |
| d16 | 13.18 | 2.00 |

Aspheric Coefficients:

r11: K = 4.9725e + 00   B = 5.4287e − 05   C = −2.4259e − 07
     D = 6.3938e − 08   E = −5.3304e − 10
r16: K = 0.0000e + 00   B = 6.1865e − 05   C = −9.0031e − 08
     D = 1.2319e − 08   E = 3.0825e − 11
r17: K = 0.0000e + 00   B = −3.3412e − 05   C = −4.0845e − 07
     D = 1.9364e − 08   E = −1.2106e − 10
r18: K = 0.0000e + 00   B = −1.2451e − 04   C = 6.3974e − 07
     D = −1.4243e − 09  E = −1.5577e − 12

TABLE 1

| Condition No. & Factor | | Numerical Example | | | |
|---|---|---|---|---|---|
| | | 1 | 2 | 3 | 4 |
| (1) | ft/f12at | −1.69 | −1.32 | −1.25 | −1.20 |
| (2) | ft/f1 | 0.75 | 0.64 | 0.48 | 0.36 |
| (3) | ν2ap | 23.8 | 23.8 | 23.8 | 23.8 |
| | ν2an | 41.3 | 42 | 41 | 41 |
| (4) | N2ap | 1.847 | 1.847 | 1.847 | 1.847 |
| | N2an | 1.876 | 1.861 | 1.881 | 1.881 |
| (5) | $\frac{R2a1 + R2a2}{R2a1 - R2a2}$ | −1.43 | −0.57 | −0.29 | −0.42 |
| (6) | ft/f2b | 4.92 | 4.69 | 4.69 | 4.64 |
| (7) | ft/f3 | 5.34 | 4.76 | 4.71 | 4.67 |
| (8) | ft/f4 | −8.97 | −8.23 | −8.38 | −8.29 |

| Condition No. | Numerical Example | | | | |
|---|---|---|---|---|---|
| | 5 | 6 | 7 | 8 | 9 |
| (1) | −1.11 | −1.08 | −1.03 | −1.05 | −1.44 |
| (2) | 0.36 | 0.45 | 0.53 | 0.48 | 0.41 |
| (3) | 23.8 | 23.8 | 23.8 | 23.8 | 23.8 |
| | 41 | 41 | 41 | 41 | 41 |
| (4) | 1.847 | 1.847 | 1.847 | 1.847 | 1.847 |
| | 1.881 | 1.881 | 1.881 | 1.881 | 1.875 |
| (5) | −0.23 | −0.22 | −1.21 | −0.26 | −1.62 |
| (6) | 4.60 | 4.68 | 4.69 | 4.72 | 5.04 |
| (7) | 4.62 | 4.57 | 4.44 | 4.55 | 4.63 |
| (8) | −8.30 | −8.27 | −8.1 | −8.12 | −8.57 |

| Condition No. | Numerical Example | | | | |
|---|---|---|---|---|---|
| | 10 | 11 | 12 | 13 | 14 |
| (1) | −1.24 | −1.27 | −1.25 | −1.41 | −1.41 |
| (2) | 0.40 | 0.39 | 0.60 | 0.49 | 0.52 |
| (3) | 23.8 | 23.8 | 23.8 | 23.8 | 23.8 |
| | 41.1 | 41.7 | 41 | 41.2 | 42.4 |
| (4) | 1.847 | 1.847 | 1.847 | 1.847 | 1.847 |
| | 1.878 | 1.866 | 1.881 | 1.876 | 1.852 |
| (5) | −0.84 | −1.07 | −0.65 | −0.72 | −0.82 |
| (6) | 4.61 | 4.62 | 4.93 | 5.04 | 4.63 |
| (7) | 4.83 | 4.81 | 4.56 | 4.78 | 5.07 |
| (8) | −8.53 | −8.22 | −8.07 | −8.50 | −7.98 |

It will be appreciated from the foregoing that the displacement (shaking) of a photographed image is compensated for by driving one of lens units of an optical system to decenter in directions perpendicular to an optical axis, and that novel rules of design are set forth for all the lens elements, producing an advantage of correcting various decentering aberrations, despite the increase of the zoom ratio to 5. Another advantage is that a sufficiently large displacement is compensated for by a sufficiently short decentering movement. It is thus made possible to achieve an optical system having the image stabilizing function in a simple form, while still permitting a good stability of optical performance to be maintained between the normal state and the image stabilizing state.

Next, an example of application of the optical system shown in any of the numerical examples 1 to 14 described above to the camera is described by reference to FIGS. 100A and 100B.

Figure 100A:
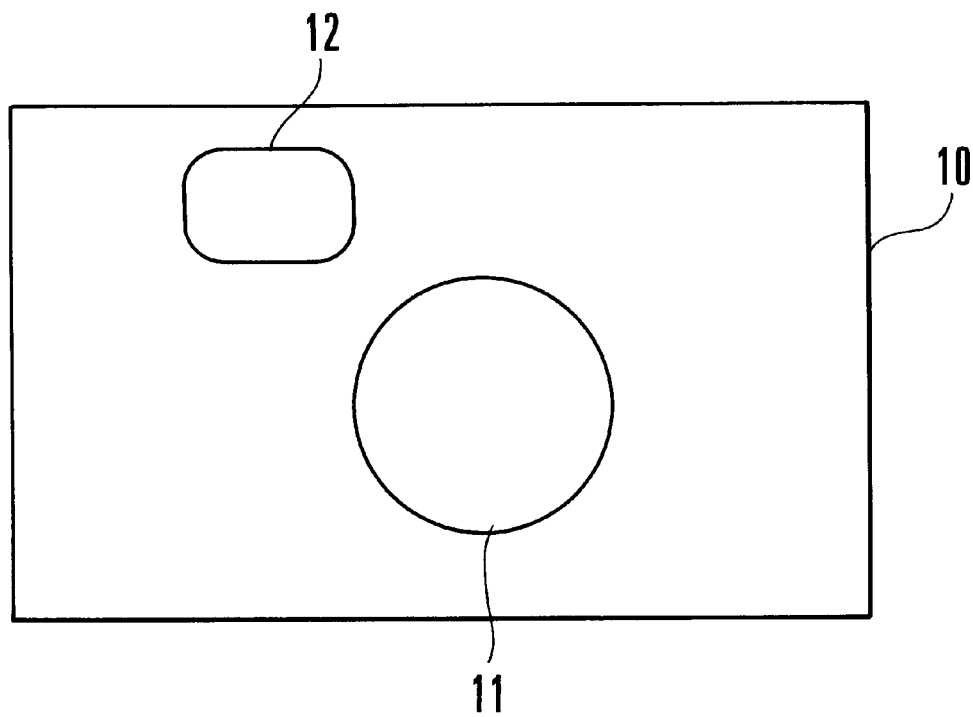
FIGS. 100A and 100B are respectively a front view and a sectional view of the main parts of a camera to which any of the optical systems of the numerical examples 1 to 14 is applied.
Figure 100B:
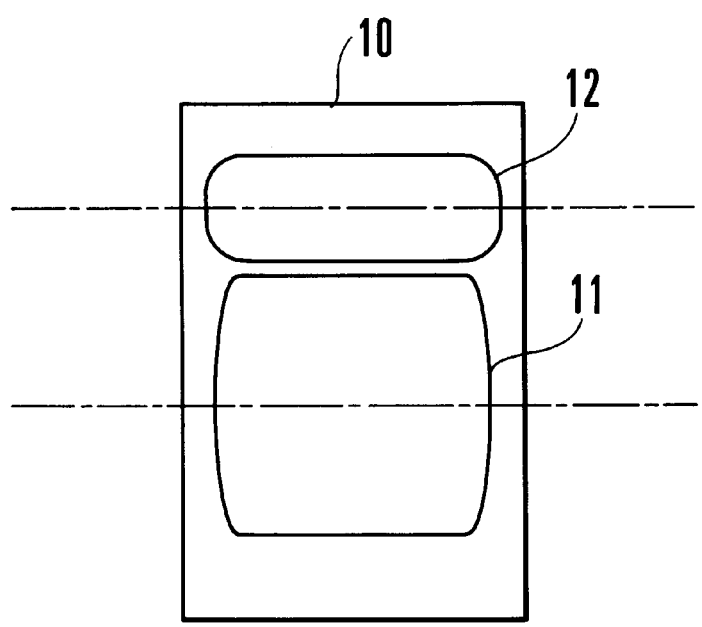

Referring to FIGS. 100A and 100B, reference numeral 10 denotes a camera body (housing) having a photographic optical system 11 and a viewfinder optical system 12 built in the interior thereof. The camera in this embodiment is a so-called "lens shutter" type camera, in which the optical axes of the photographic optical system 11 and the viewfinder optical system 12 are independent of each other.

In the present embodiment, the optical system shown in any of the numerical examples 1 to 14 is used for the photographic optical system 11. Accordingly, a photographed image is prevented, as far as possible, from deteriorating due to the vibration of the camera at the time of shooting.

What is claimed is:

1. An optical system having an image stabilizing function, comprising, in order from an object side to an image side, a first lens unit of positive refractive power, a second lens unit of positive refractive power, a third lens unit of positive refractive power and a fourth lens unit of negative refractive power, wherein, during movement from a wide-angle end to a telephoto end, all said lens units move along an optical axis such that the separation between said first lens unit and said second lens unit increases and the separation between said third lens unit and said fourth lens unit decreases, and wherein said second lens unit is composed of a front lens subunit of negative refractive power and a rear lens subunit of positive refractive power and said front lens subunit is so moved as to have directional components perpendicular to the optical axis, compensating for shaking of an image.

2. An optical system according to claim 1, satisfying the following conditions:

$$-3 < ft/f12at < -0.6$$

$$0.1 < ft/f1 < 1.5$$

where ft is a focal length in the telephoto end of the entire optical system, f12*at* is an overall focal length in the telephoto end of said first lens unit and said front lens subunit, and f1 is a focal length of said first lens unit.

3. An optical system according to claim 1, wherein said front lens subunit includes one negative lens and one positive lens, and wherein said optical system satisfies the following conditions:

$$\nu 2ap < \nu 2an$$

$$N2ap < N2an$$

where N2*an* and ν2*an* are mean values of refractive indices and Abbe numbers of materials of negative lenses included in said front lens subunit, respectively, and N2*ap* and ν2*ap* are mean values of refractive indices and Abbe numbers of materials of positive lenses included in said front lens subunit, respectively.

4. An optical system according to claim 1, wherein said front lens subunit consists of, in order from the object side to the image side, a negative lens with both lens surfaces being concave and a positive lens with a lens surface on the object side being convex.

5. An optical system according to claim 4, satisfying the following condition:

$$-1.78 < \frac{R2a1 + R2a2}{R2a1 - R2a2} < -0.18$$

where R2*a*1 is a radius of curvature of a lens surface on the object side of said negative lens, and R2*a*2 is a radius of curvature of a lens surface on the object side of said positive lens.

6. An optical system according to claim 1, wherein said first lens unit consists of a negative lens of meniscus form which is concave toward the image side and a positive lens having a lens surface on the object side which is convex.

7. An optical system according to claim 1, satisfying the following conditions:

$$2.5 < ft/f2b < 8$$

$$2 < ft/f3 < 9$$

$$-14 < ft/f4 < -5$$

where ft is a focal length in the telephoto end of the entire optical system, and f2*b*, f3 and f4 are focal lengths of said rear lens subunit, said third lens unit and said fourth lens unit, respectively.

8. An optical system according to claim 1, wherein said rear lens subunit consists of a single positive lens, said third lens unit consists of a negative lens at least one lens surface of which is aspherical and a positive lens at least one lens surface of which is aspherical, and said fourth lens unit consists of a single negative lens of meniscus form which is concave toward the object side at least one lens surface of which is aspherical.

9. A photographing apparatus comprising:

a photographic optical system, said photographic optical system including an optical system according to one of claims 1 to 8; and a viewfinder optical system, wherein an optical axis of said viewfinder optical system is independent of an optical axis of said photographic optical system.

* * * * *

UNITED STATES PATENT AND TRADEMARK OFFICE
CERTIFICATE OF CORRECTION

PATENT NO. : 6,091,901  
DATED : July 18, 2000  
INVENTOR(S) : Ogawa

Page 1 of 2

It is certified that error appears in the above-identified patent and that said Letters Patent is hereby corrected as shown below:

Title page,  
Item [57] ABSTRACT, "power," should read -- power --; and "power" should read -- power, --.  
Line 15, "for shake" should read -- for the shaking --.

Column 1,  
Line 60, "tilt image" should read -- tilt-image --.

Column 2,  
Line 8, "tilt image" should read -- tilt-image --.

Column 3,  
Line 44, "a" should be deleted.

Column 9,  
Line 4, "shift image" should read -- shift-image --.  
Line 61, "is" should read -- are --.

Column 10,  
Line 35, "shake" should read -- shaking --.

Column 12,  
Line 4, "Sjn" should read -- Sijn --.  
Line 48, "shake)" should read -- shaking) --.  
Line 60, "shake" should read -- shaking --.

Column 14,  
Line 37, "in" should read -- into --.  
Line 45, "image stabilizing" should read -- image-stabilizing --.

Column 15,  
Line 48, "the" (second occurrence) should be deleted.  
Line 60, "that" should read -- in which --.  
Line 61, "in" should read -- into --.

Column 16,  
Line 29, "glasses" should read -- lenses --.

UNITED STATES PATENT AND TRADEMARK OFFICE
CERTIFICATE OF CORRECTION

PATENT NO. : 6,091,901
DATED : July 18, 2000
INVENTOR(S) : Ogawa

It is certified that error appears in the above-identified patent and that said Letters Patent is hereby corrected as shown below:

Column 17,
Line 64, "r16: K=0.0000e + 00 B=9.4592e-05 C=3.2952e-07" should read
-- r16: K=0.0000e + 00 B=-9.4592e-05 C=3.2982e-07 --.

Column 18,
Line 8, "n4 = 1.67423" should read -- n2 = 1.67423 --.
Line 10, "n5 = 1.88100" should read -- n3 = 1.88100 --.
Line 11, "n6 = 1.84700" should read -- n4 = 1.84700--.
Line 13, "n8 = 1.59792" should read -- n5 = 1.59792--.
Line 41, "n2 = 1.64873" should read -- n1 = 1.64873 --.

Column 19,
Line 14, "r10 = (Stop)" should read -- r10 = ∞ (Stop) --.

Column 20,
Line 7, "d = 1.20" should read -- d1 = 1.20 --.
Line 14, "r10 = (Stop)" should read -- r10 = ∞ (Stop) --.

Column 22,
Line 47, "r9 = 351.36.1" should read -- r9 = 351.361 --.

Column 23,
Line 59, "B = 5.4287e-05" should read -- B = -5.4287e-05 --.

Signed and Sealed this

Twenty-second Day of January, 2002

Attest:

JAMES E. ROGAN
Attesting Officer
Director of the United States Patent and Trademark Office